US011816325B2

(12) United States Patent
Boule et al.

(10) Patent No.: US 11,816,325 B2
(45) Date of Patent: Nov. 14, 2023

(54) APPLICATION SHORTCUTS FOR CARPLAY

(71) Applicant: Apple Inc., Cupertino, CA (US)

(72) Inventors: Andre M. J. Boule, San Jose, CA (US); Richard R. Dellinger, San Jose, CA (US); Craig M. Federighi, Los Alto Hills, CA (US); Stephen O. Lemay, Palo Alto, CA (US); Donald W. Pitschel, San Francisco, CA (US); Emily Clark Schubert, San Jose, CA (US); Michael Knippers, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/411,110

(22) Filed: Jan. 20, 2017

(65) Prior Publication Data
US 2017/0357433 A1 Dec. 14, 2017

Related U.S. Application Data

(60) Provisional application No. 62/349,025, filed on Jun. 12, 2016.

(51) Int. Cl.
*G06F 3/04883* (2022.01)
*G06F 3/04886* (2022.01)
*G06F 3/04817* (2022.01)
*G06F 3/04845* (2022.01)
*H04M 1/724* (2021.01)
*H04M 1/72403* (2021.01)

(52) U.S. Cl.
CPC ...... *G06F 3/04883* (2013.01); *G06F 3/04817* (2013.01); *G06F 3/04845* (2013.01); *G06F 3/04886* (2013.01); *G06F 2203/04803* (2013.01); *G06F 2203/04808* (2013.01); *H04M 1/724* (2021.01); *H04M 1/72403* (2021.01); *H04M 2250/22* (2013.01)

(58) Field of Classification Search
CPC .......... G06F 17/3053; G06F 17/30867; G06F 3/0482; G06F 2203/04803; G06F 3/04886
See application file for complete search history.

(56) References Cited

U.S. PATENT DOCUMENTS

| 4,355,380 A | 10/1982 | Huguenin et al. |
| 4,899,136 A | 2/1990 | Beard et al. |
| 5,051,736 A | 9/1991 | Bennett et al. |

(Continued)

FOREIGN PATENT DOCUMENTS

| AU | 2012202140 A1 | 5/2012 |
| AU | 2015100115 A4 | 3/2015 |

(Continued)

OTHER PUBLICATIONS

Corrected Notice of Allowance received for U.S. Appl. No. 12/888,362, dated Jun. 6, 2018, 3 pages.

(Continued)

*Primary Examiner* — Matthew Ell
*Assistant Examiner* — David V Luu
(74) *Attorney, Agent, or Firm* — DLA Piper LLP (US)

(57) ABSTRACT

The present disclosure generally relates to replacing an application affordance corresponding to an application with a different application affordance corresponding to a different application when the different application meets a predetermined criteria.

46 Claims, 22 Drawing Sheets

(56) References Cited

U.S. PATENT DOCUMENTS

| | | |
|---|---|---|
| 5,124,959 A | 6/1992 | Yamazaki et al. |
| 5,146,556 A | 9/1992 | Hullot et al. |
| 5,196,838 A | 3/1993 | Meier et al. |
| 5,237,679 A | 8/1993 | Wang et al. |
| 5,312,478 A | 5/1994 | Reed et al. |
| 5,452,414 A | 9/1995 | Rosendahl et al. |
| 5,491,778 A | 2/1996 | Gordon et al. |
| 5,497,454 A | 3/1996 | Bates et al. |
| 5,515,486 A | 5/1996 | Amro et al. |
| 5,544,295 A | 8/1996 | Capps |
| 5,546,529 A | 8/1996 | Bowers et al. |
| 5,572,238 A | 11/1996 | Krivacic |
| 5,598,524 A | 1/1997 | Johnston et al. |
| 5,610,653 A | 3/1997 | Abecassis |
| 5,612,719 A | 3/1997 | Beernink et al. |
| 5,621,878 A | 4/1997 | Owens et al. |
| 5,625,818 A | 4/1997 | Zarmer et al. |
| 5,642,490 A | 6/1997 | Morgan et al. |
| 5,644,739 A | 7/1997 | Moursund |
| 5,657,049 A | 8/1997 | Ludolph et al. |
| 5,671,381 A | 9/1997 | Strasnick et al. |
| 5,678,014 A | 10/1997 | Malamud et al. |
| 5,678,015 A | 10/1997 | Goh |
| 5,726,687 A | 3/1998 | Belfiore et al. |
| 5,736,974 A | 4/1998 | Selker |
| 5,745,096 A | 4/1998 | Ludolph et al. |
| 5,745,116 A | 4/1998 | Pisutha-arnond |
| 5,745,718 A | 4/1998 | Cline et al. |
| 5,745,910 A | 4/1998 | Piersol et al. |
| 5,754,179 A | 5/1998 | Hocker et al. |
| 5,754,809 A | 5/1998 | Gandre |
| 5,757,371 A | 5/1998 | Oran et al. |
| 5,760,773 A | 6/1998 | Berman et al. |
| 5,774,119 A | 6/1998 | Alimpich et al. |
| 5,796,401 A | 8/1998 | Winer |
| 5,801,699 A | 9/1998 | Hocker et al. |
| 5,801,704 A | 9/1998 | Oohara et al. |
| 5,812,862 A | 9/1998 | Smith et al. |
| 5,825,352 A | 10/1998 | Bisset et al. |
| 5,825,357 A | 10/1998 | Malamud et al. |
| 5,835,079 A | 11/1998 | Shieh |
| 5,835,094 A | 11/1998 | Ermel et al. |
| 5,838,326 A | 11/1998 | Card et al. |
| 5,856,824 A | 1/1999 | Shieh |
| 5,861,885 A | 1/1999 | Strasnick et al. |
| 5,864,337 A | 1/1999 | Marvin |
| 5,870,683 A | 2/1999 | Wells et al. |
| 5,870,734 A | 2/1999 | Kao |
| 5,874,905 A | 2/1999 | Nanba et al. |
| 5,877,765 A | 3/1999 | Dickman et al. |
| 5,877,775 A | 3/1999 | Theisen et al. |
| 5,880,733 A | 3/1999 | Horvitz et al. |
| 5,880,743 A | 3/1999 | Moran et al. |
| 5,900,876 A | 5/1999 | Yagita et al. |
| 5,914,716 A | 6/1999 | Rubin et al. |
| 5,914,717 A | 6/1999 | Kleewein et al. |
| 5,923,327 A | 7/1999 | Smith et al. |
| 5,923,908 A | 7/1999 | Schrock et al. |
| 5,934,707 A | 8/1999 | Johnson |
| 5,943,679 A | 8/1999 | Niles et al. |
| 5,956,025 A | 9/1999 | Goulden et al. |
| 5,963,204 A | 10/1999 | Ikeda et al. |
| 5,995,106 A | 11/1999 | Naughton et al. |
| 6,005,579 A | 12/1999 | Sugiyama et al. |
| 6,012,072 A | 1/2000 | Lucas et al. |
| 6,043,818 A | 3/2000 | Nakano et al. |
| 6,049,336 A | 4/2000 | Liu et al. |
| 6,054,989 A | 4/2000 | Robertson et al. |
| 6,072,486 A | 6/2000 | Sheldon et al. |
| 6,088,032 A | 7/2000 | Mackinlay |
| 6,111,573 A | 8/2000 | Mccomb et al. |
| 6,121,969 A | 9/2000 | Jain et al. |
| 6,133,914 A | 10/2000 | Rogers et al. |
| 6,166,738 A | 12/2000 | Robertson et al. |
| 6,188,407 B1 | 2/2001 | Smith et al. |
| 6,195,094 B1 | 2/2001 | Celebiler |
| 6,211,858 B1 | 4/2001 | Moon et al. |
| 6,222,465 B1 | 4/2001 | Kumar et al. |
| 6,229,542 B1 | 5/2001 | Miller |
| 6,232,957 B1 | 5/2001 | Hinckley |
| 6,253,218 B1 | 6/2001 | Aoki et al. |
| 6,256,577 B1 | 7/2001 | Graunke |
| 6,275,935 B1 | 8/2001 | Barlow et al. |
| 6,278,454 B1 | 8/2001 | Krishnan |
| 6,313,853 B1 | 11/2001 | Lamontagne et al. |
| 6,317,140 B1 | 11/2001 | Livingston |
| 6,353,451 B1 | 3/2002 | Teibel et al. |
| 6,396,520 B1 | 5/2002 | Ording |
| 6,477,117 B1 | 11/2002 | Narayanaswami et al. |
| 6,486,895 B1 | 11/2002 | Robertson et al. |
| 6,496,206 B1 | 12/2002 | Mernyk et al. |
| 6,496,209 B2 | 12/2002 | Horii |
| 6,525,997 B1 | 2/2003 | Narayanaswami et al. |
| 6,545,669 B1 | 4/2003 | Kinawi et al. |
| 6,549,218 B1 | 4/2003 | Gershony et al. |
| 6,571,245 B2 | 5/2003 | Huang et al. |
| 6,590,568 B1 | 7/2003 | Astala et al. |
| 6,597,378 B1 | 7/2003 | Shiraishi et al. |
| 6,621,509 B1 | 9/2003 | Eiref et al. |
| 6,628,309 B1 | 9/2003 | Dodson et al. |
| 6,628,310 B1 | 9/2003 | Hiura et al. |
| 6,647,534 B1 | 11/2003 | Graham |
| 6,683,628 B1 | 1/2004 | Nakagawa et al. |
| 6,690,623 B1 | 2/2004 | Maano |
| 6,700,612 B1 | 3/2004 | Anderson et al. |
| 6,710,788 B1 | 3/2004 | Freach et al. |
| 6,714,222 B1 | 3/2004 | Björn et al. |
| 6,763,388 B1 | 7/2004 | Tsimelzon |
| 6,774,914 B1 | 8/2004 | Benayoun |
| 6,781,575 B1 | 8/2004 | Hawkins et al. |
| 6,798,429 B2 | 9/2004 | Bradski |
| 6,809,724 B1 | 10/2004 | Shiraishi et al. |
| 6,816,175 B1 | 11/2004 | Hamp et al. |
| 6,820,111 B1 | 11/2004 | Rubin et al. |
| 6,822,638 B2 | 11/2004 | Dobies et al. |
| 6,847,387 B2 * | 1/2005 | Roth .................... G06F 3/0482 715/738 |
| 6,850,150 B1 | 2/2005 | Ronkainen |
| 6,874,128 B1 | 3/2005 | Moore et al. |
| 6,880,132 B2 | 4/2005 | Uemura |
| 6,888,536 B2 | 5/2005 | Westerman et al. |
| 6,915,490 B1 | 7/2005 | Ewing |
| 6,931,601 B2 | 8/2005 | Vronay et al. |
| 6,934,911 B2 | 8/2005 | Salmimaa et al. |
| 6,940,494 B2 | 9/2005 | Hoshino et al. |
| 6,963,349 B1 | 11/2005 | Nagasaki |
| 6,970,749 B1 | 11/2005 | Chinn et al. |
| 6,976,210 B1 | 12/2005 | Silva et al. |
| 6,976,228 B2 | 12/2005 | Bernhardson |
| 6,978,127 B1 | 12/2005 | Bulthuis et al. |
| 7,003,495 B1 | 2/2006 | Burger et al. |
| 7,007,239 B1 | 2/2006 | Hawkins et al. |
| 7,010,755 B2 | 3/2006 | Anderson et al. |
| 7,017,118 B1 | 3/2006 | Carroll |
| 7,043,701 B2 | 5/2006 | Gordon |
| 7,071,943 B2 | 7/2006 | Adler |
| 7,075,512 B1 | 7/2006 | Fabre et al. |
| 7,080,326 B2 | 7/2006 | Molander et al. |
| 7,093,201 B2 | 8/2006 | Duarte |
| 7,107,549 B2 | 9/2006 | Deaton et al. |
| 7,117,453 B2 | 10/2006 | Drucker et al. |
| 7,119,819 B1 | 10/2006 | Robertson et al. |
| 7,126,579 B2 | 10/2006 | Ritter |
| 7,133,859 B1 | 11/2006 | Wong |
| 7,134,092 B2 | 11/2006 | Fung et al. |
| 7,134,095 B1 | 11/2006 | Smith et al. |
| 7,142,210 B2 | 11/2006 | Schwuttke et al. |
| 7,146,576 B2 | 12/2006 | Chang et al. |
| 7,155,667 B1 | 12/2006 | Kotler et al. |
| 7,173,604 B2 | 2/2007 | Marvit et al. |
| 7,178,111 B2 | 2/2007 | Glein et al. |
| 7,194,527 B2 | 3/2007 | Drucker et al. |
| 7,194,698 B2 | 3/2007 | Gottfurcht et al. |
| 7,215,323 B2 | 5/2007 | Gombert et al. |

(56) References Cited

U.S. PATENT DOCUMENTS

| | | |
|---|---|---|
| 7,216,305 B1 | 5/2007 | Jaeger |
| 7,231,229 B1 | 6/2007 | Hawkins et al. |
| 7,242,406 B2 | 7/2007 | Robotham et al. |
| 7,249,327 B2 | 7/2007 | Nelson et al. |
| 7,278,115 B1 | 10/2007 | Conway et al. |
| 7,283,845 B2 | 10/2007 | De Bast |
| 7,287,232 B2 | 10/2007 | Tsuchimura et al. |
| 7,292,243 B1 | 11/2007 | Burke |
| 7,310,636 B2 | 12/2007 | Bodin et al. |
| 7,318,198 B2 | 1/2008 | Sakayori et al. |
| 7,340,678 B2 | 3/2008 | Chiu et al. |
| 7,355,593 B2 | 4/2008 | Hill et al. |
| 7,362,331 B2 | 4/2008 | Ording |
| 7,383,497 B2 | 6/2008 | Glenner et al. |
| 7,392,488 B2 | 6/2008 | Card et al. |
| 7,403,211 B2 | 7/2008 | Sheasby et al. |
| 7,403,910 B1 | 7/2008 | Hastings et al. |
| 7,404,151 B2 | 7/2008 | Borchardt et al. |
| 7,406,666 B2 | 7/2008 | Davis et al. |
| 7,412,650 B2 | 8/2008 | Gallo |
| 7,415,677 B2 | 8/2008 | Arend et al. |
| 7,417,680 B2 | 8/2008 | Aoki et al. |
| 7,432,928 B2 | 10/2008 | Shaw et al. |
| 7,433,179 B2 | 10/2008 | Hisano et al. |
| 7,434,177 B1 | 10/2008 | Ording et al. |
| 7,437,005 B2 | 10/2008 | Drucker et al. |
| 7,456,823 B2 | 11/2008 | Poupyrev et al. |
| 7,468,742 B2 | 12/2008 | Ahn et al. |
| 7,478,437 B2 | 1/2009 | Hatanaka et al. |
| 7,479,948 B2 | 1/2009 | Kim et al. |
| 7,480,872 B1 | 1/2009 | Ubillos |
| 7,480,873 B2 | 1/2009 | Kawahara |
| 7,487,467 B1 | 2/2009 | Kawahara et al. |
| 7,490,295 B2 | 2/2009 | Chaudhri et al. |
| 7,493,573 B2 | 2/2009 | Wagner |
| 7,496,595 B2 | 2/2009 | Accapadi et al. |
| 7,506,268 B2 | 3/2009 | Jennings et al. |
| 7,509,321 B2 | 3/2009 | Wong et al. |
| 7,509,588 B2 | 3/2009 | Van Os et al. |
| 7,511,710 B2 | 3/2009 | Barrett |
| 7,512,898 B2 | 3/2009 | Jennings et al. |
| 7,523,414 B2 | 4/2009 | Schmidt et al. |
| 7,526,738 B2 | 4/2009 | Ording et al. |
| 7,546,548 B2 | 6/2009 | Chew et al. |
| 7,546,554 B2 | 6/2009 | Chiu et al. |
| 7,552,402 B2 | 6/2009 | Bilow |
| 7,557,804 B1 | 7/2009 | McDaniel |
| 7,561,874 B2 | 7/2009 | Wang et al. |
| 7,584,278 B2 | 9/2009 | Rajarajan et al. |
| 7,587,683 B2 | 9/2009 | Ito et al. |
| 7,594,185 B2 | 9/2009 | Anderson et al. |
| 7,606,819 B2 | 10/2009 | Audet et al. |
| 7,607,150 B1 | 10/2009 | Kobayashi et al. |
| 7,620,894 B1 | 11/2009 | Kahn |
| 7,624,357 B2 | 11/2009 | De Bast |
| 7,642,934 B2 | 1/2010 | Scott |
| 7,650,575 B2 | 1/2010 | Cummins et al. |
| 7,657,842 B2 | 2/2010 | Matthews et al. |
| 7,657,845 B2 | 2/2010 | Drucker et al. |
| 7,663,620 B2 | 2/2010 | Robertson et al. |
| 7,665,033 B2 | 2/2010 | Byrne et al. |
| 7,667,703 B2 | 2/2010 | Hong et al. |
| 7,680,817 B2 | 3/2010 | Audet et al. |
| 7,683,883 B2 | 3/2010 | Touma et al. |
| 7,693,992 B2 | 4/2010 | Watson |
| 7,698,658 B2 | 4/2010 | Ohwa et al. |
| 7,710,423 B2 | 5/2010 | Drucker et al. |
| 7,716,604 B2 | 5/2010 | Kataoka et al. |
| 7,719,523 B2 | 5/2010 | Hillis |
| 7,719,542 B1 | 5/2010 | Gough et al. |
| 7,724,242 B2 | 5/2010 | Hillis et al. |
| 7,725,839 B2 | 5/2010 | Michaels |
| 7,728,821 B2 | 6/2010 | Hillis et al. |
| 7,730,401 B2 | 6/2010 | Gillespie et al. |
| 7,730,423 B2 | 6/2010 | Graham |
| 7,735,021 B2 | 6/2010 | Padawer et al. |
| 7,739,604 B1 | 6/2010 | Lyons et al. |
| 7,747,289 B2 | 6/2010 | Wang et al. |
| 7,761,813 B2 | 7/2010 | Kim et al. |
| 7,765,266 B2 | 7/2010 | Kropivny |
| 7,770,125 B1 | 8/2010 | Young et al. |
| 7,783,990 B2 | 8/2010 | Amadio et al. |
| 7,797,637 B2 | 9/2010 | Marcjan |
| 7,805,684 B2 | 9/2010 | Arvilommi |
| 7,810,038 B2 | 10/2010 | Matsa et al. |
| 7,840,901 B2 | 11/2010 | Lacey et al. |
| 7,840,907 B2 | 11/2010 | Kikuchi et al. |
| 7,840,912 B2 | 11/2010 | Elias et al. |
| 7,853,972 B2 | 12/2010 | Brodersen et al. |
| 7,856,602 B2 | 12/2010 | Armstrong |
| 7,873,916 B1 | 1/2011 | Chaudhri |
| 7,880,726 B2 | 2/2011 | Nakadaira et al. |
| 7,904,832 B2 | 3/2011 | Ubillos |
| 7,907,124 B2 | 3/2011 | Hillis et al. |
| 7,907,125 B2 | 3/2011 | Weiss et al. |
| 7,907,476 B2 | 3/2011 | Lee |
| 7,917,869 B2 | 3/2011 | Anderson |
| 7,924,444 B2 | 4/2011 | Takahashi |
| 7,940,250 B2 | 5/2011 | Forstall |
| 7,956,869 B1 | 6/2011 | Gilra |
| 7,958,457 B1 | 6/2011 | Brandenberg et al. |
| 7,979,879 B2 | 7/2011 | Kazama et al. |
| 7,986,324 B2 | 7/2011 | Funaki et al. |
| 7,995,078 B2 | 8/2011 | Baar |
| 7,996,789 B2 | 8/2011 | Louch et al. |
| 8,020,110 B2 | 9/2011 | Hurst |
| 8,024,671 B2 | 9/2011 | Lee et al. |
| 8,046,714 B2 | 10/2011 | Yahiro et al. |
| 8,059,101 B2 | 11/2011 | Westerman et al. |
| 8,064,704 B2 | 11/2011 | Kim et al. |
| 8,065,618 B2 | 11/2011 | Kumar et al. |
| 8,069,404 B2 | 11/2011 | Audet |
| 8,072,439 B2 | 12/2011 | Hillis et al. |
| 8,078,966 B2 | 12/2011 | Audet |
| 8,099,441 B2 | 1/2012 | Surasinghe |
| 8,103,963 B2 | 1/2012 | Ikeda et al. |
| 8,111,255 B2 | 2/2012 | Park |
| 8,125,481 B2 | 2/2012 | Gossweiler, III et al. |
| 8,130,211 B2 | 3/2012 | Abernathy |
| 8,139,043 B2 | 3/2012 | Hillis |
| 8,151,185 B2 | 4/2012 | Audet |
| 8,156,175 B2 | 4/2012 | Hopkins |
| 8,161,419 B2 | 4/2012 | Palahnuk et al. |
| 8,185,842 B2 | 5/2012 | Chang et al. |
| 8,188,985 B2 | 5/2012 | Hillis et al. |
| 8,205,172 B2 | 6/2012 | Wong et al. |
| 8,209,628 B1 | 6/2012 | Davidson |
| 8,214,793 B1 | 7/2012 | Muthuswamy |
| 8,230,358 B1 | 7/2012 | Chaudhri |
| 8,232,990 B2 | 7/2012 | King et al. |
| 8,255,808 B2 | 8/2012 | Lindgren et al. |
| 8,259,163 B2 | 9/2012 | Bell |
| 8,266,550 B1 | 9/2012 | Cleron et al. |
| 8,269,729 B2 | 9/2012 | Han et al. |
| 8,269,739 B2 | 9/2012 | Hillis et al. |
| 8,306,515 B2 | 11/2012 | Ryu et al. |
| 8,335,784 B2 | 12/2012 | Gutt et al. |
| 8,365,084 B1 | 1/2013 | Lin et al. |
| 8,423,911 B2 | 4/2013 | Chaudhri |
| 8,434,027 B2 | 4/2013 | Jones |
| 8,446,371 B2 | 5/2013 | Fyke et al. |
| 8,458,615 B2 | 6/2013 | Chaudhri |
| 8,467,770 B1 | 6/2013 | Ben Ayed |
| 8,519,964 B2 | 8/2013 | Platzer et al. |
| 8,519,972 B2 | 8/2013 | Forstall et al. |
| 8,525,839 B2 | 9/2013 | Chaudhri |
| 8,558,808 B2 | 10/2013 | Forstall et al. |
| 8,564,544 B2 | 10/2013 | Jobs et al. |
| 8,601,370 B2 | 12/2013 | Chiang et al. |
| 8,619,038 B2 | 12/2013 | Chaudhri et al. |
| 8,626,762 B2 | 1/2014 | Seung et al. |
| 8,672,885 B2 | 3/2014 | Kriesel et al. |
| 8,683,349 B2 | 3/2014 | Roberts et al. |
| 8,713,011 B2 | 4/2014 | Asai et al. |

(56) References Cited

U.S. PATENT DOCUMENTS

| | | |
|---|---|---|
| 8,713,469 B2 | 4/2014 | Park et al. |
| 8,730,188 B2 | 5/2014 | Pasquero et al. |
| 8,799,777 B1 | 8/2014 | Lee et al. |
| 8,799,821 B1 | 8/2014 | De Rose et al. |
| 8,826,170 B1 | 9/2014 | Weber et al. |
| 8,839,128 B2 | 9/2014 | Krishnaraj et al. |
| 8,881,060 B2 | 11/2014 | Chaudhri et al. |
| 8,881,061 B2 | 11/2014 | Chaudhri et al. |
| 8,957,866 B2 | 2/2015 | Barnett et al. |
| 8,972,898 B2 | 3/2015 | Carter |
| 9,026,508 B2 | 5/2015 | Nagai |
| 9,032,438 B2 | 5/2015 | Ito et al. |
| 9,053,462 B2 | 6/2015 | Cadiz et al. |
| 9,082,314 B2 | 7/2015 | Tsai |
| 9,152,312 B1 | 10/2015 | Terleski et al. |
| 9,170,708 B2 | 10/2015 | Chaudhri et al. |
| 9,237,855 B2 | 1/2016 | Hong et al. |
| 9,239,673 B2 | 1/2016 | Shaffer et al. |
| 9,256,627 B2 | 2/2016 | Surasinghe |
| 9,259,615 B2 | 2/2016 | Weast et al. |
| 9,367,232 B2 | 6/2016 | Platzer et al. |
| 9,377,762 B2 | 6/2016 | Hoobler et al. |
| 9,386,432 B2 | 7/2016 | Chu et al. |
| 9,389,090 B1 | 7/2016 | Levine et al. |
| 9,417,787 B2 | 8/2016 | Fong |
| 9,448,691 B2 | 9/2016 | Suda |
| 9,619,143 B2 | 4/2017 | Christie et al. |
| 9,715,277 B2 | 7/2017 | Lee et al. |
| 9,772,749 B2 | 9/2017 | Chaudhri et al. |
| 9,794,397 B2 | 10/2017 | Min et al. |
| 9,933,913 B2 | 4/2018 | Van Os et al. |
| 9,993,913 B2 | 6/2018 | Mccardle |
| 10,025,458 B2 | 7/2018 | Chaudhri et al. |
| 10,250,735 B2 | 4/2019 | Butcher et al. |
| 10,251,034 B2 | 4/2019 | Langlois et al. |
| 10,282,451 B1 | 5/2019 | Ho et al. |
| 10,359,907 B2 | 7/2019 | Van Os et al. |
| 10,425,284 B2 | 9/2019 | Dellinger et al. |
| 10,620,780 B2 | 4/2020 | Chaudhri et al. |
| 10,684,592 B2 | 6/2020 | Chang et al. |
| 10,788,953 B2 | 9/2020 | Chaudhri et al. |
| 10,788,976 B2 | 9/2020 | Chaudhri et al. |
| 10,884,579 B2 | 1/2021 | Van Os et al. |
| 10,915,224 B2 | 2/2021 | Van Os et al. |
| 11,009,833 B2 | 5/2021 | Essery |
| 2001/0024195 A1 | 9/2001 | Hayakawa |
| 2001/0024212 A1 | 9/2001 | Ohnishi |
| 2001/0038394 A1 | 11/2001 | Tsuchimura et al. |
| 2002/0008691 A1 | 1/2002 | Hanajima et al. |
| 2002/0015024 A1 | 2/2002 | Westerman et al. |
| 2002/0015042 A1 | 2/2002 | Robotham et al. |
| 2002/0015064 A1 | 2/2002 | Robotham et al. |
| 2002/0018051 A1 | 2/2002 | Singh |
| 2002/0024540 A1 | 2/2002 | McCarthy |
| 2002/0038299 A1 | 3/2002 | Zernik et al. |
| 2002/0054090 A1 | 5/2002 | Silva et al. |
| 2002/0057287 A1 | 5/2002 | Crow et al. |
| 2002/0067376 A1 | 6/2002 | Martin et al. |
| 2002/0078037 A1 | 6/2002 | Hatanaka et al. |
| 2002/0085037 A1 | 7/2002 | Leavitt et al. |
| 2002/0091697 A1 | 7/2002 | Huang et al. |
| 2002/0093531 A1 | 7/2002 | Barile |
| 2002/0097261 A1 | 7/2002 | Gottfurcht et al. |
| 2002/0104096 A1 | 8/2002 | Cramer et al. |
| 2002/0109721 A1 | 8/2002 | Konaka et al. |
| 2002/0140698 A1 | 10/2002 | Robertson et al. |
| 2002/0140736 A1 | 10/2002 | Chen |
| 2002/0143949 A1 | 10/2002 | Rajarajan et al. |
| 2002/0149561 A1 | 10/2002 | Fukumoto et al. |
| 2002/0152222 A1 | 10/2002 | Holbrook |
| 2002/0152255 A1 | 10/2002 | Smith et al. |
| 2002/0163592 A1 | 11/2002 | Ueda |
| 2002/0167683 A1 | 11/2002 | Hanamoto et al. |
| 2002/0191029 A1 | 12/2002 | Gillespie et al. |
| 2002/0196238 A1 | 12/2002 | Tsukada et al. |
| 2003/0001898 A1* | 1/2003 | Bernhardson .......... G06F 3/0481 715/786 |
| 2003/0007012 A1 | 1/2003 | Bate |
| 2003/0016241 A1 | 1/2003 | Burke |
| 2003/0030664 A1 | 2/2003 | Parry |
| 2003/0048295 A1 | 3/2003 | Lilleness et al. |
| 2003/0063072 A1 | 4/2003 | Brandenberg et al. |
| 2003/0080991 A1 | 5/2003 | Crow et al. |
| 2003/0085931 A1 | 5/2003 | Card et al. |
| 2003/0090572 A1 | 5/2003 | Belz et al. |
| 2003/0097361 A1 | 5/2003 | Huang et al. |
| 2003/0098894 A1 | 5/2003 | Sheldon et al. |
| 2003/0122787 A1 | 7/2003 | Zimmerman et al. |
| 2003/0128242 A1 | 7/2003 | Gordon |
| 2003/0142136 A1 | 7/2003 | Carter et al. |
| 2003/0154190 A1 | 8/2003 | Misawa et al. |
| 2003/0156119 A1 | 8/2003 | Bonadio |
| 2003/0156140 A1 | 8/2003 | Watanabe |
| 2003/0156756 A1 | 8/2003 | Gokturk et al. |
| 2003/0160825 A1 | 8/2003 | Weber |
| 2003/0164827 A1 | 9/2003 | Gottesman et al. |
| 2003/0169298 A1 | 9/2003 | Ording |
| 2003/0169302 A1* | 9/2003 | Davidsson .......... G06F 3/0482 715/810 |
| 2003/0174170 A1 | 9/2003 | Jung et al. |
| 2003/0174172 A1 | 9/2003 | Conrad et al. |
| 2003/0184552 A1 | 10/2003 | Chadha |
| 2003/0184587 A1 | 10/2003 | Ording et al. |
| 2003/0189597 A1 | 10/2003 | Anderson et al. |
| 2003/0195950 A1 | 10/2003 | Huang et al. |
| 2003/0200289 A1 | 10/2003 | Kemp et al. |
| 2003/0206195 A1 | 11/2003 | Matsa et al. |
| 2003/0206197 A1 | 11/2003 | McInerney |
| 2003/0210278 A1 | 11/2003 | Kyoya et al. |
| 2003/0226142 A1 | 12/2003 | Rand |
| 2004/0008224 A1 | 1/2004 | Molander et al. |
| 2004/0012718 A1 | 1/2004 | Sullivan et al. |
| 2004/0021643 A1 | 2/2004 | Hoshino et al. |
| 2004/0027330 A1 | 2/2004 | Bradski |
| 2004/0056809 A1 | 3/2004 | Prassmayer et al. |
| 2004/0056839 A1 | 3/2004 | Yoshihara |
| 2004/0070608 A1 | 4/2004 | Saka |
| 2004/0103156 A1 | 5/2004 | Quillen et al. |
| 2004/0109013 A1 | 6/2004 | Goertz |
| 2004/0119728 A1 | 6/2004 | Blanco et al. |
| 2004/0121823 A1 | 6/2004 | Noesgaard et al. |
| 2004/0125088 A1 | 7/2004 | Zimmerman et al. |
| 2004/0138569 A1 | 7/2004 | Grunwald et al. |
| 2004/0141009 A1 | 7/2004 | Hinckley et al. |
| 2004/0141011 A1 | 7/2004 | Smethers et al. |
| 2004/0143430 A1 | 7/2004 | Said et al. |
| 2004/0143598 A1 | 7/2004 | Drucker et al. |
| 2004/0155909 A1 | 8/2004 | Wagner |
| 2004/0160462 A1 | 8/2004 | Sheasby et al. |
| 2004/0196267 A1 | 10/2004 | Kawai et al. |
| 2004/0203835 A1 | 10/2004 | Trottier et al. |
| 2004/0215719 A1 | 10/2004 | Altshuler |
| 2004/0218104 A1 | 11/2004 | Smith et al. |
| 2004/0218451 A1 | 11/2004 | Said et al. |
| 2004/0222975 A1 | 11/2004 | Nakano et al. |
| 2004/0236769 A1 | 11/2004 | Smith et al. |
| 2004/0246607 A1 | 12/2004 | Watson et al. |
| 2004/0257375 A1 | 12/2004 | Cowperthwaite |
| 2005/0005246 A1 | 1/2005 | Card et al. |
| 2005/0005248 A1 | 1/2005 | Rockey et al. |
| 2005/0010955 A1 | 1/2005 | Elia et al. |
| 2005/0012862 A1 | 1/2005 | Lee |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0043987 A1 | 2/2005 | Kumar et al. |
| 2005/0052471 A1 | 3/2005 | Nagasaki |
| 2005/0057524 A1 | 3/2005 | Hill et al. |
| 2005/0057530 A1 | 3/2005 | Hinckley et al. |
| 2005/0057548 A1 | 3/2005 | Kim |
| 2005/0060653 A1 | 3/2005 | Fukase et al. |
| 2005/0060664 A1 | 3/2005 | Rogers |
| 2005/0060665 A1 | 3/2005 | Rekimoto |
| 2005/0088423 A1 | 4/2005 | Keely et al. |

(56) References Cited

U.S. PATENT DOCUMENTS

| | | |
|---|---|---|
| 2005/0091596 A1 | 4/2005 | Anthony et al. |
| 2005/0091609 A1 | 4/2005 | Matthews et al. |
| 2005/0097089 A1 | 5/2005 | Nielsen et al. |
| 2005/0116026 A1 | 6/2005 | Burger et al. |
| 2005/0120142 A1 | 6/2005 | Hall |
| 2005/0131924 A1 | 6/2005 | Jones |
| 2005/0134578 A1 | 6/2005 | Chambers et al. |
| 2005/0138570 A1 | 6/2005 | Good et al. |
| 2005/0151742 A1 | 7/2005 | Hong et al. |
| 2005/0177796 A1 | 8/2005 | Takahashi |
| 2005/0204309 A1 | 9/2005 | Szeto |
| 2005/0210410 A1 | 9/2005 | Ohwa et al. |
| 2005/0210412 A1 | 9/2005 | Matthews et al. |
| 2005/0216913 A1 | 9/2005 | Gemmell et al. |
| 2005/0227642 A1 | 10/2005 | Jensen |
| 2005/0229102 A1 | 10/2005 | Watson et al. |
| 2005/0246331 A1 | 11/2005 | De Vorchik et al. |
| 2005/0246918 A1 | 11/2005 | Tanahashi et al. |
| 2005/0251755 A1 | 11/2005 | Mullins et al. |
| 2005/0259087 A1 | 11/2005 | Hoshino et al. |
| 2005/0262448 A1 | 11/2005 | Vronay et al. |
| 2005/0267756 A1 | 12/2005 | Schultz et al. |
| 2005/0270276 A1 | 12/2005 | Sugimoto et al. |
| 2005/0275636 A1 | 12/2005 | Dehlin et al. |
| 2005/0278757 A1 | 12/2005 | Grossman et al. |
| 2005/0283734 A1 | 12/2005 | Santoro et al. |
| 2005/0289109 A1 | 12/2005 | Arrouye et al. |
| 2005/0289476 A1 | 12/2005 | Tokkonen |
| 2005/0289482 A1 | 12/2005 | Anthony et al. |
| 2006/0004685 A1 | 1/2006 | Pyhalammi et al. |
| 2006/0005207 A1 | 1/2006 | Louch et al. |
| 2006/0007182 A1 | 1/2006 | Sato et al. |
| 2006/0020903 A1 | 1/2006 | Wang et al. |
| 2006/0022955 A1 | 2/2006 | Kennedy |
| 2006/0025110 A1 | 2/2006 | Liu |
| 2006/0025923 A1 | 2/2006 | Dotan et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031874 A1 | 2/2006 | Ok et al. |
| 2006/0033751 A1 | 2/2006 | Keely et al. |
| 2006/0035628 A1 | 2/2006 | Miller et al. |
| 2006/0036568 A1 | 2/2006 | Moore et al. |
| 2006/0048069 A1 | 3/2006 | Igeta |
| 2006/0051073 A1 | 3/2006 | Jung et al. |
| 2006/0053392 A1 | 3/2006 | Salmimaa et al. |
| 2006/0055700 A1 | 3/2006 | Niles et al. |
| 2006/0070007 A1 | 3/2006 | Cummins et al. |
| 2006/0075355 A1 | 4/2006 | Shiono et al. |
| 2006/0075396 A1 | 4/2006 | Surasinghe |
| 2006/0080386 A1 | 4/2006 | Roykkee et al. |
| 2006/0080616 A1 | 4/2006 | Vogel et al. |
| 2006/0080617 A1 | 4/2006 | Anderson et al. |
| 2006/0090022 A1 | 4/2006 | Flynn et al. |
| 2006/0092133 A1 | 5/2006 | Touma et al. |
| 2006/0092770 A1 | 5/2006 | Demas |
| 2006/0097991 A1 | 5/2006 | Hotelling et al. |
| 2006/0107231 A1 | 5/2006 | Matthews et al. |
| 2006/0112335 A1 | 5/2006 | Hofmeister et al. |
| 2006/0112347 A1 | 5/2006 | Baudisch |
| 2006/0116578 A1 | 6/2006 | Grunwald et al. |
| 2006/0117372 A1 | 6/2006 | Hopkins |
| 2006/0119619 A1 | 6/2006 | Fagans et al. |
| 2006/0122748 A1 | 6/2006 | Nou |
| 2006/0123353 A1 | 6/2006 | Matthews et al. |
| 2006/0123359 A1 | 6/2006 | Schatzberger |
| 2006/0123360 A1 | 6/2006 | Anwar et al. |
| 2006/0125799 A1 | 6/2006 | Hillis et al. |
| 2006/0129586 A1 | 6/2006 | Arrouye et al. |
| 2006/0143574 A1 | 6/2006 | Ito et al. |
| 2006/0153531 A1 | 7/2006 | Kanegae et al. |
| 2006/0161863 A1 | 7/2006 | Gallo |
| 2006/0161870 A1 | 7/2006 | Hotelling et al. |
| 2006/0161871 A1 | 7/2006 | Hotelling et al. |
| 2006/0164418 A1 | 7/2006 | Hao et al. |
| 2006/0174211 A1 | 8/2006 | Hoellerer et al. |
| 2006/0187212 A1 | 8/2006 | Park et al. |
| 2006/0189278 A1 | 8/2006 | Scott |
| 2006/0190833 A1 | 8/2006 | Sangiovanni et al. |
| 2006/0197752 A1 | 9/2006 | Hurst et al. |
| 2006/0197753 A1 | 9/2006 | Hotelling |
| 2006/0209035 A1 | 9/2006 | Jenkins et al. |
| 2006/0210958 A1 | 9/2006 | Rimas-ribikauskas et al. |
| 2006/0212828 A1 | 9/2006 | Yahiro et al. |
| 2006/0212833 A1 | 9/2006 | Gallagher et al. |
| 2006/0236266 A1 | 10/2006 | Majava |
| 2006/0242596 A1 | 10/2006 | Armstrong |
| 2006/0242604 A1 | 10/2006 | Wong et al. |
| 2006/0242607 A1 | 10/2006 | Hudson |
| 2006/0242668 A1 | 10/2006 | Chouraqui |
| 2006/0250578 A1 | 11/2006 | Pohl et al. |
| 2006/0253771 A1 | 11/2006 | Baschy |
| 2006/0262116 A1 | 11/2006 | Moshiri et al. |
| 2006/0267966 A1 | 11/2006 | Grossman et al. |
| 2006/0268100 A1 | 11/2006 | Karukka et al. |
| 2006/0271605 A1 | 11/2006 | Petruzzo |
| 2006/0271864 A1 | 11/2006 | Satterfield et al. |
| 2006/0271867 A1 | 11/2006 | Wang et al. |
| 2006/0271874 A1 | 11/2006 | Raiz et al. |
| 2006/0277460 A1 | 12/2006 | Forstall et al. |
| 2006/0277481 A1 | 12/2006 | Forstall et al. |
| 2006/0277486 A1 | 12/2006 | Skinner |
| 2006/0278692 A1 | 12/2006 | Matsumoto et al. |
| 2006/0282790 A1 | 12/2006 | Matthews et al. |
| 2006/0284852 A1 | 12/2006 | Hofmeister et al. |
| 2006/0290661 A1 | 12/2006 | Innanen et al. |
| 2007/0005581 A1 | 1/2007 | Arrouye et al. |
| 2007/0013665 A1 | 1/2007 | Vetelainen et al. |
| 2007/0016872 A1 | 1/2007 | Cummins et al. |
| 2007/0016958 A1 | 1/2007 | Bodepudi et al. |
| 2007/0024468 A1 | 2/2007 | Quandel et al. |
| 2007/0028269 A1 | 2/2007 | Nezu et al. |
| 2007/0030362 A1 | 2/2007 | Ota et al. |
| 2007/0035513 A1 | 2/2007 | Sherrard et al. |
| 2007/0044029 A1 | 2/2007 | Fisher et al. |
| 2007/0050432 A1 | 3/2007 | Yoshizawa |
| 2007/0050726 A1 | 3/2007 | Wakai et al. |
| 2007/0050727 A1 | 3/2007 | Lewis-Bowen et al. |
| 2007/0055947 A1 | 3/2007 | Ostojic et al. |
| 2007/0061745 A1 | 3/2007 | Anthony et al. |
| 2007/0067272 A1 | 3/2007 | Flynt et al. |
| 2007/0070066 A1 | 3/2007 | Bakhash |
| 2007/0083827 A1 | 4/2007 | Scott et al. |
| 2007/0083911 A1 | 4/2007 | Madden et al. |
| 2007/0091068 A1 | 4/2007 | Liberty |
| 2007/0101292 A1 | 5/2007 | Kupka |
| 2007/0101297 A1 | 5/2007 | Forstall et al. |
| 2007/0106950 A1 | 5/2007 | Hutchinson et al. |
| 2007/0113207 A1 | 5/2007 | Gritton |
| 2007/0121869 A1 | 5/2007 | Gorti et al. |
| 2007/0123205 A1 | 5/2007 | Lee et al. |
| 2007/0124677 A1 | 5/2007 | de los Reyes et al. |
| 2007/0126696 A1 | 6/2007 | Boillot |
| 2007/0126732 A1 | 6/2007 | Robertson et al. |
| 2007/0132789 A1 | 6/2007 | Ording et al. |
| 2007/0136351 A1 | 6/2007 | Dames et al. |
| 2007/0146325 A1 | 6/2007 | Poston et al. |
| 2007/0150810 A1 | 6/2007 | Katz et al. |
| 2007/0150834 A1 | 6/2007 | Muller et al. |
| 2007/0150835 A1 | 6/2007 | Muller |
| 2007/0152958 A1 | 7/2007 | Ahn et al. |
| 2007/0152980 A1 | 7/2007 | Kocienda et al. |
| 2007/0156697 A1 | 7/2007 | Tsarkova |
| 2007/0157089 A1 | 7/2007 | Van Os et al. |
| 2007/0157094 A1 | 7/2007 | Lemay et al. |
| 2007/0157097 A1 | 7/2007 | Peters |
| 2007/0174785 A1 | 7/2007 | Perttula |
| 2007/0177803 A1 | 8/2007 | Elias et al. |
| 2007/0177804 A1 | 8/2007 | Elias et al. |
| 2007/0180395 A1 | 8/2007 | Yamashita et al. |
| 2007/0188518 A1 | 8/2007 | Vale et al. |
| 2007/0189737 A1 | 8/2007 | Chaudhri et al. |
| 2007/0192741 A1 | 8/2007 | Yoritate et al. |
| 2007/0226652 A1 | 9/2007 | Kikuchi et al. |

(56) References Cited

U.S. PATENT DOCUMENTS

| | | |
|---|---|---|
| 2007/0233369 A1 | 10/2007 | Ng et al. |
| 2007/0237492 A1 | 10/2007 | Roberts et al. |
| 2007/0239760 A1 | 10/2007 | Simon |
| 2007/0240079 A1 | 10/2007 | Flynt et al. |
| 2007/0243862 A1 | 10/2007 | Coskun et al. |
| 2007/0243905 A1 | 10/2007 | Juh et al. |
| 2007/0245250 A1 | 10/2007 | Schechter et al. |
| 2007/0247425 A1 | 10/2007 | Liberty et al. |
| 2007/0250793 A1 | 10/2007 | Miura et al. |
| 2007/0250794 A1 | 10/2007 | Miura et al. |
| 2007/0266011 A1 | 11/2007 | Rohrs et al. |
| 2007/0271532 A1 | 11/2007 | Nguyen et al. |
| 2007/0288860 A1 | 12/2007 | Ording et al. |
| 2007/0288862 A1 | 12/2007 | Ording |
| 2007/0288868 A1 | 12/2007 | Rhee et al. |
| 2007/0294231 A1 | 12/2007 | Kaihotsu |
| 2008/0001924 A1 | 1/2008 | de los Reyes et al. |
| 2008/0005702 A1 | 1/2008 | Skourup et al. |
| 2008/0005703 A1 | 1/2008 | Radivojevic et al. |
| 2008/0006762 A1 | 1/2008 | Fadell et al. |
| 2008/0016443 A1 | 1/2008 | Hiroshima et al. |
| 2008/0016468 A1 | 1/2008 | Chambers et al. |
| 2008/0016470 A1 | 1/2008 | Misawa et al. |
| 2008/0016471 A1 | 1/2008 | Park |
| 2008/0024454 A1 | 1/2008 | Everest |
| 2008/0027586 A1 | 1/2008 | Hem et al. |
| 2008/0034013 A1 | 2/2008 | Cisler et al. |
| 2008/0034309 A1 | 2/2008 | Louch et al. |
| 2008/0034317 A1 | 2/2008 | Fard et al. |
| 2008/0040668 A1 | 2/2008 | Ala-Rantala |
| 2008/0059915 A1 | 3/2008 | Boillot |
| 2008/0062126 A1 | 3/2008 | Algreatly |
| 2008/0062141 A1 | 3/2008 | Chandhri |
| 2008/0062257 A1 | 3/2008 | Corson |
| 2008/0067626 A1 | 3/2008 | Hirler et al. |
| 2008/0076637 A1 | 3/2008 | Gilley et al. |
| 2008/0077952 A1 | 3/2008 | St. Jean et al. |
| 2008/0082930 A1 | 4/2008 | Omernick et al. |
| 2008/0089587 A1 | 4/2008 | Kim et al. |
| 2008/0091763 A1 | 4/2008 | Devonshire |
| 2008/0092158 A1 | 4/2008 | Bhatnagar et al. |
| 2008/0094369 A1 | 4/2008 | Ganatra et al. |
| 2008/0104515 A1 | 5/2008 | Dumitru et al. |
| 2008/0109408 A1 | 5/2008 | Choi et al. |
| 2008/0109839 A1 | 5/2008 | Bruce et al. |
| 2008/0117461 A1 | 5/2008 | Mitsutake et al. |
| 2008/0120568 A1 | 5/2008 | Jian et al. |
| 2008/0122796 A1 | 5/2008 | Jobs et al. |
| 2008/0125180 A1 | 5/2008 | Hoffman et al. |
| 2008/0126971 A1 | 5/2008 | Kojima |
| 2008/0130421 A1 | 6/2008 | Akaiwa et al. |
| 2008/0134088 A1 | 6/2008 | Tse et al. |
| 2008/0136785 A1 | 6/2008 | Baudisch et al. |
| 2008/0147214 A1 | 6/2008 | Lee et al. |
| 2008/0151700 A1 | 6/2008 | Inoue et al. |
| 2008/0155437 A1 | 6/2008 | Morris |
| 2008/0155453 A1 | 6/2008 | Othmer |
| 2008/0155617 A1 | 6/2008 | Angiolillo et al. |
| 2008/0158145 A1 | 7/2008 | Westerman |
| 2008/0158172 A1 | 7/2008 | Hotelling et al. |
| 2008/0161045 A1 | 7/2008 | Vuorenmaa |
| 2008/0163059 A1 | 7/2008 | Craner |
| 2008/0164468 A1 | 7/2008 | Chen et al. |
| 2008/0165140 A1 | 7/2008 | Christie et al. |
| 2008/0168365 A1 | 7/2008 | Chaudhri |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2008/0168401 A1 | 7/2008 | Boule et al. |
| 2008/0168478 A1 | 7/2008 | Platzer et al. |
| 2008/0180406 A1 | 7/2008 | Han et al. |
| 2008/0182628 A1 | 7/2008 | Lee et al. |
| 2008/0183909 A1 | 7/2008 | Lim et al. |
| 2008/0184112 A1 | 7/2008 | Chiang et al. |
| 2008/0200154 A1 | 8/2008 | Maharajh et al. |
| 2008/0201225 A1 | 8/2008 | Maharajh et al. |
| 2008/0204424 A1 | 8/2008 | Jin et al. |
| 2008/0206600 A1 | 8/2008 | Loloee |
| 2008/0216017 A1 | 9/2008 | Kurtenbach et al. |
| 2008/0222545 A1 | 9/2008 | Lemay et al. |
| 2008/0225007 A1 | 9/2008 | Nakadaira et al. |
| 2008/0229254 A1 | 9/2008 | Warner |
| 2008/0231610 A1 | 9/2008 | Hotelling et al. |
| 2008/0244119 A1 | 10/2008 | Tokuhara et al. |
| 2008/0244644 A1 | 10/2008 | McCausland |
| 2008/0256115 A1 | 10/2008 | Beletski et al. |
| 2008/0259045 A1 | 10/2008 | Kim et al. |
| 2008/0259057 A1 | 10/2008 | Brons |
| 2008/0266407 A1 | 10/2008 | Battles et al. |
| 2008/0268948 A1 | 10/2008 | Boesen |
| 2008/0276201 A1 | 11/2008 | Risch et al. |
| 2008/0282202 A1 | 11/2008 | Sunday |
| 2008/0288600 A1 | 11/2008 | Clark |
| 2008/0294981 A1 | 11/2008 | Balzano et al. |
| 2008/0300055 A1 | 12/2008 | Lutnick et al. |
| 2008/0300572 A1 | 12/2008 | Rankers et al. |
| 2008/0307361 A1 | 12/2008 | Louch et al. |
| 2008/0307362 A1 | 12/2008 | Chaudhri et al. |
| 2008/0309632 A1 | 12/2008 | Westerman et al. |
| 2008/0313110 A1 | 12/2008 | Kreamer et al. |
| 2008/0313596 A1 | 12/2008 | Kreamer et al. |
| 2008/0320419 A1 | 12/2008 | Matas et al. |
| 2009/0002335 A1 | 1/2009 | Chaudhri |
| 2009/0005080 A1 | 1/2009 | Forstall et al. |
| 2009/0006994 A1 | 1/2009 | Forstall et al. |
| 2009/0007017 A1 | 1/2009 | Anzures et al. |
| 2009/0007026 A1 | 1/2009 | Scott |
| 2009/0019385 A1 | 1/2009 | Khatib et al. |
| 2009/0021488 A1 | 1/2009 | Kali et al. |
| 2009/0023433 A1 | 1/2009 | Walley et al. |
| 2009/0024946 A1 | 1/2009 | Gotz |
| 2009/0027495 A1 | 1/2009 | Oskin et al. |
| 2009/0029681 A1 | 1/2009 | Clemow et al. |
| 2009/0034805 A1 | 2/2009 | Perlmutter et al. |
| 2009/0055742 A1 | 2/2009 | Nordhagen |
| 2009/0058821 A1 | 3/2009 | Chaudhri et al. |
| 2009/0063971 A1 | 3/2009 | White et al. |
| 2009/0064055 A1 | 3/2009 | Chaudhri et al. |
| 2009/0070114 A1 | 3/2009 | Staszak |
| 2009/0070708 A1 | 3/2009 | Finkelstein |
| 2009/0077501 A1 | 3/2009 | Partridge et al. |
| 2009/0085878 A1 | 4/2009 | Heubel et al. |
| 2009/0103780 A1 | 4/2009 | Nishihara et al. |
| 2009/0119728 A1 | 5/2009 | Broberg |
| 2009/0122018 A1 | 5/2009 | Vymenets et al. |
| 2009/0125842 A1 | 5/2009 | Nakayama |
| 2009/0132965 A1 | 5/2009 | Shimizu |
| 2009/0133067 A1 | 5/2009 | Sherman et al. |
| 2009/0138194 A1 | 5/2009 | Geelen |
| 2009/0138827 A1 | 5/2009 | Van Os et al. |
| 2009/0144653 A1 | 6/2009 | Ubillos |
| 2009/0150775 A1 | 6/2009 | Miyazaki et al. |
| 2009/0158200 A1 | 6/2009 | Palahnuk et al. |
| 2009/0163193 A1 | 6/2009 | Fyke et al. |
| 2009/0164936 A1 | 6/2009 | Kawaguchi |
| 2009/0166098 A1 | 7/2009 | Sunder |
| 2009/0172744 A1 | 7/2009 | Rothschild |
| 2009/0178008 A1 | 7/2009 | Herz et al. |
| 2009/0183080 A1 | 7/2009 | Thakkar et al. |
| 2009/0183125 A1 | 7/2009 | Magal et al. |
| 2009/0184936 A1 | 7/2009 | Algreatly |
| 2009/0189911 A1 | 7/2009 | Ono |
| 2009/0199128 A1 | 8/2009 | Matthews et al. |
| 2009/0204920 A1 | 8/2009 | Beverley et al. |
| 2009/0204928 A1 | 8/2009 | Kallio et al. |
| 2009/0217187 A1 | 8/2009 | Kendall et al. |
| 2009/0217206 A1 | 8/2009 | Liu et al. |
| 2009/0217209 A1 | 8/2009 | Chen et al. |
| 2009/0217320 A1 | 8/2009 | Aldrey |
| 2009/0222420 A1 | 9/2009 | Hirata |
| 2009/0222765 A1 | 9/2009 | Ekstrand |
| 2009/0228825 A1 | 9/2009 | Van Os et al. |
| 2009/0231271 A1 | 9/2009 | Heubel et al. |
| 2009/0237371 A1 | 9/2009 | Kim et al. |

(56) References Cited

U.S. PATENT DOCUMENTS

| | | |
|---|---|---|
| 2009/0237372 A1 | 9/2009 | Kim et al. |
| 2009/0254869 A1 | 10/2009 | Ludwig et al. |
| 2009/0265669 A1 | 10/2009 | Kida et al. |
| 2009/0271723 A1 | 10/2009 | Matsushima et al. |
| 2009/0278812 A1 | 11/2009 | Yasutake |
| 2009/0282369 A1 | 11/2009 | Jones |
| 2009/0303231 A1 | 12/2009 | Robinet et al. |
| 2009/0313567 A1 | 12/2009 | Kwon et al. |
| 2009/0313584 A1 | 12/2009 | Kerr et al. |
| 2009/0313585 A1 | 12/2009 | Hellinger et al. |
| 2009/0315848 A1 | 12/2009 | Ku et al. |
| 2009/0319928 A1 | 12/2009 | Alphin, III et al. |
| 2009/0319935 A1 | 12/2009 | Figura |
| 2009/0322676 A1 | 12/2009 | Kerr et al. |
| 2009/0327969 A1 | 12/2009 | Estrada |
| 2010/0011304 A1 | 1/2010 | Van Os |
| 2010/0013780 A1 | 1/2010 | Ikeda et al. |
| 2010/0014825 A1 | 1/2010 | Curtis et al. |
| 2010/0031203 A1 | 2/2010 | Morris et al. |
| 2010/0050133 A1 | 2/2010 | Nishihara et al. |
| 2010/0053151 A1 | 3/2010 | Marti et al. |
| 2010/0054519 A1 | 3/2010 | Mulvey et al. |
| 2010/0058182 A1 | 3/2010 | Jung |
| 2010/0063813 A1 | 3/2010 | Richter et al. |
| 2010/0064053 A1 | 3/2010 | Bull et al. |
| 2010/0082661 A1 | 4/2010 | Beaudreau |
| 2010/0083165 A1 | 4/2010 | Andrews et al. |
| 2010/0095206 A1 | 4/2010 | Kim |
| 2010/0095238 A1 | 4/2010 | Baudet |
| 2010/0095248 A1 | 4/2010 | Karstens |
| 2010/0100841 A1 | 4/2010 | Shin et al. |
| 2010/0105454 A1 | 4/2010 | Weber et al. |
| 2010/0107101 A1 | 4/2010 | Shaw et al. |
| 2010/0110025 A1 | 5/2010 | Lim |
| 2010/0115428 A1 | 5/2010 | Shuping et al. |
| 2010/0122195 A1 | 5/2010 | Hwang |
| 2010/0124152 A1 | 5/2010 | Lee |
| 2010/0131190 A1 | 5/2010 | Terauchi et al. |
| 2010/0151908 A1 | 6/2010 | Skarby et al. |
| 2010/0151918 A1 | 6/2010 | Annambhotla et al. |
| 2010/0153844 A1 | 6/2010 | Hwang et al. |
| 2010/0153878 A1 | 6/2010 | Lindgren et al. |
| 2010/0157742 A1 | 6/2010 | Relyea et al. |
| 2010/0159909 A1 | 6/2010 | Stifelman |
| 2010/0162170 A1 | 6/2010 | Johns et al. |
| 2010/0169357 A1 | 7/2010 | Ingrassia et al. |
| 2010/0199227 A1 | 8/2010 | Xiao et al. |
| 2010/0211685 A1 | 8/2010 | McDowall et al. |
| 2010/0211872 A1 | 8/2010 | Rolston et al. |
| 2010/0223563 A1 | 9/2010 | Green |
| 2010/0223574 A1 | 9/2010 | Wang et al. |
| 2010/0225962 A1 | 9/2010 | Okigami et al. |
| 2010/0229129 A1 | 9/2010 | Price et al. |
| 2010/0229130 A1 | 9/2010 | Edge et al. |
| 2010/0241955 A1 | 9/2010 | Price et al. |
| 2010/0241967 A1 | 9/2010 | Lee |
| 2010/0241999 A1 | 9/2010 | Russ et al. |
| 2010/0248788 A1 | 9/2010 | Yook et al. |
| 2010/0251085 A1 | 9/2010 | Zearing et al. |
| 2010/0257468 A1 | 10/2010 | Bernardo et al. |
| 2010/0262928 A1 | 10/2010 | Abbott |
| 2010/0281408 A1 | 11/2010 | Fujioka et al. |
| 2010/0295795 A1 | 11/2010 | Wilairat |
| 2010/0315413 A1 | 12/2010 | Izadi et al. |
| 2010/0318709 A1 | 12/2010 | Bell et al. |
| 2010/0325529 A1 | 12/2010 | Sun |
| 2010/0332497 A1* | 12/2010 | Valliani .............. G06F 16/70 |
| | | 707/759 |
| 2010/0333017 A1 | 12/2010 | Ortiz |
| 2011/0004835 A1 | 1/2011 | Yanchar et al. |
| 2011/0007000 A1 | 1/2011 | Lim |
| 2011/0010672 A1 | 1/2011 | Hope |
| 2011/0012921 A1 | 1/2011 | Cholewin et al. |
| 2011/0029934 A1 | 2/2011 | Locker et al. |
| 2011/0040657 A1 | 2/2011 | Roswell |
| 2011/0041098 A1 | 2/2011 | Kajiya et al. |
| 2011/0055722 A1 | 3/2011 | Ludwig |
| 2011/0059733 A1 | 3/2011 | Kim et al. |
| 2011/0061010 A1 | 3/2011 | Wasko |
| 2011/0078597 A1 | 3/2011 | Rapp et al. |
| 2011/0080359 A1 | 4/2011 | Jang et al. |
| 2011/0082620 A1 | 4/2011 | Small et al. |
| 2011/0083104 A1 | 4/2011 | Minton |
| 2011/0087999 A1 | 4/2011 | Bichsel et al. |
| 2011/0093728 A1 | 4/2011 | Das |
| 2011/0093821 A1 | 4/2011 | Wigdor et al. |
| 2011/0106954 A1 | 5/2011 | Chatterjee et al. |
| 2011/0119610 A1 | 5/2011 | Hackborn et al. |
| 2011/0119629 A1 | 5/2011 | Huotari et al. |
| 2011/0124376 A1 | 5/2011 | Kim et al. |
| 2011/0131534 A1 | 6/2011 | Subramanian et al. |
| 2011/0145758 A1 | 6/2011 | Rosales et al. |
| 2011/0148786 A1 | 6/2011 | Day et al. |
| 2011/0148798 A1 | 6/2011 | Dahl |
| 2011/0166777 A1 | 7/2011 | Chavakula |
| 2011/0167058 A1* | 7/2011 | van Os ............... G06F 17/3087 |
| | | 707/722 |
| 2011/0167365 A1 | 7/2011 | Wingrove et al. |
| 2011/0173556 A1 | 7/2011 | Czerwinski et al. |
| 2011/0177845 A1 | 7/2011 | Fasold |
| 2011/0179368 A1 | 7/2011 | King et al. |
| 2011/0225549 A1* | 9/2011 | Kim .................... G06F 3/04817 |
| | | 715/838 |
| 2011/0246918 A1 | 10/2011 | Henderson |
| 2011/0252346 A1 | 10/2011 | Chaudhri |
| 2011/0252349 A1 | 10/2011 | Chaudhri |
| 2011/0252372 A1 | 10/2011 | Chaudhri |
| 2011/0252373 A1 | 10/2011 | Chaudhri |
| 2011/0283334 A1 | 11/2011 | Choi et al. |
| 2011/0285659 A1 | 11/2011 | Kuwabara et al. |
| 2011/0298723 A1 | 12/2011 | Fleizach et al. |
| 2011/0302513 A1 | 12/2011 | Ademar et al. |
| 2011/0309924 A1 | 12/2011 | Dybalski et al. |
| 2011/0310005 A1 | 12/2011 | Chen et al. |
| 2011/0310058 A1 | 12/2011 | Yamada et al. |
| 2011/0314098 A1 | 12/2011 | Farrell et al. |
| 2012/0023471 A1 | 1/2012 | Fischer et al. |
| 2012/0030623 A1 | 2/2012 | Hoellwarth |
| 2012/0035924 A1 | 2/2012 | Jitkoff et al. |
| 2012/0036460 A1 | 2/2012 | Cieplinski et al. |
| 2012/0060092 A1 | 3/2012 | Hill et al. |
| 2012/0066630 A1* | 3/2012 | Kim .................... G06F 3/04817 |
| | | 715/769 |
| 2012/0079122 A1 | 3/2012 | Brown et al. |
| 2012/0083258 A1 | 4/2012 | Rabii |
| 2012/0084692 A1 | 4/2012 | Bae |
| 2012/0084694 A1 | 4/2012 | Sirpal et al. |
| 2012/0092812 A1 | 4/2012 | Lewis et al. |
| 2012/0110031 A1 | 5/2012 | Lahcanski et al. |
| 2012/0151331 A1* | 6/2012 | Pallakoff .............. G06F 3/0482 |
| | | 715/243 |
| 2012/0169608 A1 | 7/2012 | Forutanpour et al. |
| 2012/0169617 A1 | 7/2012 | Maenpaa |
| 2012/0216146 A1 | 8/2012 | Korkonen |
| 2012/0304092 A1 | 11/2012 | Jarrett et al. |
| 2012/0324390 A1 | 12/2012 | Tao |
| 2013/0019175 A1 | 1/2013 | Kotler et al. |
| 2013/0067411 A1 | 3/2013 | Kataoka et al. |
| 2013/0111400 A1 | 5/2013 | Miwa |
| 2013/0179784 A1 | 7/2013 | Bang |
| 2013/0194066 A1 | 8/2013 | Rahman et al. |
| 2013/0205244 A1 | 8/2013 | Decker et al. |
| 2013/0234924 A1 | 9/2013 | Janefalkar et al. |
| 2013/0253980 A1 | 9/2013 | Blom et al. |
| 2013/0295961 A1 | 11/2013 | Lehtiniemi et al. |
| 2013/0304276 A1 | 11/2013 | Flies |
| 2013/0321340 A1* | 12/2013 | Seo ....................... G06F 1/1641 |
| | | 345/174 |
| 2013/0332113 A1 | 12/2013 | Piemonte et al. |
| 2013/0332886 A1 | 12/2013 | Cranfill et al. |
| 2013/0344905 A1 | 12/2013 | Kim et al. |
| 2013/0345971 A1 | 12/2013 | Stamm et al. |
| 2013/0346408 A1 | 12/2013 | Duarte et al. |
| 2014/0006769 A1 | 1/2014 | Chory et al. |

(56) References Cited

U.S. PATENT DOCUMENTS

| | | |
|---|---|---|
| 2014/0011481 A1 | 1/2014 | Kho |
| 2014/0015786 A1 | 1/2014 | Honda |
| 2014/0019522 A1 | 1/2014 | Weng et al. |
| 2014/0026088 A1 | 1/2014 | Monte |
| 2014/0068483 A1 | 3/2014 | Platzer et al. |
| 2014/0068520 A1 | 3/2014 | Missig et al. |
| 2014/0075234 A1 | 3/2014 | Stekkelpak et al. |
| 2014/0082383 A1 | 3/2014 | De Cesare et al. |
| 2014/0082384 A1 | 3/2014 | De Cesare et al. |
| 2014/0108978 A1* | 4/2014 | Yu .................. G06F 3/0482 715/765 |
| 2014/0109024 A1 | 4/2014 | Miyazaki |
| 2014/0128021 A1 | 5/2014 | Walker et al. |
| 2014/0135631 A1 | 5/2014 | Brumback et al. |
| 2014/0139637 A1 | 5/2014 | Mistry et al. |
| 2014/0143678 A1 | 5/2014 | Mistry et al. |
| 2014/0143784 A1 | 5/2014 | Mistry et al. |
| 2014/0165006 A1 | 6/2014 | Chaudhri et al. |
| 2014/0181558 A1 | 6/2014 | Taha et al. |
| 2014/0195826 A1 | 7/2014 | Wojcik et al. |
| 2014/0195972 A1 | 7/2014 | Lee et al. |
| 2014/0200742 A1 | 7/2014 | Mauti, Jr. |
| 2014/0208250 A1 | 7/2014 | Ording et al. |
| 2014/0215457 A1 | 7/2014 | Gava et al. |
| 2014/0236459 A1 | 8/2014 | Boesch et al. |
| 2014/0237360 A1 | 8/2014 | Chaudhri et al. |
| 2014/0276244 A1 | 9/2014 | Kamyar |
| 2014/0277843 A1 | 9/2014 | Langlois et al. |
| 2014/0278028 A1 | 9/2014 | Nye et al. |
| 2014/0278051 A1 | 9/2014 | Mcgavran et al. |
| 2014/0280580 A1 | 9/2014 | Langlois et al. |
| 2014/0281957 A1 | 9/2014 | Weng et al. |
| 2014/0293755 A1 | 10/2014 | Geiser et al. |
| 2014/0304635 A1 | 10/2014 | Kristinsson et al. |
| 2014/0317555 A1 | 10/2014 | Choi et al. |
| 2014/0328151 A1 | 11/2014 | Serber |
| 2014/0336931 A1 | 11/2014 | Wilkins |
| 2014/0362056 A1 | 12/2014 | Zambetti et al. |
| 2014/0365126 A1* | 12/2014 | Vulcano ............ G01C 21/3611 701/533 |
| 2015/0012853 A1 | 1/2015 | Chaudhri et al. |
| 2015/0015500 A1 | 1/2015 | Lee et al. |
| 2015/0070362 A1 | 3/2015 | Hirai |
| 2015/0089407 A1 | 3/2015 | Suzuki |
| 2015/0100982 A1 | 4/2015 | Sirpal et al. |
| 2015/0105125 A1 | 4/2015 | Min et al. |
| 2015/0112752 A1 | 4/2015 | Wagner et al. |
| 2015/0117162 A1 | 4/2015 | Tsai et al. |
| 2015/0160812 A1 | 6/2015 | Yuan et al. |
| 2015/0172438 A1 | 6/2015 | Yang |
| 2015/0242092 A1 | 8/2015 | Van Os et al. |
| 2015/0242989 A1 | 8/2015 | Mun et al. |
| 2015/0244805 A1 | 8/2015 | Hampiholi et al. |
| 2015/0254041 A1 | 9/2015 | Hoshihara et al. |
| 2015/0281945 A1 | 10/2015 | Seo et al. |
| 2015/0295901 A1 | 10/2015 | Woodward et al. |
| 2015/0301506 A1 | 10/2015 | Koumaiha |
| 2015/0366518 A1 | 12/2015 | Sampson |
| 2015/0379476 A1 | 12/2015 | Chaudhri et al. |
| 2016/0034148 A1 | 2/2016 | Wilson et al. |
| 2016/0034167 A1 | 2/2016 | Wilson et al. |
| 2016/0048296 A1 | 2/2016 | Gan et al. |
| 2016/0054710 A1 | 2/2016 | Jo et al. |
| 2016/0058336 A1 | 3/2016 | Blahnik et al. |
| 2016/0058337 A1 | 3/2016 | Blahnik et al. |
| 2016/0062572 A1 | 3/2016 | Yang et al. |
| 2016/0077495 A1 | 3/2016 | Brown et al. |
| 2016/0117141 A1 | 4/2016 | Ro et al. |
| 2016/0124626 A1 | 5/2016 | Lee et al. |
| 2016/0139798 A1 | 5/2016 | Takikawa et al. |
| 2016/0179310 A1 | 6/2016 | Chaudhri et al. |
| 2016/0182805 A1 | 6/2016 | Emmett et al. |
| 2016/0189444 A1 | 6/2016 | Madhok et al. |
| 2016/0224211 A1* | 8/2016 | Xu .................... G06F 3/0482 715/765 |
| 2016/0226713 A1 | 8/2016 | Dellinger et al. |
| 2016/0253065 A1 | 9/2016 | Platzer et al. |
| 2016/0269540 A1 | 9/2016 | Butcher et al. |
| 2016/0313913 A1 | 10/2016 | Leem et al. |
| 2016/0370879 A1 | 12/2016 | Sharma |
| 2017/0013408 A1 | 1/2017 | Grzywaczewski et al. |
| 2017/0039535 A1 | 2/2017 | Park et al. |
| 2017/0075305 A1 | 3/2017 | Ryu et al. |
| 2017/0147198 A1 | 5/2017 | Herz et al. |
| 2017/0169185 A1 | 6/2017 | Weng |
| 2017/0255169 A1 | 9/2017 | Lee et al. |
| 2017/0262158 A1 | 9/2017 | Webb |
| 2017/0277396 A1 | 9/2017 | Chung et al. |
| 2017/0336920 A1 | 11/2017 | Chan et al. |
| 2017/0337027 A1 | 11/2017 | Chan et al. |
| 2017/0344329 A1* | 11/2017 | Oh .................... G06F 3/0482 |
| 2017/0353815 A1 | 12/2017 | Jagannathan et al. |
| 2017/0357426 A1 | 12/2017 | Wilson et al. |
| 2017/0357427 A1 | 12/2017 | Wilson et al. |
| 2017/0357439 A1 | 12/2017 | Lemay et al. |
| 2017/0374205 A1 | 12/2017 | Panda |
| 2018/0108243 A1 | 4/2018 | Scherer |
| 2018/0150216 A1 | 5/2018 | Choi et al. |
| 2018/0164974 A1 | 6/2018 | Park |
| 2018/0225297 A1 | 8/2018 | Andrew et al. |
| 2018/0307388 A1 | 10/2018 | Chaudhri et al. |
| 2018/0321843 A1 | 11/2018 | Giannotti et al. |
| 2018/0350144 A1 | 12/2018 | Rathod |
| 2018/0356243 A1 | 12/2018 | Mehta et al. |
| 2019/0171349 A1 | 6/2019 | Van Os et al. |
| 2019/0173996 A1 | 6/2019 | Butcher et al. |
| 2019/0179514 A1 | 6/2019 | Van Os et al. |
| 2019/0235724 A1 | 8/2019 | Platzer et al. |
| 2019/0297478 A1 | 9/2019 | Langlois et al. |
| 2019/0320057 A1 | 10/2019 | Omernick et al. |
| 2019/0334782 A1 | 10/2019 | Dellinger et al. |
| 2019/0334907 A1 | 10/2019 | Rodden et al. |
| 2019/0369842 A1 | 12/2019 | Dolbakian et al. |
| 2020/0000035 A1 | 1/2020 | Calmer |
| 2020/0054549 A1 | 2/2020 | Paufique |
| 2020/0120170 A1 | 4/2020 | Amitay et al. |
| 2020/0142554 A1 | 5/2020 | Lin et al. |
| 2020/0159894 A1 | 5/2020 | Keen et al. |
| 2020/0182643 A1 | 6/2020 | Ludwig |
| 2020/0183572 A1 | 6/2020 | Moore et al. |
| 2020/0192683 A1 | 6/2020 | Lin et al. |
| 2020/0225843 A1 | 7/2020 | Herz et al. |
| 2020/0333945 A1 | 10/2020 | Wilson et al. |
| 2020/0348814 A1 | 11/2020 | Platzer et al. |
| 2020/0348822 A1 | 11/2020 | Dascola et al. |
| 2020/0356242 A1 | 11/2020 | Wilson et al. |
| 2020/0358897 A1 | 11/2020 | Dellinger et al. |
| 2020/0379615 A1 | 12/2020 | Chaudhri et al. |
| 2021/0109647 A1 | 4/2021 | Os et al. |
| 2021/0112152 A1 | 4/2021 | Omernick et al. |
| 2021/0132758 A1 | 5/2021 | Xu |
| 2021/0141506 A1 | 5/2021 | Chaudhri et al. |
| 2021/0195013 A1 | 6/2021 | Butcher et al. |
| 2021/0271374 A1 | 9/2021 | Chaudhri et al. |
| 2021/0289067 A1 | 9/2021 | Dellinger et al. |
| 2021/0311438 A1 | 10/2021 | Wilson et al. |
| 2022/0137765 A1 | 5/2022 | Platzer et al. |
| 2022/0202384 A1 | 6/2022 | Saiki et al. |
| 2022/0206649 A1 | 6/2022 | Chaudhri et al. |
| 2022/0377167 A1 | 11/2022 | Omernick et al. |
| 2022/0413684 A1 | 12/2022 | Van Os et al. |
| 2022/0417358 A1 | 12/2022 | Butcher et al. |

FOREIGN PATENT DOCUMENTS

| | | |
|---|---|---|
| AU | 2015101022 A4 | 9/2015 |
| CA | 2349649 A1 | 1/2002 |
| CA | 2800123 C | 7/2016 |
| CH | 700242 A2 | 7/2010 |
| CN | 1392977 A | 1/2003 |
| CN | 1464719 A | 12/2003 |
| CN | 1695105 A | 11/2005 |
| CN | 1773875 A | 5/2006 |
| CN | 1782685 A | 6/2006 |

(56) References Cited

FOREIGN PATENT DOCUMENTS

| | | |
|---|---|---|
| CN | 1786906 A | 6/2006 |
| CN | 1940833 A | 4/2007 |
| CN | 1998150 A | 7/2007 |
| CN | 101072410 A | 11/2007 |
| CN | 101308443 A | 11/2008 |
| CN | 101822020 A | 9/2010 |
| CN | 101827363 A | 9/2010 |
| CN | 101828411 A | 9/2010 |
| CN | 102081502 A | 6/2011 |
| CN | 102244676 A | 11/2011 |
| CN | 102446059 A | 5/2012 |
| CN | 102646081 A | 8/2012 |
| CN | 102801649 A | 11/2012 |
| CN | 103154849 A | 6/2013 |
| CN | 103210366 A | 7/2013 |
| CN | 103649897 A | 3/2014 |
| CN | 104281405 A | 1/2015 |
| CN | 104471532 A | 3/2015 |
| CN | 104580576 A | 4/2015 |
| CN | 105335087 A | 2/2016 |
| EP | 0163032 A2 | 12/1985 |
| EP | 0404373 A1 | 12/1990 |
| EP | 0626635 A2 | 11/1994 |
| EP | 0689134 A1 | 12/1995 |
| EP | 0844553 A1 | 5/1998 |
| EP | 1003098 A2 | 5/2000 |
| EP | 1143334 A2 | 10/2001 |
| EP | 1186997 A2 | 3/2002 |
| EP | 1517228 A2 | 3/2005 |
| EP | 1674976 A2 | 6/2006 |
| EP | 1724996 A2 | 11/2006 |
| EP | 2150031 A1 | 2/2010 |
| EP | 2911377 A1 | 8/2015 |
| EP | 2993602 A1 | 3/2016 |
| FR | 2819675 A1 | 7/2002 |
| GB | 2329813 A | 3/1999 |
| GB | 2407900 A | 5/2005 |
| JP | 6-208446 A | 7/1994 |
| JP | 8-221203 A | 8/1996 |
| JP | 9-73381 A | 3/1997 |
| JP | 9-101874 A | 4/1997 |
| JP | 9-258971 A | 10/1997 |
| JP | 9-292262 A | 11/1997 |
| JP | 9-297750 A | 11/1997 |
| JP | 10-40067 A | 2/1998 |
| JP | 10-214350 A | 8/1998 |
| JP | 11-508116 A | 7/1999 |
| JP | 2000-020213 A | 1/2000 |
| JP | 2001-92430 A | 4/2001 |
| JP | 2001-092586 A | 4/2001 |
| JP | 2001-318751 A | 11/2001 |
| JP | 2002-41197 A | 2/2002 |
| JP | 2002-41206 A | 2/2002 |
| JP | 2002-132412 A | 5/2002 |
| JP | 2002-149312 A | 5/2002 |
| JP | 2002-189567 A | 7/2002 |
| JP | 2002-525705 A | 8/2002 |
| JP | 2002-297514 A | 10/2002 |
| JP | 2002-312105 A | 10/2002 |
| JP | 2003-66941 A | 3/2003 |
| JP | 2003-139546 A | 5/2003 |
| JP | 2003-198705 A | 7/2003 |
| JP | 2003-248538 A | 9/2003 |
| JP | 2003-256142 A | 9/2003 |
| JP | 2003-271310 A | 9/2003 |
| JP | 2003-295994 A | 10/2003 |
| JP | 2003-536125 A | 12/2003 |
| JP | 2004-38260 A | 2/2004 |
| JP | 2004-70492 A | 3/2004 |
| JP | 2004-132741 A | 4/2004 |
| JP | 2004-152075 A | 5/2004 |
| JP | 2004-208217 A | 7/2004 |
| JP | 2004-341892 A | 12/2004 |
| JP | 2005-4396 A | 1/2005 |
| JP | 2005-4419 A | 1/2005 |
| JP | 2005-515530 A | 5/2005 |
| JP | 2005-198064 A | 7/2005 |
| JP | 2005-202703 A | 7/2005 |
| JP | 2005-227826 A | 8/2005 |
| JP | 2005-227951 A | 8/2005 |
| JP | 2005-228088 A | 8/2005 |
| JP | 2005-228091 A | 8/2005 |
| JP | 2005-309933 A | 11/2005 |
| JP | 2005-321915 A | 11/2005 |
| JP | 2005-327064 A | 11/2005 |
| JP | 2006-99733 A | 4/2006 |
| JP | 2006-155232 A | 6/2006 |
| JP | 2006-259376 A | 9/2006 |
| JP | 2007-25998 A | 2/2007 |
| JP | 2007-124667 A | 5/2007 |
| JP | 2007-132676 A | 5/2007 |
| JP | 2007-512635 A | 5/2007 |
| JP | 2007-334984 A | 12/2007 |
| JP | 2008-15698 A | 1/2008 |
| JP | 2008-503007 A | 1/2008 |
| JP | 2008-52705 A | 3/2008 |
| JP | 2008-102860 A | 5/2008 |
| JP | 2008-262251 A | 10/2008 |
| JP | 2008-304959 A | 12/2008 |
| JP | 2008-306667 A | 12/2008 |
| JP | 2009-9350 A | 1/2009 |
| JP | 2009-508217 A | 2/2009 |
| JP | 2009-136456 A | 6/2009 |
| JP | 2009-265929 A | 11/2009 |
| JP | 2009-277192 A | 11/2009 |
| JP | 2010-61402 A | 3/2010 |
| JP | 2010-97552 A | 4/2010 |
| JP | 2010-187096 A | 8/2010 |
| JP | 2010-538394 A | 12/2010 |
| JP | 2012-208645 A | 10/2012 |
| JP | 2013-25357 A | 2/2013 |
| JP | 2013-25409 A | 2/2013 |
| JP | 2013-47919 A | 3/2013 |
| JP | 2013-106271 A | 5/2013 |
| JP | 2013-120468 A | 6/2013 |
| JP | 2013-191234 A | 9/2013 |
| JP | 2013-203283 A | 10/2013 |
| JP | 2013-206274 A | 10/2013 |
| JP | 2013-211055 A | 10/2013 |
| JP | 2013-218698 A | 10/2013 |
| JP | 2014-503891 A | 2/2014 |
| KR | 10-2002-0010863 A | 2/2002 |
| KR | 10-0490373 B1 | 5/2005 |
| KR | 10-2009-0035499 A | 4/2009 |
| KR | 10-2009-0100320 A | 9/2009 |
| KR | 10-2010-0019887 A | 2/2010 |
| KR | 10-2011-0078008 A | 7/2011 |
| KR | 10-2011-0093729 A | 8/2011 |
| KR | 10-2012-0057800 A | 6/2012 |
| KR | 10-2012-0091495 A | 8/2012 |
| KR | 10-2013-0016329 A | 2/2013 |
| KR | 10-2015-0022599 A | 3/2015 |
| WO | 1996/006401 A1 | 2/1996 |
| WO | 1998/044431 A2 | 10/1998 |
| WO | 1999/038149 A1 | 7/1999 |
| WO | 2000/016186 A2 | 3/2000 |
| WO | 2001/46790 A2 | 6/2001 |
| WO | 2002/013176 A2 | 2/2002 |
| WO | 2003/060622 A2 | 7/2003 |
| WO | 2005/041020 A1 | 5/2005 |
| WO | 2005/055034 A1 | 6/2005 |
| WO | 2006/012343 A2 | 2/2006 |
| WO | 2006/020304 A2 | 2/2006 |
| WO | 2006/020305 A2 | 2/2006 |
| WO | 2006/092464 A1 | 9/2006 |
| WO | 2006/117438 A1 | 11/2006 |
| WO | 2006/119269 A2 | 11/2006 |
| WO | 2007/031816 A1 | 3/2007 |
| WO | 2007/032908 A1 | 3/2007 |
| WO | 2006/020304 A3 | 5/2007 |
| WO | 2007/069835 A1 | 6/2007 |
| WO | 2007/094894 A2 | 8/2007 |
| WO | 2007/142256 A1 | 12/2007 |
| WO | 2008/017936 A2 | 2/2008 |

(56) References Cited

FOREIGN PATENT DOCUMENTS

| WO | 2007/100944 | A3 | 8/2008 |
|----|-------------|----|--------|
| WO | 2008/114491 | A1 | 9/2008 |
| WO | 2009/032638 | A2 | 3/2009 |
| WO | 2009/032750 | A1 | 3/2009 |
| WO | 2009/089222 | A2 | 7/2009 |
| WO | 2011/126501 | A1 | 10/2011 |
| WO | 2012/078079 | A2 | 6/2012 |
| WO | 2013/017736 | A1 | 2/2013 |
| WO | 2013/149055 | A1 | 10/2013 |
| WO | 2013/157330 | A1 | 10/2013 |
| WO | 2016/025395 | A2 | 2/2016 |
| WO | 2016/126733 | A1 | 8/2016 |

OTHER PUBLICATIONS

Intention to Grant received for European Patent Application No. 16706081.3, dated Jun. 11, 2018, 7 pages.
Non-Final Office Action received for U.S. Appl. No. 14/261,112, dated Apr. 5, 2018, 40 pages.
Non-Final Office Action received for U.S. Appl. No. 15/153,617, dated Apr. 2, 2018, 12 pages.
Notice of Allowance received for U.S. Appl. No. 12/888,362, dated Apr. 11, 2018, 7 pages.
Office Action received for Australian Patent Application No. 2016215440, dated Mar. 13, 2018, 3 pages.
Office Action received for Chinese Patent Application No. 201410250648.4, dated Feb. 14, 2018, 6 pages (3 pages of English Translation and 3 pages of Official copy).
Office Action received for Chinese Patent Application No. 201410251370.2, dated Feb. 11, 2018, 14 pages (5 pages of English Translation and 9 pages of Official copy).
Office Action received for Chinese Patent Application No. 201410251400.X, dated Feb. 8, 2018, 6 pages (3 pages of English Translation and 3 pages of Official copy).
"Asus Eee News, Mods, and Hacks: Asus Eee PC Easy Mode Internet Tab Options Tour", Available online at <http://asuseeehacks.blogspot.com/2007/11/asus-eee-pc-user-interface-tour.html>, Nov. 10, 2007, 33 pages.
"Launch 'Em Version 3.1", Retrieved from the Internet <http://www.fladnag.net/downloads/telephone/palm/APPS/lnchem31/Documentation/LaunchEm.pdf>, 2001, pp. 1-39.
"Human Interface Principles", Macintosh Human Interface Guidelines (Chapter 1), 1995, pp. 3-14.
"Nokia 7710", Availble at <https://www.nokia.com/en_int/phones/sites/default/files/user-guides/Nokia_7710_UG_en.pdf>, 2005, pp. 1-153.
"SilverScreen Theme Library", Online Available at: <https://web.archive.org/web/20061113121041/http://www.pocketsensei.com/ss_themes.htm>, Nov. 13, 2006, 3 pages.
"SilverScreen User Guide", Online Available at: <https://web.archive.org/web/20061113121032/http://www.pocketsensei.com/ss_guide.htm>, Nov. 13, 2006, 12 pages.
"TH8000 Series Programmable Thermostats", Retrieved from the Internet: <URL:https://ia802507.us.archive.org/1/items/generalmanual_000075065/generalmanual_000075065.pdf>, 2004, 44 pages.
Advisory Action received for U.S. Appl. No. 12/689,834, dated Aug. 19, 2015, 3 pages.
Advisory Action received for U.S. Appl. No. 12/242,851, dated Nov. 15, 2013, 4 pages.
Advisory Action received for U.S. Appl. No. 12/888,362, dated May 7, 2013, 3 pages.
Advisory Action received for U.S. Appl. No. 12/888,362, dated Sep. 4, 2015, 3 pages.
Advisory Action received for U.S. Appl. No. 14/261,112, dated Apr. 23, 2015, 3 pages.
Advisory Action received for U.S. Appl. No. 14/710,125, dated Mar. 14, 2017, 3 pages.
Advisory Action received for U.S. Appl. No. 11/960,669, dated Nov. 3, 2011, 3 pages.

Apple Iphone School, "Customize 1.19 Update for the iPhone", 4:02 minutes video, available at <http://www.youtube.com/watch?v=5ogDzOM89oc>, uploaded on Dec. 8, 2007, 2 pages.
Apple Iphone School, "SummerBoard 3.0a9 for iPhone", 4:50 minutes video, available at <http://www.youtube.com/watch?v=s_P_9mrZTKs>, uploaded on Oct. 21, 2007, 2 pages.
Apple, "Iphone User Guide", iPhone first generation, Available at: <http://pocketpccentral.net/iphone/products/1g_iphone.htm>, released on Jun. 2007, 124 pages.
Apple, "IPhone User's Guide", Available at: <http://mesnotices.20minutes.fr/manuel-notice-mode-emploi/APPLE/IPHONE%2D%5FE#>, Jun. 2007, 137 pages.
Apple, "Keynote '08 User's Guide", © Apple Inc., 2008, 204 pages.
Barsch, Bill, "3D Desktop! TouchScreen and XGL on Linux", 2:42 minutes video, available at <http://www.youtube.com/watch?v=Yx9FgLr9oTk>, uploaded on Aug. 15, 2006, 2 pages.
Board Opinion received for Chinese Patent Application No. 200780041309.3, dated Apr. 1, 2016, 16 pages (9 pages of English Translation and 7 pages of Official copy).
Bott et al., "Table of Contents.Chapter 20: Putting Pictures on Folder Icons", MicrosoftWindows XP Inside Out Deluxe, Second Edition, Retrieved from: <http://proquest.safaribooksonline.com/book/operating-systems/9780735642171>, Oct. 6, 2004, pp. 1-8 and 669.
Brewster et al., "Multimodal 'Eyes-Free' Interaction Techniques Wearable Devices", CHI '2003, Interaction techniques for Constrained Displays, April 5-1 0, 2003, pp. 473-480.
Brewster et al., "Tactons: Structured Tactile Messages for Non-Visual Information Display", 5th Australasian User Interface Conference, 2004, pp. 15-23.
Brewster et al., "Using Non-Speech Sounds in Mobile Computing Devices", First Workshop on Human-Computer Interaction with Mobile Devices, 1998, pp. 1-3.
Brown et al., "Multidimensional Tactons for Non-Visual Information Presentation in Mobile Devices", MobileHCI'06, Proceedings of the 8th conference on Human-computer interaction with mobile devices and services, Sep. 12-15, 2006, pp. 231-238.
Cha, Bonnie, "HTC Touch Diamond (Sprint)", CNET Reviews, available at <http://www.cnet.com/products/htc-touch/>, updated on Sep. 12, 2008, 8 pages.
Collomb et al., "Improving drag-and-drop on wall-size displays", Proceedings of Graphics Interface, May 9, 2005, pp. 25-32.
Decision of Board of Appeal received for European Patent Application No. 09170697.8, dated Oct. 24, 2016, 24 pages.
Decision To Grant received for European Patent Application No. 09700333.9, dated Nov. 7, 2013, 2 pages.
Decision to Grant received for European Patent Application No. 12177813.8, dated Nov. 24, 2016, 3 pages.
Decision to refuse a European Patent application received for European Patent Application No. 06846840.4, dated Mar. 4, 2010, 10 pages.
Decision To Refuse Application received for European Patent Application No. 09170697.8, dated Oct. 23, 2013, 12 pages.
Decision To Refuse Patent Application received for European Patent Application No. 07814689.1, dated May 11, 2012, 15 pages.
Delltech, "Working with Graphics", Windows XP: The Complete Reference, Chapter 18, Apr. 5, 2005, 4 pages.
Expansystv, "HTC Touch Dual Demonstration by eXpansys", 5:26 minutes video, available at <http://www.youtube.com/watch?v=Tupk8MYLhMk>, uploaded on Oct. 1, 2007, 2 pages.
Extended European Search Report received for European Patent Application No. 09170697.8, dated Apr. 28, 2010, 3 pages.
Extended European Search Report received for European Patent Application No. 12177813.8, dated Feb. 1, 2013, 6 pages.
Extended European Search Report received for European Patent Application No. 12189764.9, dated Jan. 4, 2013, 6 pages.
Extended European Search Report received for European Patent Application No. 12194312.0, dated Jan. 16, 2013, 7 pages.
Extended European Search Report received for European Patent Application No. 12194315.3, dated Jan. 16, 2013, 7 pages.
Fadhley, Mohd Nazley, "LauncherX", Online Available at: <http://www.palmx.org/mambo/index2.php?option=com_content&task=view&id=65&1temid>, Nov. 21, 2002, 3 pages.

(56) References Cited

OTHER PUBLICATIONS

Final Office Action received for U.S. Appl. No. 11/620,686, dated Aug. 3, 2009, 11 pages.
Final Office Action received for U.S. Appl. No. 11/620,686, dated Jul. 12, 2010, 10 pages.
Final Office Action received for U.S. Appl. No. 11/620,687, dated Aug. 18, 2009, 7 pages.
Final Office Action received for U.S. Appl. No. 11/849,938, dated Jan. 30, 2013, 31 pages.
Final Office Action received for U.S. Appl. No. 11/849,938, dated May 27, 2011, 21 pages.
Final Office Action received for U.S. Appl. No. 11/850,010 dated Oct. 17, 2011, 11 pages.
Final Office Action received for U.S. Appl. No. 11/850,010, dated Apr. 18, 2016, 16 pages.
Final Office Action received for U.S. Appl. No. 11/850,010, dated Feb. 15, 2013, 12 pages.
Final Office Action received for U.S. Appl. No. 11/850,010, dated May 8, 2014, 11 pages.
Final Office Action received for U.S. Appl. No. 11/850,011, dated Dec. 1, 2010, 15 pages.
Final Office Action received for U.S. Appl. No. 11/960,669, dated Aug. 18, 2011, 13 pages.
Final Office Action received for U.S. Appl. No. 11/969,809, dated Jul. 14, 2011, 26 pages.
Final Office Action received for U.S. Appl. No. 12/006,172, dated Mar. 2, 2012, 16 pages.
Final Office Action received for U.S. Appl. No. 12/207,316, dated Feb. 15, 2013, 24 pages.
Final Office Action received for U.S. Appl. No. 12/207,316, dated Mar. 4, 2011, 32 pages.
Final Office Action received for U.S. Appl. No. 12/242,851, dated Dec. 12, 2011, 13 pages.
Final Office Action received for U.S. Appl. No. 12/242,851, dated Jul. 1, 2016, 90 pages.
Final Office Action received for U.S. Appl. No. 12/242,851, dated May 10, 2013, 20 pages.
Final Office Action received for U.S. Appl. No. 12/364,470, dated May 5, 2010, 16 pages.
Final Office Action received for U.S. Appl. No. 12/364,470, dated Oct. 19, 2011, 20 pages.
Final Office Action received for U.S. Appl. No. 12/689,834, dated Mar. 26, 2015, 30 pages.
Final Office Action received for U.S. Appl. No. 12/689,834, dated May 4, 2017, 41 pages.
Final Office Action received for U.S. Appl. No. 12/689,834, dated Oct. 15, 2012, 22 pages.
Final Office Action received for U.S. Appl. No. 12/888,362, dated Apr. 29, 2015, 12 pages.
Final Office Action received for U.S. Appl. No. 12/888,362, dated Jan. 3, 2013, 13 pages.
Final Office Action received for U.S. Appl. No. 12/888,375, dated Nov. 7, 2012, 14 pages.
Final Office Action received for U.S. Appl. No. 12/888,376, dated Feb. 8, 2013, 11 pages.
Final Office Action received for U.S. Appl. No. 14/142,648, dated Dec. 7, 2016, 12 pages.
Final Office Action received for U.S. Appl. No. 14/261,112, dated Aug. 10, 2017, 35 pages.
Final Office Action received for U.S. Appl. No. 14/261,112, dated Mar. 3, 2016, 31 pages.
Final Office Action received for U.S. Appl. No. 14/261,112, dated Oct. 9, 2014, 29 pages.
Final Office Action received for U.S. Appl. No. 14/710,125, dated Oct. 27, 2016, 13 pages.
Final Office Action received for U.S. Appl. No. 14/142,640, dated Mar. 8, 2016, 35 pages.
Fujitsu Ltd, "SX/G Manual of Icons on Desktop, Edition 14/14A V14", 1st Edition, Mar. 27, 1998, pp. 4 (Official Copy Only) {See Communication under 37 CFR § 1.98(a) (3)}.
Gade, Lisa, "HTC Touch (Sprint)—MobileTechReview", Smartphone Reviews by Mobile Tech Review, Available online at <http://www.mobiletechreview.com/phones/HTC-Touch.htm>, Nov. 2, 2007, 7 pages.
Gsmarena Team, "HTC Touch Review: Smart to Touch the Spot", Available online at <http://www.gsmarena.com/htc_touch-review-189.php>, Nov. 28, 2007, 18 pages.
Hayama et al., "Windows XP SP3 & SP2", To change images of scaled-down representation, Dec. 1, 2008, pp. 294-295. (2 pages of English Translation and 4 pages of official Copy).
Helal et al., "Drishti: An Integrated Navigation System for Visually Impaired and Disabled", Fifth International Symposium on Wearable Computers (ISWC'01), IEEE, 2001, pp. 149-156.
Huang et al., "Effects of Visual Vibratory Perception by Cross-Modali Matching with Tactile Sensation", Retrieved from the Internet: <URL:http://media.nuas.ac.jp/~robin/Research/ADC99.html>, 1999, pp. 1-7.
Intention to Grant received for European Patent Application No. 09700333.9, dated Jun. 20, 2013, Jun. 20, 2013, 7 pages.
Intention to Grant received for European Patent Application No. 12177813.8, dated Jul. 6, 20160, 8 pages.
Intention to Grant received for European Patent Application No. 12194312.0, dated Aug. 3, 2017, 8 pages.
Intention to Grant received for European Patent Application No. 12194315.3, dated May 31, 2017, 8 pages.
International Preliminary Report on Patentability received for PCT Patent Application No. PCT/US2006/062685, dated Jul. 1, 2008, 6 pages.
International Preliminary Report on Patentability received for PCT Patent Application No. PCT/US2007/077639, dated Mar. 10, 2009, 6 pages.
International Preliminary Report on Patentability received for PCT Patent Application No. PCT/US2007/077643, dated Mar. 10, 2009, 7 pages.
International Preliminary Report on Patentability received for PCT Patent Application No. PCT/US2008/050047, dated Sep. 15, 2009, 11 pages.
International Preliminary Report on Patentability received for PCT Patent Application No. PCT/US2008/050430, dated Jul. 7, 2009, 10 pages.
International Preliminary Report on Patentability received for PCT Patent Application No. PCT/US2008/074625, dated Mar. 9, 2010, 6 pages.
International Preliminary Report on Patentability received for PCT Patent Application No. PCT/US2009/030225, dated Jul. 6, 2 010, 10 pages.
International Preliminary Report on Patentability received for PCT Patent Application No. PCT/US2010/050056, dated Oct. 18, 2012, 21 pages.
International Preliminary Report on Patentability received for PCT Patent Application No. PCT/US2013/067634, dated May 12, 2016, 9 pages.
International Preliminary Report on Patentability received for PCT Patent Application No. PCT/US2014/040414, dated Dec. 23, 2015, 10 pages.
International Preliminary Report on Patentability received for PCT Patent Application No. PCT/US2016/016216 dated May 4, 2017, 14 pages.
International Search Report and Written Opinion received for PCT Patent Application No. PCT/US2007/077639, dated Jul. 8, 2008, 7 pages.
International Search Report and Written Opinion received for PCT Patent Application No. PCT/US2008/050047, dated Sep. 3, 2009, 15 pages.
International Search Report and Written Opinion received for PCT Patent Application No. PCT/US2008/050430, dated Sep. 1, 2008, 13 pages.
International Search Report and Written Opinion received for PCT Patent Application No. PCT/US2008/074625, dated Jan. 8, 2009, 8 pages.
International Search Report and Written Opinion received for PCT Patent Application No. PCT/US2009/030225, dated Feb. 25, 2010, 15 pages.

(56) References Cited

OTHER PUBLICATIONS

International Search Report and Written Opinion received for PCT Patent Application No. PCT/US2010/050056, dated May 13, 2011, 26 pages.
International Search Report and Written Opinion received for PCT Patent Application No. PCT/US2013/067634, dated Apr. 16, 2014, 11 pages.
International Search Report and Written Opinion received for PCT Patent Application No. PCT/US2014/040414, dated Sep. 16, 2014, 12 pages.
International Search Report and Written Opinion received for PCT Patent Application No. PCT/US2016/016216, dated Jun. 27, 2016, 18 pages.
International Search Report and Written Opinion received for PCT Patent Application No. PCTIUS2007/077643, dated May 8, 2008, 9 pages.
Invitation to Pay Addition Fees and Partial International Search Report received for PCT Patent Application No. PCT/US2016/016216, dated Apr. 20, 2016, 6 pages.
Invitation to Pay Additional Fees received for PCT Patent Application No. PCT/US2010/050056, dated Jan. 5, 2011.
Invitation to Restrict or Pay Additional Fees received for PCT Patent Application No. PCT/US2016/016216, dated Dec. 19, 2016, 9 pages.
Kondo, Daisuke, "Windows XP Tablet PC Edition Quick Review Challenging by Microsoft", PCfan No. 9, No. 28, Japan, Mainichi Communication, Oct. 15, 2002, pp. 12-17 {See Communication under 37 CFR § 1.98(a) (3)}.
Mac People, "Useful Technique for Web Browser", Ascii Media Works Inc., vol. 15, No. 6, Jun. 1, 2009, pp. 36-47 {See Communication under 37 CFR § 1.98(a) (3)}.
McGuffin et al., "Acquisition of Expanding Targets", ACM, Apr. 20-25, 2002, 8 pages.
Microsoft Help and Support, "How to Arrange or Move Icons on the Desktop", Available at: <http://support.microsoft.com/kb/289587>, Mar. 29, 2007, 2 pages.
Microsoft, "Working screenshot of Microsoft Office 2003", Aug. 19, 2003, 14 pages.
Miller, Matthew, "HTC Touch and TouchFLO Interface", 7:53 minutes video, available at <http://www.youtube.com/watch?v=6oUp4wOcUc4>, Uploaded on Jun. 6, 2007, 2 pages.
Nakata, Atsushi, "Tablet PC aiming at spread pen input by changing target user", Nikkei Windows for IT Professionals, Nikkei Business Publications, Inc. No. 69, Dec. 1, 2002, pp. 14-16 {See Communication under 37 CFR § 1.98(a) (3)}.
Naver Blog, "iPhone iOS 4 folder management", Jun. 27, 2010, 2 pages {See Communication under 37 CFR § 1.98(a) (3)}.
Nishida et al., "Drag-and-Guess: Drag-and-Drop with Prediction", INTERACT'07, Ifip Conference on Human-Computer interaction, Sep. 10, 2007, pp. 461-474.
Non Final Office Action received for U.S. Appl. No. 11/620,687, dated Dec. 22, 2008, 9 pages.
Non Final Office Action received for U.S. Appl. No. 11/620,687, dated Jan. 11, 2010, 9 pages.
Non Final Office Action received for U.S. Appl. No. 11/850,010, dated Dec. 17, 2014, 10 pages.
Non Final Office Action received for U.S. Appl. No. 12/006,172, dated Jun. 22, 2011, 23 pages.
Non Final Office Action received for U.S. Appl. No. 12/207,316, dated Aug. 25, 2010, 25 pages.
Non Final Office Action received for U.S. Appl. No. 12/207,316, dated Jun. 21, 2012, 29 pages.
Non Final Office Action received for U.S. Appl. No. 12/689,834, dated Aug. 26, 2016, 26 pages.
Non Final Office Action received for U.S. Appl. No. 12/689,834, dated May 24, 2012, 21 pages.
Non Final Office Action received for U.S. Appl. No. 14/142,640, dated Jun. 5, 2015, 29 pages.
Non-Final Office Action received for U.S. Appl. No. 11/459,602, dated Sep. 4, 2008, 13 pages.
Non-Final Office Action received for U.S. Appl. No. 11/620,686, dated Dec. 22, 2009, 10 pages.
Non-Final Office Action received for U.S. Appl. No. 11/620,686, dated Dec. 31, 2008, 17 pages.
Non-Final Office Action received for U.S. Appl. No. 11/849,938, dated Dec. 14, 2011, 26 pages.
Non-Final Office Action received for U.S. Appl. No. 11/849,938, dated Oct. 12, 2010, 19 pages.
Non-Final Office Action received for U.S. Appl. No. 11/850,010, dated Jul. 24, 2017, 19 pages.
Non-Final Office Action received for U.S. Appl. No. 11/850,010, dated Jun. 25, 2015, 10 pages.
Non-Final Office Action received for U.S. Appl. No. 11/850,010, dated May 16, 2012, 12 pages.
Non-Final Office Action received for U.S. Appl. No. 11/850,010, dated May 2, 2011, 10 pages.
Non-Final Office Action received for U.S. Appl. No. 11/850,010, dated Oct. 24, 2013, 13 pages.
Non-Final Office Action received for U.S. Appl. No. 11/850,011, dated Aug. 11, 2010, 19 pages.
Non-Final Office Action received for U.S. Appl. No. 11/960,669, dated Mar. 17, 2011, 23 pages.
Non-Final Office Action received for U.S. Appl. No. 11/969,809, dated Mar. 14, 2011, 25 pages.
Non-Final Office Action received for U.S. Appl. No. 12/242,851, dated Apr. 15, 2011, 20 pages.
Non-Final Office Action received for U.S. Appl. No. 12/242,851, dated Jun. 26, 2015, 33 pages.
Non-Final Office Action received for U.S. Appl. No. 12/242,851, dated Oct. 6, 2014, 27 pages.
Non-Final Office Action received for U.S. Appl. No. 12/242,851, dated Sep. 20, 2012, 19 pages.
Non-Final Office Action received for U.S. Appl. No. 12/364,470, dated Mar. 4, 2011, 17 pages.
Non-Final Office Action received for U.S. Appl. No. 12/364,470, dated Nov. 13, 2009, 15 pages.
Non-Final Office Action received for U.S. Appl. No. 12/364,470, dated Sep. 2, 2010, 26 pages.
Non-Final Office Action received for U.S. Appl. No. 12/689,834, dated Jun. 10, 2014, 25 pages.
Non-Final Office Action received for U.S. Appl. No. 12/788,278, dated Oct. 16, 2012, 19 pages.
Non-Final Office Action received for U.S. Appl. No. 12/888,362, dated Jul. 20, 2012, 15 pages.
Non-Final Office Action received for U.S. Appl. No. 12/888,362, dated Sep. 4, 2014, 10 pages.
Non-Final Office Action received for U.S. Appl. No. 12/888,366, dated Jul. 31, 2012, 10 pages.
Non-Final Office Action received for U.S. Appl. No. 12/888,370, dated Aug. 22, 2012, 13 pages.
Non-Final Office Action received for U.S. Appl. No. 12/888,373, dated Sep. 10, 2012, 12 pages.
Non-Final Office Action received for U.S. Appl. No. 12/888,375, dated Jun. 7, 2012, 11 pages.
Non-Final Office Action received for U.S. Appl. No. 12/888,375, dated Sep. 30, 2013, 10 pages.
Non-Final Office Action received for U.S. Appl. No. 12/888,376, dated Aug. 29, 2014, 12 pages.
Non-Final Office Action received for U.S. Appl. No. 12/888,376, dated Oct. 2, 2012, 12 pages.
Non-Final Office Action received for U.S. Appl. No. 12/888,377, dated Sep. 13, 2012, 13 pages.
Non-Final Office Action received for U.S. Appl. No. 13/104,903, dated Nov. 13, 2012, 9 pages.
Non-Final Office Action received for U.S. Appl. No. 13/104,911, dated Feb. 20, 2013, 11 pages.
Non-Final Office Action received for U.S. Appl. No. 14/142,648, dated Apr. 12, 2016, 11 pages.
Non-Final Office Action received for U.S. Appl. No. 14/261,112, dated Jul. 8, 2015, 29 pages.
Non-Final Office Action received for U.S. Appl. No. 14/261,112, dated Jun. 18, 2014, 25 pages.

(56) References Cited

OTHER PUBLICATIONS

Non-Final Office Action received for U.S. Appl. No. 14/261,112, dated Nov. 29, 2016, 34 pages.
Non-Final Office Action received for U.S. Appl. No. 14/710,125, dated Apr. 12, 2016, 12 pages.
Notice of Acceptance received for Australia Patent Application No. 2012261534, dated Jan. 6, 2015, 2 pages.
Notice of Acceptance received for Australian Patent Application No. 2012200475, dated Aug. 24, 2015, 2 pages.
Notice of Acceptance received for Australian Patent Application No. 2012202140, dated May 28, 2014, 2 pages.
Notice of Acceptance received for Australian Patent Application No. 2014204422, dated Apr. 28, 2016, 2 pages.
Notice of Acceptance received for Australian Patent Application No. 2014274556, dated Jul. 27, 2016, 2 pages.
Notice of Allowance received for Australian Patent Application No. 2010350739, dated Sep. 8, 2014, 2 pages.
Notice of Allowance received for Australian Patent Application No. 2015202076, dated Apr. 5, 2017, 3 pages.
Notice of Allowance received for Canadian Patent Application No. 2,845,297, dated Nov. 10, 2014, 1 page.
Notice of Allowance received for Canadian Patent Application No. 2,890,778, dated Apr. 24, 2017, 1 page.
Notice of Allowance received for Chinese Patent Application No. 200780041309.3, dated Jul. 31, 2017, 2 Pages (Official Copy only) {See Communication under 37 CFR § 1.98(a) (3)}.
Notice of Allowance received for Chinese Patent Application No. 200980000229.2, dated Oct. 24, 2014, 4 pages (2 pages of English Translation and 2 pages of Official Copy).
Notice of Allowance received for Chinese Patent Application No. 201010592864.9, dated Jan. 30, 2015, 4 pages (Official Copy Only) {See Communication under 37 CFR § 1.98(a) (3)}.
Notice of Allowance received for Japanese Patent Application No. 2009-051921, dated Jan. 20, 2014, 2 pages (Official Copy only) {See Communication under 37 CFR § 1.98(a) (3)}.
Notice of Allowance received for Japanese Patent Application No. 2013-127963, dated Oct. 9, 2015, 3 pages (1 page of English Translation and 2 pages of Official Copy).
Notice of Allowance received for Japanese Patent Application No. 2013-252338, dated Jun. 23, 2017, 3 pages (Only Official Copy) {See Communication under 37 CFR § 1.98(a) (3)}.
Notice of Allowance received for Japanese Patent Application No. 2014-139095, dated Apr. 1, 2016, 3 pages (Official Copy only) {See Communication under 37 CFR § 1.98(a) (3)}.
Notice of Allowance received for Japanese Patent Application No. 2015-532193, dated Jan. 23, 2017, 3 pages (Official Copy Only) {See Communication under 37 CFR § 1.98(a) (3)}.
Notice of Allowance received for Japanese Patent Application No. 2016-092789, dated Feb. 3, 2017, 3 pages (Official Copy Only) {See Communication under 37 CFR § 1.98(a) (3)}.
Notice of Allowance received for Japanese Patent Application No. 2017-042050, dated Apr. 24, 2017, 3 pages (Official Copy Only) {See Communication under 37 CFR § 1.98(a) (3)}.
Notice of Allowance received for Japanese Patent Application No. 2017-102031, dated Jun. 23, 2017, 3 pages (Official Copy Only) {See Communication under 37 CFR § 1.98(a) (3)}.
Notice of Allowance received for Japanese Patent Application No. 2013-011209, dated Jun. 13, 2016, 2 pages (Only Official Copy) {See Communication under 37 CFR § 1.98(a) (3)}.
Notice of Allowance received for Korean Patent Application No. 10-2011-7026583, dated Apr. 29, 2015, 3 pages (1 page of English Translation and 2 pages of Official Copy).
Notice of Allowance received for Korean Patent Application No. 10-2012-7029270, dated Sep. 23, 2014, 2 pages (Official Copy only) {See Communication under 37 CFR § 1.98(a) (3)}.
Notice of Allowance received for Korean Patent Application No. 10-2014-7011273, dated Apr. 28, 2015, 3 pages (1 page of English Translation and 2 pages of Official Copy).
Notice of Allowance received for Korean Patent Application No. 10-2014-7036624, dated Sep. 26, 2016, 3 pages (1 page of English Translation and 2 pages of Official Copy).
Notice of Allowance received for U.S. Appl. No. 11/459,602, dated Jan. 9, 2009, 6 pages.
Notice of Allowance received for U.S. Appl. No. 11/849,938, dated Nov. 27, 2013, 2 pages.
Notice of Allowance received for U.S. Appl. No. 11/849,938, dated Oct. 10, 2013, 28 pages.
Notice of Allowance received for U.S. Appl. No. 11/850,011, dated Feb. 11, 2011, 5 pages.
Notice of Allowance received for U.S. Appl. No. 11/850,011, dated Feb. 18, 2011, 4 pages.
Notice of Allowance received for U.S. Appl. No. 11/969,809, dated Apr. 26, 2013, 17 pages.
Notice of Allowance received for U.S. Appl. No. 12/242,851, dated Dec. 27, 2016, 20 pages.
Notice of Allowance received for U.S. Appl. No. 12/788,278, dated May 1, 2013, 8 pages.
Notice of Allowance received for U.S. Appl. No. 12/888,366, dated Dec. 14, 2012, 11 pages.
Notice of Allowance received for U.S. Appl. No. 12/888,370, dated Feb. 12, 2013, 10 pages.
Notice of Allowance received for U.S. Appl. No. 12/888,370, dated Jul. 1, 2014, 8 pages.
Notice of Allowance received for U.S. Appl. No. 12/888,373, dated Feb. 22, 2013, 12 pages.
Notice of Allowance received for U.S. Appl. No. 12/888,373, dated Jul. 1, 2014, 8 pages.
Notice of Allowance received for U.S. Appl. No. 12/888,376, dated May 29, 2015, 14 pages.
Notice of Allowance received for U.S. Appl. No. 12/888,377, dated Jan. 30, 2013, 12 pages.
Notice of Allowance received for U.S. Appl. No. 13/104,903, dated Apr. 29, 2013, 6 pages.
Notice of Allowance received for U.S. Appl. No. 13/104,911, dated Jun. 10, 2013, 6 pages.
Notice of Allowance received for U.S. Appl. No. 14/011,639, dated Feb. 16, 2016, 5 pages.
Notice of Allowance received for U.S. Appl. No. 14/011,639, dated Sep. 29, 2015, 11 pages.
Notice of Allowance received for U.S. Appl. No. 15/056,913, dated May 24, 2017, 19 pages.
Office Action received for Australian Patent Application No. 2014274556, dated Aug. 28, 2015, 2 pages.
Office Action received for Australian Patent Application No. 2009204252, dated Sep. 16, 2014, 6 pages.
Office Action received for Australian Patent Application No. 2012200475, dated Aug. 4, 2015, 3 pages.
Office Action received for Australian Patent Application No. 2012200475, dated Jun. 29, 2015, 3 pages.
Office Action received for Australian Patent Application No. 2012200475, dated Nov. 19, 2013, 4 pages.
Office Action received for Australian Patent Application No. 2012202140, dated Aug. 12, 2013, 2 pages.
Office Action received for Australian Patent Application No. 2012261534, dated Dec. 3, 2013, 3 pages.
Office Action Received for Australian Patent Application No. 2013404001, dated Aug. 3, 2017, 5 pages.
Office Action Received for Australian Patent Application No. 2013404001, dated Nov. 26, 2016, 3 pages.
Office Action received for Australian Patent Application No. 2014100582, dated Aug. 7, 2014, 5 pages.
Office Action received for Australian Patent Application No. 2014100582, dated Feb. 4, 2015, 3 pages.
Office Action received for Australian Patent Application No. 2014204422, dated Aug. 7, 2015, 3 pages.
Office Action received for Australian Patent Application No. 2014274537, dated Aug. 14, 2015, 3 pages.
Office Action received for Australian Patent Application No. 2014274537, dated Jul. 25, 2016, 3 pages.
Office Action received for Australian Patent Application No. 2015202076, dated May 5, 2016, 3 pages.

(56) References Cited

OTHER PUBLICATIONS

Office Action received for Australian Patent Application No. 2015215876, dated Aug. 1, 2016, 4 pages.
Office Action received for Australian Patent Application No. 2015215876, dated Jun. 28, 2017, 4 pages.
Office Action received for Australian Patent Application No. 2015215876, dated May 24, 2017, 4 pages.
Office Action received for Australian Patent Application No. 2016203168, dated Feb. 8, 2017, 2 pages.
Office Action received for Australian Patent Application No. 2016203309, dated Feb. 8, 2017, 11 pages.
Office Action received for Australian Patent Application No. 2016213886, dated May 18, 2017, 2 pages.
Office Action received for Canadian Patent Application No. 2,845,297, dated Apr. 23, 2014, 2 pages.
Office Action received for Canadian Patent Application No. 2,890,778, dated May 19, 2016, 6 pages.
Office Action received for Chinese Patent Application No. 200780041309.3, dated Feb. 8, 2017, 4 pages (1 page of English Translation and 3 pages of Official Copy).
Office Action received for Chinese Patent Application No. 200980000229.2, dated Jan. 6, 2014, 6 pages (3 pages of English Translation and 3 pages of Official Copy).
Office Action received for Chinese Patent Application No. 200980000229.2, dated Jun. 27, 2014, 7 pages (4 pages of English Translation and 3 pages of Official copy).
Office Action received for Chinese Patent Application No. 201310724733.5, dated Apr. 12, 2016, 14 pages (3 pages of English Translation and 11 pages of Official Copy).
Office Action received for Chinese Patent Application No. 201310724733.5, dated Apr. 21, 2017, 18 pages (5 pages of English Translation and 13 pages of Official Copy).
Office Action received for Chinese Patent Application No. 201310724733.5, dated Dec. 30, 2016, 13 pages (3 pages of English Translation and 10 pages of Official Copy).
Office Action received for Chinese Patent Application No. 201410250648.4, dated Jun. 29, 2017, 13 pages (5 pages of English Translation and 8 pages of Official Copy).
Office Action received for Chinese Patent Application No. 201410250648.4, dated Oct. 9, 2016, 6 pages (3 pages of English Translation and 3 pages of Official Copy).
Office Action received for Chinese Patent Application No. 201410250688.9, dated Jun. 1, 2017, 12 pages (5 pages of English Translation and 7 pages of Official Copy).
Office Action received for Chinese Patent Application No. 201410250688.9, dated Sep. 28, 2016, 7 pages (3 pages of English Translation and 4 pages of Official Copy).
Office Action received for Chinese Patent Application No. 201410251370.2, dated May 12, 2017, 8 pages (4 pages of English Translation and 4 pages of Official Copy).
Office Action received for Chinese Patent Application No. 201410251370.2, dated Sep. 5, 2016, 7 pages (3 pages of English Translation and 4 pages of Official Copy).
Office Action received for Chinese Patent Application No. 201410251400.X, dated Jul. 4, 2016, 8 Pages (2 pages of English Translation and 6 pages of Official Copy).
Office Action received for Chinese Patent Application No. 201410251400.X, dated May 26, 2017, 11 pages (3 pages of English Translation and 8 pages of Official Copy).
Office Action received for Chinese Patent Application No. 201480001676.0, dated May 12, 2017, 15 pages (5 pages of English Translation and 10 pages of Official Copy).
Office Action received for European Patent Application No. 06846840.4, dated Oct. 13, 2008, 3 pages.
Office Action received for European Patent Application No. 07814689.1, dated Mar. 4, 2011, 6 pages.
Office Action received for European Patent Application No. 08705639.6, dated Dec. 19, 2013, 7 pages.
Office Action received for European Patent Application No. 08829660.3, dated Aug. 2, 2013, 7 pages.
Office Action received for European Patent Application No. 08829660.3, dated Jul. 5, 2016, 5 pages.
Office Action received for European Patent Application No. 08829660.3, dated Oct. 15, 2010, 8 pages.
Office Action received for European Patent Application No. 09170697.8 dated Dec. 13, 2011, 4 pages.
Office Action received for European Patent Application No. 09170697.8, dated Mar. 3, 2017, 8 pages.
Office Action received for European Patent Application No. 09700333.9, dated Jun. 10, 2011, 5 pages.
Office Action received for European Patent Application No. 09700333.9, dated Nov. 26, 2010, 5 pages.
Office Action received for European Patent Application No. 10762813.3, dated Mar. 21, 2016, 6 pages.
Office Action Received for European Patent Application No. 12189764.9, dated Mar. 1, 2016, 6 pages.
Office Action received for European Patent Application No. 12194312.0, dated Jan. 13, 2014, 4 pages.
Office Action received for European Patent Application No. 12194312.0, dated Oct. 8, 2013, 5 pages.
Office Action received for European Patent Application No. 12194315.3, dated Jan. 13, 2014, 4 pages.
Office Action received for European Patent Application No. 12194315.3, dated Oct. 8, 2013, 5 pages.
Office Action received for Japanese Patent Application No. 2013-011209, dated Feb. 7, 2014, 3 pages (Official copy only) {See Communication under 37 CFR § 1.98(a) (3)}.
Office Action received for Japanese Patent Application No. 2013-011209, dated Nov. 2, 2015, 9 pages (2 pages of English Translation and 7 pages of Official Copy).
Office Action received for Japanese Patent Application No. 2013-011209, dated Oct. 27, 2014, 3 pages (Official Copy only) {See Communication under 37 CFR § 1.98(a) (3)}.
Office Action received for Japanese Patent Application No. 2013-127963, dated Aug. 15, 2014, 8 pages (6 pages of English Translation and 2 pages of Official Copy).
Office Action received for Japanese Patent Application No. 2013-127963, dated Mar. 10, 2014, 7 pages (4 pages of English Translation and 3 pages of Official copy).
Office Action received for Japanese Patent Application No. 2013-252338, dated Dec. 4, 2015, 4 pages (2 pages of English Translation and 2 pages of official copy).
Office Action received for Japanese Patent Application No. 2013-252338, dated Jan. 27, 2017, 10 pages (5 pages of English Translation and 5 pages of Official Copy).
Office Action received for Japanese Patent Application No. 2013-252338, dated Jan. 30, 2015, 4 pages (Official Copy only) {See Communication under 37 CFR § 1.98(a) (3)}.
Office Action received for Japanese Patent Application No. 2013-252338, dated Jun. 24, 2016, 4 pages (2 pages of English Translation and 2 pages of official copy).
Office Action received for Japanese Patent Application No. 2013-503721, dated Feb. 14, 2014, 8 pages (5 pages of English Translation and 3 pages of Official Copy).
Office Action received for Japanese Patent Application No. 2013-503721, dated Jun. 6, 2014, 3 pages (Official Copy only) {See Communication under 37 CFR § 1.98(a) (3)}.
Office Action received for Japanese Patent Application No. 2014-139095, dated Aug. 17, 2015, 6 pages (3 pages of English Translation and 3 pages of Official Copy).
Office Action received for Japanese Patent Application No. 2014-253365, dated Dec. 14, 2015, 6 pages (3 pages of English Translation and 3 pages Official Copy).
Office Action received for Japanese Patent Application No. 2014-253365, dated Jul. 18, 2017, 9 pages (4 page of English Translation and 5 pages of Official Copy).
Office Action received for Japanese Patent Application No. 2014-253365, dated Oct. 17, 2016, 11 pages (5 pages of English Translation and 6 pages of Official Copy).
Office Action received for Japanese Patent Application No. 2015-532193, dated Mar. 22, 2016, 7 pages (3 pages of English Translation and 4 pages of Official Copy).

(56) References Cited

OTHER PUBLICATIONS

Office Action received for Japanese Patent Application No. 2016-042767, dated Mar. 3, 2017, 10 pages (6 pages of English Translation and 4 pages of Official Copy).
Office Action received for Japanese Patent Application No. 2016-091460, dated Jun. 26, 2017, 6 pages (3 pages of English Translation and 3 pages of Official Copy).
Office Action received for Japanese Patent Application No. 2016-091460, dated Nov. 4, 2016, 6 pages (3 pages of English Translation and 3 pages of Official Copy).
Office Action received for Japanese Patent Application No. 2016-527367, dated Jul. 7, 2017,16 pages (8 pages of English Translation and 8 pages of Official Copy).
Office Action received for Korean Patent Application No. 10-2011-7026583, dated Aug. 14, 2014, 6 pages (2 pages of English Translation and 4 pages of Official Copy).
Office Action received for Korean Patent Application No. 10-2012-7029270, dated Dec. 4, 2013, 4 pages (Official Copy only) {See Communication under 37 CFR § 1.98(a) (3)}.
Office Action received for Korean Patent Application No. 10-2014-7011273, dated Aug. 14, 2014, 5 pages (2 pages of English Translation and 3 pages of Official Copy).
Office Action received for Korean Patent Application No. 10-2014-7036624, dated Jan. 29, 2016, 10 pages (5 pages of office action and 5 pages of English Translation).
Office Action received for Korean Patent Application No. 10-2016-7014051, dated Jun. 20, 2017, 16 pages (8 pages of English Translation and 8 pages of Official Copy).
Park, Will, "Apple iPhone v1.1.1 SpringBoard Hacked to Display Multiple Pages", Available at: <http://www.intomobile.com/2007/10/09/apple-iphone-v111-springboard-hacked-to-display-multiple-pages/>, Oct. 9, 2007, 5 pages.
Pcfan, "Boot Camp Introduction/Data Transition/Operability/Ability Truth Derived from Gap Mac&Win Dual Boot Hard Verification", Daily Communications, vol. 13, No. 14, Jun. 15, 2006, p. 57 (Japanese Language only) {See Communication under 37 CFR § 1.98(a) (3)}.
Pirhonen et al., "Gestural and Audio Metaphors as a Means of Control for Mobile Devices", CHI 2002, Proceedings of the SIGCHI Conference on Human Factors in Computing Systems, Apr. 20-25, 2002, pp. 291-298.
Ren et al., "The Adaptive Hybrid Cursor: A Pressure-Based Target Selection Technique for Pen-Based User interfaces", INTERACT '07, Proceedings of the 11th IFIP TC 13 International Conference on Human-Computer Interaction, Sep. 10, 2007, 14 pages.
Response to Notice of Opposition filed for Australian Patent Application No. 2009204252, dated Apr. 28, 2014, 4 pages.
Shima et al., "From basics of development to mashup/hardware interaction, a road to "takumi" of Android application-development, Section I, difference from prior platforms, things which can be done with Android" Software Design, Japan, Gijutsu-Hyohron Co., Ltd., Issue vol. 287, No. 221, Mar. 18, 2009, pp. 58-65 {See Communication under 37 CFR § 1.98(a) (3)}.
Shiota, Shinji, "Special Developer's Story", DOS/V magazine, vol. 13, No. 10, Jun. 1, 2004, pp. 156-161 {See Communication under 37 CFR § 1.98(a) (3)}.
Summons To Attend Oral Proceedings received for European Patent Application No. 06846840.4, dated May 18, 2009, 7 pages.
Summons to Attend Oral Proceedings received for European Patent Application No. 07814689.1, dated Dec. 1, 2011, 11 pages.
Summons to Attend Oral Proceedings received for European Patent Application No. 09170697.8 dated Apr. 22, 2013, 6 pages.
Summons to Attend Oral Proceedings received for European Patent Application No. 09170697.8, dated Jul. 29, 2016, 9 pages.
Summons to Attend Oral Proceedings received for European Patent Application No. 09700333.9, dated Sep. 21, 2012, 4 pages.
Summons to Attend Oral Proceedings received for European Patent Application No. 107628133, dated Nov. 9, 2016, 9 pages.
Summons to Oral Proceedings received for European Patent Application No. 12194312.0, dated Dec. 8, 2016, 9 pages.
Summons to Oral Proceedings received for European Patent Application No. 12194315.3, dated Dec. 8, 2016, 9 pages.
Supplemental Notice of Allowance received for U.S. Appl. No. 11/850,011, dated Feb. 24, 2011, 6 pages.
Takahashi, Masaaki, "Inside Macintosh, Mystery of File V, Mystery of Drag & Drop", NikkeiMAC, Nikkei Business Publications Inc., vol. 17, Aug. 15, 1994, pp. 212-217 {See Communication under 37 CFR § 1.98(a) (3)}.
Tooeasytoforget, "iPhone—Demo of SummerBoard & Its Features", 5:05 minutes video, Available at: <http://www.youtube.com/watch?v=CJOb3ftQLac>, Uploaded on Sep. 24, 2007, 2 pages.
Williamson et al., "Shoogle: Excitatory Multimodal Interaction on Mobile Devices", CHI, Apr. 28-May 3, 2007, San Jose, California, pp. 121-124.
Windows XP, "Enable or Disable Auto Arrange desktop icons in Windows XP", Windows Tutorials, http://www.freemailtutorials.com/microsoftWindows/autoArrangeIconsOnTheDesktop.php, Nov. 19, 2009, 3 pages.
Wright, Ben, "Palm OS PDA Application Mini-Reviews", Online Available at <http://library.indstate.edu/newsletter/feb04/palmmini.htm>, Feb. 3, 2015, 11 pages.
Written Opinion Issued from International Preliminary Examining Authority for PCT Application No. PCT/US2016/016216, dated Feb. 20, 2017, 12 pages.
Xiaoyu et al., "Mobile Browsable Information Access for the Visually Impaired", AMCIS 2004 Proceedings. Paper 424, Dec. 31, 2004.
Zhang et al., "An Ergonomics Study of Menu-Operation on Mobile Phone Interface", In Proceedings of the workshop on Intelligent Information Technology Application, 2007, pp. 247-251.
Zhao et al., "EarPod: Eyes-free Menu Selection using Touch Input and Reactive Audio Feedback", CHI 2007 Proceedings of Alternative Interaction, Apr. 28-May 3, 2007, pp. 1395-1404.
Corrected Notice of Allowance received for U.S. Appl. No. 12/689,834, dated May 17, 2018, 2 pages.
Non-Final Office Action received for U.S. Appl. No. 15/033,551, dated May 24, 2018, 26 pages.
Office Action received for Chinese Patent Application No. 201310724733.5, dated Apr. 9, 2018, 11 pages (2 pages of English Translation and 9 pages of Official copy).
Office Action received for Chinese Patent Application No. 201380080659.6, dated Apr. 4, 2018, 15 pages (5 pages of English Translation and 10 pages of Official Copy).
Office Action received for Japanese Patent Application No. 2016-527367, dated Feb. 26, 2018,15 pages (8 pages of English Translation and 7 pages of Official Copy).
Minutes of Meeting received for European Patent Application No. 09170697.8, dated Jul. 10, 2018, 6 pages.
Notice of Allowance received for Chinese Patent Application No. 201410251400.X, dated Aug. 20, 2018, 3 pages (1 page of English Translation and 2 pages of Official Copy).
Office Action received for Chinese Patent Application No. 201310724733.5, dated Aug. 15, 2018, 2 pages (1 page of English Translation and 1 page of Official copy).
Office Action received for Danish Patent Application No. PA201670595, dated Aug. 23, 2018, 5 pages.
Office Action received for Japanese Patent Application No. 2017-204561, dated Aug. 6, 2018, 7 pages (4 pages of English Translation and 3 pages of Official copy).
Office Action received for Japanese Patent Application No. 2017-223021, dated Jul. 30, 2018, 12 pages (6 pages of English Translation and 6 pages of Official copy).
Higuchi, Tadahiro. "Making a cool application with Visual Basic 6.0", 1st edition, Japan, AI Publishing, AI Mook 221, Jul. 16, 1999, 23 pages (Official Copy Only) (See Communication under 37 CFR § 1.98(a) (3)).
Non-Final Office Action received for U.S. Appl. No. 15/426,836, dated Oct. 18, 2018, 40 pages.
Notice of Allowance received for Japanese Patent Application No. 2016-091460, dated Oct. 9, 2018, 3 pages (1 page of English Translation and 2 pages of Official Copy).

(56) References Cited

OTHER PUBLICATIONS

Office Action received for Chinese Patent Application No. 201310724733.5, dated Aug. 28, 2018, 6 pages (3 pages of English Translation and 3 pages of Official copy).
Summons to Attend Oral Proceedings received for European Patent Application No. 13795330.3, dated Oct. 19, 2018, 13 pages.
Gsmarena Team, "HTC Touch review", Online Available at: <twww.gsmarena.com/htc_touch-review-189p3.php>, Nov. 28, 2007, 5 pages.
Mobilissimo.Ro, "HTC Touch—Touch FLO Demo", Online Available at: «https://www.youtube.com/watch?v=YQ8TQ9Rr_7E>, Jun. 5, 2007, 1 page.
Examiner's Pre-review report received for Japanese Patent Application No. 2014-253365, dated Dec. 12, 2017, 7 pages (3 page of English Translation and 4 pages of Official Copy).
Intention to Grant received for European Patent Application No. 10762813.3, dated Dec. 18, 2017, 11 pages.
Notice of Allowance received for U.S. Appl. No. 12/689,834, dated Jan. 17, 2018, 9 pages.
Office Action received for Japanese Patent Application No. 2016-091460, dated Nov. 27, 2017, 7 pages (4 pages of English Translation and 3 pages of Official Copy).
Corrected Notice of Allowance received for U.S. Appl. No. 12/888,362, dated Apr. 25, 2018, 3 pages.
Examiner's Answer to Appeal Brief received for U.S. Appl. No. 14/142,648, dated Apr. 10, 2018, 15 pages.
Decision To Refuse Application received for European Patent Application No. 09170697.8, dated Jul. 10, 2018, 31 pages.
Final Office Action received for U.S. Appl. No. 14/863,069, dated Jul. 5, 2018, 19 pages.
Office Action received for Japanese Patent Application No. 2016-091460, dated Jun. 1, 2018, 3 pages (1 pages of English Translation and 2 pages of Official Copy).
Decision to Grant Received for European Patent Application No. 12194315.3, dated Oct. 12, 2017, 2 pages.
Office Action received for Danish Patent Application No. PA201670595, dated Nov. 25, 2016, 9 pages.
Office Action received for Danish Patent Application No. PA201670595, dated May 31, 2017, 3 Pages.
Non-Final Office Action received for U.S. Appl. No. 14/863,069, dated Oct. 5, 2017, 19 pages.
Office Action received for European Patent Application No. 13795330.3, dated Oct. 9, 2017, 8 pages.
Office Action received for European Patent Application No. 14734674.6, dated Oct. 5, 2017, 6 pages.
Notice of Allowance received for U.S. Appl. No. 12/364,470, dated Nov. 24, 2017, 9 pages.
Summons to Attend Oral Proceedings received for European Application No. 09170697.8, dated Oct. 19, 2017, 12 pages.
Extended European Search Report received for European Patent Application No. 17210062.0, dated Feb. 20, 2018, 12 pages.
Notice of Acceptance received for Australian Patent Application No. 2016203168, dated Feb. 14, 2018, 3 pages.
Notice of Acceptance received for Australian Patent Application No. 2016203309, dated Feb. 14, 2018, 3 pages.
Notice of Acceptance received for Australian Patent Application No. 2016213886, dated Feb. 9, 2018, 3 pages.
Notice of Acceptance received for Australian Patent Application No. 2017276153, dated Feb. 19, 2018, 4 pages.
Office Action received for Australian Patent Application No. 2017201768, dated Feb. 28, 2018, 4 pages.
Turetta, Jonathan, "Steve Jobs iPhone 2007 Presentation (HD)", Retrieved from the Internet: URL:https://www.youtube.com/watch?v=vN4U5FqrOdQ&feature=youtu.be, May 13, 2013, 2 pages.
Decision To Grant received for European Patent Application No. 10762813.3, dated May 11, 2018, 3 pages.
Final Office Action received for U.S. Appl. No. 11/850,010, dated May 11, 2018, 24 pages.
Office Action received for Chinese Patent Application No. 201480001676.0, dated Mar. 20, 2018, 12 pages (3 pages of English Translation and 9 pages of Official Copy).

Office Action received for Korean Patent Application No. 10-2016-7014051, dated Apr. 30, 2018, 14 pages (7 pages of English Translation and 7 pages of Official Copy).
Intention to Grant received for European Patent Application No. 16706081.3, dated Jul. 18, 2018, 8 pages.
Office Action received for Australia Patent Application No. 2017202587, dated Jul. 4, 2018, 4 pages.
Jobs, Steve, "iPhone Introduction in 2007 (Complete)", Online available at <https://www.youtube.com/watch?v=9hUlxyE2Ns8>, Jan. 10, 2013, 3 pages.
Notice of Allowance received for Chinese Patent Application No. 201410250648.4, dated Aug. 20, 2018, 2 pages (1 page of English Translation and 1 page of Official copy).
Notice of Allowance received for Chinese Patent Application No. 201410250688.9, dated May 21, 2018, 3 pages (1 page of English Translation and 2 pages of Official copy).
Notice of Allowance received for Chinese Patent Application No. 201410251370.2, dated Jul. 31, 2018, 2 pages (1 page of English Translation and 1 page of Official copy).
Office Action received for Canadian Patent Application No. 2,983,178, dated Aug. 16, 2018, 5 pages.
Corrected Notice of Allowance received for U.S. Appl. No. 12/689,834, dated Feb. 8, 2018, 4 pages.
Decision to Grant received for European Patent Application No. 12194312.0, dated Feb. 1, 2018, 2 pages.
Examiner's Answer to Appeal Brief received for U.S. Appl. No. 14/710,125, dated Jan. 26, 2018, 6 pages.
Extended European Search Report received for European Patent Application No. 17198398.4, dated Feb. 8, 2018, 8 pages.
Notice of Acceptance received for Australian Patent Application No. 2017276153, dated Jan. 17, 2018, 3 pages.
Office Action received for Chinese Patent Application No. 201310724733.5, dated Oct. 30, 2017, 14 pages (3 pages of English Translation and 11 pages of Official Copy).
Office Action received for Chinese Patent Application No. 201410250688.9, dated Nov. 16, 2017, 6 pages (3 pages of English Translation and 3 pages of Official Copy).
Office Action received for Japanese Patent Application No. 2014-253365, dated Aug. 31, 2018, 6 pages (3 pages of English Translation and 3 pages of Official Copy).
Advisory Action received for U.S. Appl. No. 14/261,112, dated Nov. 30, 2017, 3 pages.
Clifton, Marc, "Detect if Another Process is Running and Bring It to the Foreground", Available at <https://www.codeproject.com/Articles/2976/Detect-if-another-process-is-running-andbring-it>, Sep. 30, 2002, 6 pages.
cocoabuilder.com, "Single Instance of a Cocoa Application", Available at: <http://www.cocoabuilder.com/archive/cocoa/167892-single-instance-of-cocoa-application.html>, Jul. 19, 2006, 4 pages.
Deanhill, "Run a Program or Switch to an Already Running Instance", Available at <https://autohotkey.com/board/topic/7129-run-a-program-or-switch-to-an-alreadyrunninginstance/>, Feb. 1, 2006, 16 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2017/035331, dated Oct. 6, 2017, 18 pages.
International Search Report and Written Opinion received for PCT Patent Application No. PCT/US2017/037057, dated Aug. 29, 2017, 26 pages.
Invitation to Pay Additional Fee received for PCT Patent Application No. PCT/US2017/035331, dated Aug. 7, 2017, 4 pages.
Notice of Acceptance received for Australian Patent Application No. 2013404001, dated Nov. 21, 2017, 3 pages.
Office Action received for Australian Patent Application No. 2015215876, dated Jul. 26, 2017, 6 pages.
Office Action received for Danish Patent Application No. PA201670595, dated Nov. 30, 2017, 4 pages.
Final Office Action received for U.S. Appl. No. 11/850,010, dated Aug. 14, 2018, 21 pages.

(56) References Cited

OTHER PUBLICATIONS

Notice of Allowance received for Japanese Patent Application No. 2016-527367, dated Jul. 30, 2018, 4 pages (1 page of English Translation and 3 pages of Official Copy).
Decision to Grant received for European Patent Application No. 16706081.3, dated Nov. 29, 2018, 2 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2017/035331, dated Dec. 20, 2018, 13 pages.
Non-Final Office Action received for U.S. Appl. No. 15/418,537, dated Dec. 13, 2018, 53 pages.
Notice of Acceptance received for Australian Patent Application No. 2017201768, dated Nov. 21, 2018, 3 pages.
Notice of Allowance received for Japanese Patent Application No. 2014-253365, dated Nov. 26, 2018, 3 pages (1 page of English Translation and 2 pages of Official Copy).
Notice of Allowance received for Korean Patent Application No. 10-2016-7014051, dated Nov. 27, 2018, 4 pages (1 page of English Translation and 3 pages of Official Copy).
Notice of Allowance received for U.S. Appl. No. 15/153,617, dated Nov. 23, 2018, 10 pages.
Office Action received for Chinese Patent Application No. 201380080659.6, dated Oct. 26, 2018, 11 pages (3 pages of English Translation and 8 pages of Official Copy).
Office Action received for Japanese Patent Application No. 2017-204561, dated Nov. 6, 2018, 8 pages (4 pages of English Translation and 4 pages of Official Copy).
Notice of Acceptance received for Australian Patent Application No. 2018200272, dated Apr. 23, 2019, 3 pages.
Notice of Allowance received for U.S. Appl. No. 14/710,125, dated May 7, 2019, 9 pages.
Office Action received for Australian Patent Application No. 2017202587, dated Apr. 26, 2019, 4 pages.
Office Action received for Australian Patent Application No. 2018203512, dated Apr. 15, 2019, 4 pages.
Final Office Action received for U.S. Appl. No. 14/261,112, dated Nov. 7, 2018, 34 pages.
Notice of Allowance received for U.S. Appl. No. 15/033,551, dated Nov. 14, 2018, 10 pages.
Office Action received for Japanese Patent Application No. 2017-142812, dated Nov. 2, 2018, 6 pages (3 pages of English Translation and 3 pages of Official Copy).
Stinson, Craig, Windows 95 Official Manual, ASCII Ltd., ver.1, Mar. 1, 1996, pp. 128-129, (Official Copy Only) (see attached 37 CFR § 1.98(a) (3)).
International Preliminary Report on Patentability received for PCT Patent Application No. PCT/US2017/037057, dated Dec. 27, 2018, 24 pages.
Notice of Allowance received for Chinese Patent Application No. 201310724733.5, dated Dec. 27, 2018, 2 pages (1 page of English translation and 1 page of Official Copy).
Office Action received for Australian Patent Application No. 2018200272, dated Jan. 17, 2019, 2 pages.
Office Action received for Chinese Patent Application No. 201480001676.0, dated Nov. 27, 2018, 8 pages (1 page of English Translation and 7 pages of Official Copy).
Office Action received for European Patent Application No. 08829660.3, dated Jan. 11, 2019, 7 pages.
Office Action Received for European Patent Application No. 12189764.9, dated Jan. 21, 2019, 7 pages.
Office Action received for European Patent Application No. 17210062.0, dated Jan. 3, 2019, 6 pages.
Office Action received for Japanese Patent Application No. 2017-223021, dated Apr. 8, 2019, 7 pages (3 pages of English Translation and 4 pages of Official Copy).

Office Action received for Korean Patent Application No. 10-2019-7005262, dated May 3, 2019, 5 pages (2 pages of English Translation and 3 pages of Official Copy).
Extended European Search Report received for European Patent Application No. 18213157.3, dated Apr. 12, 2019, 8 pages.
Notice of Allowance received for U.S. Appl. No. 14/710,125, dated Apr. 19, 2019, 8 pages.
Office Action received for Chinese Patent Application No. 201380080659.6, dated Mar. 4, 2019, 9 pages (5 pages of English Translation and 4 pages of Official Copy).
Supplemental Notice of Allowance received for U.S. Appl. No. 14/863,069, dated Mar. 29, 2019, 3 pages.
Intention to Grant received for European Patent Application No. 17198398.4, dated Jan. 28, 2019, 8 pages.
Notice of Allowance received for U.S. Appl. No. 14/863,069, dated Feb. 6, 2019, 6 pages.
Notice of Allowance received for U.S. Appl. No. 11/850,010, dated Feb. 6, 2019, 25 pages.
Office Action received for Australian Patent Application No. 2016215440, dated Jan. 22, 2019, 2 pages.
Extended European Search Report received for European Patent Application No. 17810739.7, dated Mar. 22, 2019, 9 pages.
Final Office Action received for U.S. Appl. No. 15/426,836, dated Mar. 29, 2019, 49 pages.
Feist, Jonathan, "Android customization—how to create a custom clock widget using Zooper Widget", Available Online at: https://www.androidauthority.com/zooper-widget-clock-366476/, May 15, 2014, 10 pages.
"Qualcomm Toq—smartwatch—User Manual", Available Online at: https://toq.qualcomm.com/sites/default/files/qualcomm_toq_user_manual.pdf, 2013, pp. 1-38.
Office Action received for European Patent Application No. 14734674.6, dated Aug. 30, 2019, 6 pages.
Decision on Appeal received for U.S. Appl. No. 14/710,125, dated Mar. 11, 2019, 7 pages.
Non-Final Office Action received for U.S. Appl. No. 15/421,865, dated Mar. 21, 2019, 18 pages.
Notice of Acceptance received for Australian Patent Application No. 2016215440, dated Feb. 28, 2019, 3 pages.
Notice of Allowance received for Japanese Patent Application No. 2017-204561, dated Mar. 12, 2019, 4 pages (1 page of English Translation and 3 pages of Official Copy).
Supplemental Notice of Allowance received for U.S. Appl. No. 14/863,069, dated Mar. 1, 2019, 3 pages.
Board Opinion received for Chinese Patent Application No. 201480001676.0, dated Oct. 21, 2019, 10 pages (1 page of English Translation and 9 pages of Official Copy).
Examiner's Answer to Appeal Brief received for U.S. Appl. No. 14/261,112, dated Oct. 29, 2019, 10 pages.
Extended European Search Report received for European Patent Application No. 17810723.1, dated Nov. 12, 2019, 9 pages.
Non-Final Office Action received for U.S. Appl. No. 16/020,804, dated Nov. 20, 2019, 13 pages.
Notice of Acceptance received for Australian Patent Application No. 2017202587, dated Nov. 6, 2019, 3 pages.
Office Action received for Japanese Patent Application No. 2017-223021, dated Sep. 24, 2019, 6 pages (3 pages of English Translation and 3 pages of Official Copy).
Office Action received for Japanese Patent Application No. 2018-201088, dated Oct. 11, 2019, 9 pages (5 pages of English Translation and 4 pages of Official Copy).
Summons to Attend Oral Proceedings received for European Patent Application No. 17210062.0, dated Oct. 30, 2019, 7 pages.
Decision on Acceptance received for Australian Patent Application No. 2017202587, dated Oct. 8, 2019, 19 pages.
Decision on Appeal received for U.S. Appl. No. 14/142,640, dated Oct. 7, 2019, 9 pages.
Final Office Action received for U.S. Appl. No. 15/418,537, dated Sep. 23, 2019, 53 pages.
Office Action received for Chinese Patent Application No. 201680008151.9, dated Aug. 27, 2019, 24 pages (11 pages of English Translation and 13 pages of Official Copy).

(56) References Cited

OTHER PUBLICATIONS

Office Action received for Australian Patent Application No. 2017277851, dated Jul. 5, 2019, 3 pages.
Intention to Grant received for European Patent Application No. 13795330.3, dated Aug. 9, 2019, 13 pages.
Minutes of the Oral Proceedings received for European Patent Application No. 13795330.3, dated Aug. 2, 2019, 7 pages.
Notice of Allowance received for Japanese Patent Application No. 2017-142812, dated Jul. 19, 2019, 4 pages (1 page of English Translation and 3 pages of Official copy).
Notice of Allowance received for Chinese Patent Application No. 201380080659.6, dated Jul. 29, 2019, 2 pages (1 pages of English Translation and 1 pages of Official Copy).
Applicant-Initiated Interview Summary received for U.S. Appl. No. 15/418,537, dated Dec. 23, 2019, 6 pages.
Notice of Acceptance received for Australian Patent Application No. 2017277851, dated Dec. 9, 2019, 3 pages.
Notice of Allowance received for U.S. Appl. No. 15/426,836, dated Dec. 16, 2019, 16 pages.
Office Action received for Japanese Patent Application No. 2018-121118, dated Nov. 18, 2019, 10 pages (5 pages of English Translation and 5 pages of Official Copy).
Extended European Search Report received for European Patent Application No. 17813879.8, dated Jan. 8, 2020, 8 pages.
Extended European Search Report received for European Patent Office Application No. 19176224.4, dated Dec. 13, 2019, 7 pages.
Office Action received for Australian Patent Application No. 2019200692, dated Dec. 24, 2019, 2 pages.
Office Action received for European Patent Application No. 08829660.3, dated Jan. 3, 2020, 6 pages.
Notice of Acceptance received for Australian Patent Application No. 2018203512, dated Jul. 26, 2019, 3 pages.
Office Action received for Australian Patent Application No. 2017202587, dated Jul. 4, 2019, 4 pages.
Office Action received for Canadian Patent Application No. 2,983,178, dated Jul. 22, 2019, 6 pages,.
Supplemental Notice of Allowance received for U.S. Appl. No. 14/863,069, dated Aug. 15, 2019, 3 pages.
Applicant-Initiated Interview Summary received for U.S. Appl. No. 15/421,865, dated Feb. 3, 2020, 5 pages.
Corrected Notice of Allowance received for U.S. Appl. No. 14/142,640, dated Feb. 5, 2020, 4 pages.
Decision to Grant received for European Patent Application No. 13795330.3, dated Jan. 16, 2020, 2 pages.
Pre-interview First Office Action received for U.S. Appl. No. 16/270,801, dated Feb. 10, 2020, 5 pages.
Pre-interview First Office Action received for U.S. Appl. No. 16/270,902, dated Feb. 10, 2020, 5 pages.
Decision to Grant received for European Patent Application No. 17198398.4, dated Jun. 14, 2019, 3 pages.
Notice of Allowance received for U.S. Appl. No. 14/863,069, dated Jun. 18, 2019, 6 pages.
Office Action received for Australian Patent Application No. 2017277813, dated Jun. 11, 2019, 3 pages.
Office Action received for Japanese Patent Application No. 2018-121118, dated May 14, 2019, 10 pages (5 pages of English Translation and 5 pages of Official Copy).
Final Office Action received for U.S. Appl. No. 15/421,865, dated Dec. 2, 2019, 19 pages.
Notice of Allowance received for U.S. Appl. No. 14/142,640, dated Dec. 11, 2019, 7 pages.
Office Action received for Korean Patent Application No. 10-2011-7026583, dated Oct. 25, 2013, 4 pages (1 page of English Translation and 3 pages of Official Copy).
Record of Oral Hearing received for U.S. Appl. No. 14/142,640, dated Nov. 20, 2019, 15 pages.
Advisory Action received for U.S. Appl. No. 15/421,865, dated Apr. 16, 2020, 7 pages.
Applicant Initiated Interview Summary received for U.S. Appl. No. 16/270,801, dated Mar. 11, 2020, 3 pages.
Applicant Initiated Interview Summary received for U.S. Appl. No. 16/270,902, dated Mar. 11, 2020, 3 pages.
Applicant-Initiated Interview Summary received for U.S. Appl. No. 16/020,804, dated Apr. 13, 2020, 3 pages.
Decision on Appeal received for U.S. Appl. No. 14/142,648, dated Feb. 28, 2020, 6 pages.
Non-Final Office Action received for U.S. Appl. No. 16/267,817, dated Apr. 15, 2020, 25 pages.
Non-Final Office Action received for U.S. Appl. No. 16/270,801, dated Mar. 27, 2020, 11 pages.
Non-Final Office Action received for U.S. Appl. No. 16/270,902, dated Mar. 27, 2020, 11 pages.
Non-Final Office Action received for U.S. Appl. No. 16/407,590, dated Apr. 10, 2020, 12 pages.
Notice of Acceptance received for Australian Patent Application No. 2019200692, dated Apr. 7, 2020, 3 pages.
Notice of Allowance received for Korean Patent Application No. 10-2019-7005262, dated Mar. 25, 2020, 5 pages (2 pages of English Translation and 3 pages of Official Copy).
Notice of Allowance received for U.S. Appl. No. 14/142,648, dated Mar. 13, 2020, 5 pages.
Notice of Allowance received for U.S. Appl. No. 15/418,537, dated Apr. 6, 2020, 9 pages.
Notice of Allowance received for U.S. Appl. No. 16/378,291, dated Mar. 25, 2020, 11 pages.
Office Action received for Australian Patent Application No. 2017277813, dated Mar. 20, 2020, 4 pages.
Record of Oral Hearing received for U.S. Appl. No. 14/142,648, dated Mar. 2, 2020, 13 pages.
Summons to Attend Oral Proceedings received for European Patent Application No. 12189764.9, dated Mar. 12, 2020, 11 pages.
Notice of Allowance received for U.S. Appl. No. 16/428,634, dated May 8, 2020, 16 pages.
Office Action received for Australian Patent Application No. 2019219816, dated Apr. 17, 2020, 3 pages.
Office Action received for Chinese Patent Application No. 201680008151.9, dated Apr. 20, 2020, 6 pages (3 pages of English Translation and 3 pages of Official Copy).
Result of Consultation received for European Patent Application No. 17210062.0, dated Apr. 20, 2020, 2 pages.
Third Party Proceedings received for European Patent Application No. 17210062.0, dated Apr. 23, 2020, 6 pages.
Corrected Notice of Allowance received for U.S. Appl. No. 14/142,648, dated May 20, 2020, 2 pages.
Notice of Allowance received for U.S. Appl. No. 16/020,804, dated May 28, 2020, 18 pages.
Office Action received for European Patent Application No. 18213157.3, dated May 15, 2020, 7 pages.
Office Action received for Japanese Patent Application No. 2019-024663, dated Apr. 27, 2020, 8 pages (4 pages of English Translation and 4 pages of Official Copy).
Summons to Attend Oral Proceedings received for European Patent Application No. 12189764.9, dated May 20, 2020, 11 pages.
Extended European Search Report received for European Patent Application No. 20203888.1, dated Feb. 10, 2021, 8 pages.
Office Action received for Australian Patent Application No. 2020201723, dated Feb. 4, 2021, 6 pages.
Office Action received for Chinese Patent Application No. 201780033973.7, dated Jan. 22, 2021, 27 pages (11 pages of English Translation and 16 pages of Official Copy).
Blickenstorfer Conrad H., "Neonode N2 A new version of the phone that pioneered touchscreens", Pen Computing Magazine, Online Available at: http://www.pencomputing.com/WinCE/neonode-n2-review.html, Nov. 4, 2007, 9 pages.
Feist Jonathan, "Android customization—How to create a custom clock widget using zooper widget", Android Authority, Available Online at: https://www.androidauthority.com/zooper-widget-clock-366476/, May 15, 2014, pp. 1-13.
Applicant-Initiated Interview Summary received for U.S. Appl. No. 16/267,817, dated Jul. 14, 2020, 5 pages.
Examiner's Pre-Review Report received for Japanese Patent Application No. 2018-121118, dated Jun. 2, 2020, 4 pages (2 pages of English Translation and 2 pages of Official Copy).

(56) References Cited

OTHER PUBLICATIONS

Notice of Allowance received for U.S. Appl. No. 14/142,648, dated Jul. 15, 2020, 6 pages.
Office Action received for Australian Patent Application No. 2019210673, dated Jul. 28, 2020, 4 pages.
Communication of the Board of Appeal received for European Patent Application No. 09170697.8, dated Jan. 25, 2021, 6 pages.
Office Action received for Chinese Patent Application No. 201780033621.1, dated Dec. 22, 2020, 30 pages (16 pages of English Translation and 14 pages of Official Copy).
Applicant-Initiated Interview Summary received for U.S. Appl. No. 15/421,865, dated Dec. 15, 2020, 6 pages.
Applicant-Initiated Interview Summary received for U.S. Appl. No. 16/267,817, dated Dec. 1, 2020, 5 pages.
Minutes of the Oral Proceedings received for European Patent Application No. 12189764.9, dated Oct. 13, 2020, 6 pages.
Office Action received for European Patent Application No. 17810739.7, dated Nov. 25, 2020, 4 pages.
Intention to Grant received for European Patent Application No. 17210062.0, dated Jun. 23, 2020, 8 pages.
Notice of Acceptance received for Australian Patent Application No. 2017277813, dated Jun. 16, 2020, 3 pages.
Decision to Grant received for European Patent Application No. 17210062.0, dated Oct. 1, 2020, 2 pages.
Non-Final Office Action received for U.S. Appl. No. 15/421,865, dated Oct. 7, 2020, 20 pages.
Notice of Acceptance received for Australian Patent Application No. 2019219816, dated Sep. 23, 2020, 3 pages.
Notice of Allowance received for Japanese Patent Application No. 2018-201088, dated Sep. 18, 2020, 4 pages (1 page of English Translation and 3 pages of Official Copy).
Record of Oral Hearing received for U.S. Appl. No. 14/261,112, dated Sep. 28, 2020, 20 pages.
Final Office Action received for U.S. Appl. No. 16/267,817, dated Aug. 24, 2020, 23 pages.
Final Office Action received for U.S. Appl. No. 16/407,590, dated Aug. 25, 2020, 14 pages.
Decision on Appeal received for U.S. Appl. No. 14/261,112, dated Oct. 29, 2020, 20 pages.
Notice of Acceptance received for Australian Patent Application No. 2019210673, dated Oct. 17, 2020, 3 pages.
Office Action received for Japanese Patent Application No. 2019-024663, dated Oct. 5, 2020, 7 pages (4 pages of English Translation and 3 pages of Official Copy).
Notice of Allowance received for U.S. Appl. No. 16/270,801, dated Sep. 16, 2020, 9 pages.
Notice of Allowance received for U.S. Appl. No. 16/270,902, dated Sep. 22, 2020, 9 pages.
Office Action received for Australian Patent Application No. 2019204835, dated Sep. 16, 2020, 6 pages.
Office Action received for Australian Patent Application No. 2019210673, dated Sep. 28, 2020, 2 pages.
Office Action received for Japanese Patent Application No. 2017-223021, dated Sep. 11, 2020, 20 pages (10 pages of English Translation and 10 pages of Official Copy).
Office Action received for Japanese Patent Application No. 2019-144763, dated Oct. 2, 2020, 6 pages (3 pages of English Translation and 3 pages of Official Copy).
Office Action received for Korean Patent Application No. 10-2020-7018655, dated Oct. 13, 2020, 5 pages (2 pages of English Translation and 3 pages of Official Copy).
Applicant-Initiated Interview Summary received for U.S. Appl. No. 16/533,540, dated Dec. 21, 2020, 4 pages.
Notice of Acceptance received for Australian Patent Application No. 2019204835, dated Dec. 7, 2020, 3 pages.
Notice of Allowance received for Japanese Patent Application No. 2017-223021, dated Dec. 18, 2020, 3 pages(1 page of English Translation and 2 pages of Official Copy).
Notice of Allowance received for U.S. Appl. No. 16/267,817, dated Dec. 18, 2020, 11 pages.
Notice of Allowance received for U.S. Appl. No. 16/407,590, dated Dec. 16, 2020, 6 pages.
Summons to Oral Proceedings received for European Patent Application No. 09170697.8, dated Dec. 17, 2020, 4 pages.
Applicant-Initiated Interview Summary received for U.S. Appl. No. 16/407,590, dated Nov. 17, 2020, 6 pages.
International Search Report and Written Opinion received for PCT Patent Application No. PCT/US2020/031528, dated Sep. 23, 2020, 18 pages.
Invitation to Pay Additional Fees received for PCT Patent Application No. PCT/US2020/031528, dated Jul. 30, 2020, 11 pages.
Non-Final Office Action received for U.S. Appl. No. 16/533,540, dated Oct. 23, 2020, 34 pages.
Notice of Allowance received for Canadian Patent Application No. 2,983,178, dated Oct. 20, 2020, 1 page.
Notice of Allowance received for U.S. Appl. No. 14/261,112, dated Nov. 18, 2020, 6 pages.
Result of Consultation received for European Patent Application No. 08829660.3, dated Nov. 18, 2020, 5 pages.
Applicant-Initiated Interview Summary received for U.S. Appl. No. 16/407,590, dated Jun. 5, 2020, 3 pages.
Minutes of Oral Proceedings received for European Patent Application No. 17210062.0, dated Jun. 17, 2020, 5 pages.
Notice of Allowance received for Chinese Patent Application No. 201680008151.9, dated Jun. 16, 2020, 2 pages (1 page of English Translation and 1 page of Official Copy).
Minutes of the Oral Proceedings received for European Patent Application No. 14734674.6, dated Jun. 13, 2022, 9 pages.
Office Action received for Chinese Patent Application No. 201780033621.1, dated May 24, 2021, 18 pages (7 pages of English Translation and 11 pages of Official Copy).
Decision to Grant received for European Patent Application No. 08829660.3, dated May 6, 2022, 2 pages.
Decision to Grant received for European Patent Application No. 09170697.8, dated Apr. 29, 2022, 2 pages.
Non-Final Office Action received for U.S. Appl. No. 16/737,372, dated Apr. 29, 2022, 19 pages.
Notice of Allowance received for U.S. Appl. No. 17/327,204, dated May 18, 2022, 18 pages.
Final Office Action received for U.S. Appl. No. 16/533,540, dated Jun. 15, 2022, 38 pages.
Notice of Acceptance received for Australian Patent Application No. 2021201687, dated Jun. 8, 2022, 3 pages.
Notice of Allowance received for U.S. Appl. No. 17/130,674, dated Jun. 15, 2022, 9 pages.
Result of Consultation received for European Patent Application No. 14734674.6, dated May 27, 2022, 3 pages.
Applicant Initiated Interview Summary received for U.S. Appl. No. 16/737,372, dated Oct. 5, 2021, 2 pages.
Applicant Initiated Interview Summary received for U.S. Appl. No. 17/327,204, dated Jan. 25, 2022, 5 pages.
Applicant-Initiated Interview Summary received for U.S. Appl. No. 15/421,865, dated Feb. 28, 2022, 5 pages.
Applicant-Initiated Interview Summary received for U.S. Appl. No. 15/421,865, dated Jun. 30, 2021, 6 pages.
Applicant-Initiated Interview Summary received for U.S. Appl. No. 16/533,540, dated Aug. 16, 2021, 6 pages.
Applicant-Initiated Interview Summary received for U.S. Appl. No. 16/533,540, dated Feb. 28, 2022, 6 pages.
Applicant-Initiated Interview Summary received for U.S. Appl. No. 16/737,372, dated Mar. 1, 2022, 2 pages.
Applicant-Initiated Interview Summary received for U.S. Appl. No. 16/832,285, dated Nov. 19, 2021, 19 pages.
Applicant-Initiated Interview Summary received for U.S. Appl. No. 16/994,392, dated Dec. 3, 2021, 2 pages.
Applicant-Initiated Interview Summary received for U.S. Appl. No. 16/994,392, dated Mar. 10, 2022, 2 pages.
Applicant-Initiated Interview Summary received for U.S. Appl. No. 17/190,869, dated Dec. 10, 2021, 2 pages.
Corrected Notice of Allowance received for U.S. Appl. No. 17/002,622, dated Dec. 13, 2021, 2 pages.
Corrected Notice of Allowance received for U.S. Appl. No. 17/002,622, dated Feb. 16, 2022, 2 pages.

(56) References Cited

OTHER PUBLICATIONS

Corrected Notice of Allowance received for U.S. Appl. No. 17/002,622, dated Jan. 25, 2022, 2 pages.
Corrected Notice of Allowance received for U.S. Appl. No. 17/019,062, dated Dec. 8, 2021, 2 pages.
Decision of Board of Appeal received for European Patent Application No. 09170697.8, dated Apr. 23, 2021, 17 pages.
Decision to Grant received for European Patent Application No. 12189764.9, dated Nov. 25, 2021, 2 pages.
Decision to Grant received for European Patent Application No. 18213157.3, dated Feb. 24, 2022, 2 pages.
Examiner's Pre-Review Report received for Japanese Patent Application No. 2019-024663, dated Aug. 31, 2021, 4 pages (2 pages of English Translation and 2 pages of Official Copy).
Extended European Search Report received for European Patent Application No. 22150207.3, dated Apr. 11, 2022, 11 pages.
Final Office Action received for U.S. Appl. No. 15/421,865, dated Mar. 19, 2021, 20 pages.
Final Office Action received for U.S. Appl. No. 16/533,540, dated Apr. 19, 2021, 38 pages.
Final Office Action received for U.S. Appl. No. 16/737,372, dated Jan. 28, 2022, 20 pages.
Final Office Action received for U.S. Appl. No. 16/832,285, dated Jan. 19, 2022, 66 pages.
Final Office Action received for U.S. Appl. No. 16/994,392, dated Jan. 18, 2022, 12 pages.
Intention to Grant received for European Patent Application No. 08829660.3, dated Dec. 17, 2021, 8 pages.
Intention to Grant received for European Patent Application No. 09170697.8, dated Dec. 16, 2021, 8 pages.
Intention to Grant received for European Patent Application No. 12189764.9, dated Mar. 5, 2021, 14 pages.
Intention to Grant received for European Patent Application No. 12189764.9, dated Sep. 28, 2021, 14 pages.
Intention to Grant received for European Patent Application No. 18213157.3, dated May 19, 2021, 8 pages.
Intention to Grant received for European Patent Application No. 18213157.3, dated Oct. 27, 2021, 8 pages.
International Preliminary Report on Patentability received for PCT Patent Application No. PCT/US2020/031528, dated Nov. 18, 2021, 13 pages.
Non-Final Office Action received for U.S. Appl. No. 15/421,865, dated Dec. 29, 2021, 23 pages.
Non-Final Office Action received for U.S. Appl. No. 16/533,540, dated Oct. 15, 2021, 40 pages.
Non-Final Office Action received for U.S. Appl. No. 16/737,372, dated Jul. 27, 2021, 22 pages.
Non-Final Office Action received for U.S. Appl. No. 16/832,285, dated Jul. 26, 2021, 62 pages.
Non-Final Office Action received for U.S. Appl. No. 16/994,392, dated Jun. 9, 2021, 27 pages.
Non-Final Office Action received for U.S. Appl. No. 17/002,622, dated Jul. 6, 2021, 14 pages.
Non-Final Office Action received for U.S. Appl. No. 17/130,674, dated Mar. 3, 2022, 8 pages.
Non-Final Office Action received for U.S. Appl. No. 17/190,869, dated Sep. 27, 2021, 26 pages.
Non-Final Office Action received for U.S. Appl. No. 17/327,204, dated Nov. 26, 2021, 13 pages.
Notice of Acceptance received for Australian Patent Application No. 2020201723, dated May 6, 2021, 3 pages.
Notice of Acceptance received for Australian Patent Application No. 2020239774, dated Jan. 5, 2022, 3 pages.
Notice of Acceptance received for Australian Patent Application No. 2021200102, dated Mar. 16, 2021, 3 pages.
Notice of Allowance received for Chinese Patent Application No. 201780033621.1, dated Mar. 10, 2022, 2 pages (1 page of English Translation and 1 page of Official Copy).
Notice of Allowance received for Chinese Patent Application No. 201780033973.7, dated Jul. 7, 2021, 5 pages (1 page of English Translation and 4 pages of Official Copy).
Notice of Allowance received for Japanese Patent Application No. 2018-121118, dated Sep. 27, 2021, 3 pages (1 page of English Translation and 2 pages of Official Copy).
Notice of Allowance received for Japanese Patent Application No. 2019-144763, dated Nov. 29, 2021, 4 pages (1 page of English Translation and 3 pages of Official Copy).
Notice of Allowance received for Korean Patent Application No. 10-2020-7018655, dated Feb. 25, 2022, 4 pages (1 page of English Translation and 3 pages of Official Copy).
Notice of Allowance received for U.S. Appl. No. 14/261,112, dated Apr. 9, 2021, 2 pages.
Notice of Allowance received for U.S. Appl. No. 16/407,590, dated Apr. 9, 2021, 3 pages.
Notice of Allowance received for U.S. Appl. No. 16/407,590, dated Mar. 22, 2021, 6 pages.
Notice of Allowance received for U.S. Appl. No. 16/918,855, dated Apr. 6, 2021, 7 pages.
Notice of Allowance received for U.S. Appl. No. 16/926,530, dated Jun. 24, 2021, 10 pages.
Notice of Allowance received for U.S. Appl. No. 17/002,622, dated Nov. 22, 2021, 7 pages.
Notice of Allowance received for U.S. Appl. No. 17/019,062, dated Aug. 10, 2021, 22 pages.
Notice of Allowance received for U.S. Appl. No. 17/019,062, dated Nov. 24, 2021, 20 pages.
Notice of Allowance received for U.S. Appl. No. 17/190,869, dated Jan. 10, 2022, 10 pages.
Office Action received for Australian Patent Application No. 2020239774, dated Jun. 28, 2021, 8 pages.
Office Action received for Australian Patent Application No. 2020239774, dated Oct. 5, 2021, 3 pages.
Office Action received for Australian Patent Application No. 2021201687, dated Mar. 16, 2022, 5 pages.
Office Action received for Canadian Patent Application No. 3,109,701, dated Feb. 7, 2022, 4 pages.
Office Action received for Chinese Patent Application No. 201780033621.1, dated Dec. 14, 2021, 8 pages (4 pages of English Translation and 4 pages of Official Copy).
Office Action received for European Patent Application No. 09170697.8, dated Jul. 6, 2021, 3 pages.
Office Action received for European Patent Application No. 17810723.1, dated Jul. 9, 2021, 8 pages.
Office Action received for European Patent Application No. 17813879.8, dated Oct. 20, 2021, 7 pages.
Office Action received for European Patent Application No. 19176224.4, dated Jan. 18, 2022, 6 pages.
Office Action received for European Patent Application No. 20203888.1, dated Mar. 10, 2022, 6 pages.
Office Action received for Japanese Patent Application No. 2018-121118, dated Feb. 19, 2021, 17 pages (9 pages of English Translation and 8 pages of Official Copy).
Office Action received for Japanese Patent Application No. 2019-024663, dated Feb. 19, 2021, 8 pages (4 pages of English Translation and 4 pages of Official Copy).
Office Action received for Japanese Patent Application No. 2019-144763, dated Jul. 2, 2021,6 pages (3 pages of English Translation and 3 pages of Official Copy).
Office Action received for Japanese Patent Application No. 2019-24663, dated Feb. 10, 2022, 4 pages (2 pages of English Translation and 2 pages of Official Copy).
Office Action received for Japanese Patent Application No. 2020-046707, dated Jan. 7, 2022, 10 pages (5 pages of English Translation and 5 pages of Official Copy).
Office Action received for Japanese Patent Application No. 2020-046707, dated Mar. 5, 2021, 8 pages (4 pages of English Translation and 4 pages of Official Copy).
Office Action received for Japanese Patent Application No. 2020-123882, dated Sep. 3, 2021, 8 pages (4 pages of English Translation and 4 pages of Official Copy).

(56) References Cited

OTHER PUBLICATIONS

Office Action received for Korean Patent Application No. 10-2020-7018655, dated Apr. 26, 2021, 9 pages (4 pages of English Translation and 5 pages of Official Copy).
Summons to Attend Oral Proceedings received for European Patent Application No. 14734674.6, dated Nov. 23, 2021, 7 pages.
2004-208217, JP, A, Japanese Patent Office in an Office Action for related Patent Application No. 2020-123882 dated Sep. 3, 2021.
2005-227826, JP, A, Japanese Patent Office in an Office Action for related Patent Application No. 2020-123882 dated Sep. 3, 2021.
2008-52705, JP, A, Japanese Patent Office in an Office Action for related Patent Application No. 2020-046707 dated Mar. 5, 2021.
2008-262251, JP, A, Japanese Patent Office in an Office Action for related Patent Application No. 2020-046707 dated Mar. 5, 2021.
2013-47919, JP, A, Japanese Patent Office in an Office Action for related Patent Application No. 2020-046707 dated Jan. 7, 2022.
2013-106271, JP, A, Japanese Patent Office in an Office Action for related Patent Application No. 2020-046707 dated Mar. 5, 2021.
2013-203283, JP, A, Japanese Patent Office in an Office Action for related Patent Application No. 2020-046707 dated Mar. 5, 2021.
2013-218698, JP, A, Japanese Patent Office in an Office Action for related Patent Application No. 2020-046707 dated Mar. 5, 2021.
Decision to Refuse received for Japanese Patent Application No. 2020-123882, dated Mar. 3, 2023, 6 pages (3 pages of English Translation and 3 pages of Official Copy).
Notice of Allowance received for Chinese Patent Application No. 201780034059.4, dated Feb. 19, 2023, 2 pages (1 page of English Translation and 1 page of Official Copy).
Summons to Attend Oral Proceedings received for European Patent Application No. 20203888.1, dated Mar. 1, 2023, 8 pages.
Decision to Refuse received for European Patent Application No. 14734674.6, dated Jun. 29, 2022, 15 pages.
Final Office Action received for U.S. Appl. No. 15/421,865, dated Jul. 12, 2022, 27 pages.
Notice of Allowance received for U.S. Appl. No. 16/994,392, dated Jul. 11, 2022, 26 pages.
Summons to Attend Oral Proceedings received for European Patent Application No. 17810723.1, dated Jul. 5, 2022, 8 pages.
Summons to Attend Oral Proceedings received for German Patent Application No. 112006003600.9, dated Jun. 2, 2022, 33 pages (21 pages of English Translation and 12 pages of Official Copy).
Corrected Notice of Allowance received for U.S. Appl. No. 16/994,392, dated Aug. 4, 2022, 2 pages.
Office Action received for Japanese Patent Application No. 2020-123882, dated Jul. 29, 2022, 8 pages (4 pages of English Translation and 4 pages of Official Copy).
Notice of Allowance received for U.S. Appl. No. 16/737,372, dated Feb. 1, 2023, 2 pages.
Notice of Allowance received for U.S. Appl. No. 16/737,372, dated Jan. 25, 2023, 7 pages.
Notice of Allowance received for U.S. Appl. No. 17/698,979, dated Feb. 6, 2023, 10 pages.
Notice of Allowance received for U.S. Appl. No. 17/894,918, dated Jan. 25, 2023, 9 pages.
Notice of Allowance received for U.S. Appl. No. 17/321,313, dated Oct. 24, 2022, 9 pages.
Office Action received for Chinese Patent Application No. 201780034059.4, dated Oct. 9, 2022, 11 pages (5 pages of English Translation and 6 pages of Official Copy).
Brief Communication Regarding Oral Proceedings received for European Patent Application No. 17810723.1, dated Nov. 11, 2022, 11 pages.
Minutes of the Oral Proceedings received for European Patent Application No. 17810723.1, dated Dec. 9, 2022, 7 pages.
Result of Consultation received for European Patent Application No. 17810723.1, dated Nov. 30, 2022, 3 pages.
Corrected Notice of Allowance received for U.S. Appl. No. 16/994,392, dated Jul. 19, 2022, 2 pages.
Corrected Notice of Allowance received for U.S. Appl. No. 17/130,674, dated Jul. 29, 2022, 2 pages.
Corrected Notice of Allowance received for U.S. Appl. No. 17/521,768, dated Jul. 29, 2022, 2 pages.
Non-Final Office Action received for U.S. Appl. No. 17/321,313, dated Jul. 19, 2022, 18 pages.
Notice of Allowance received for U.S. Appl. No. 17/521,768, dated Jul. 15, 2022, 10 pages.
Corrected Notice of Allowance received for U.S. Appl. No. 17/698,979, dated Feb. 17, 2023, 2 pages.
Non-Final Office Action received for U.S. Appl. No. 16/533,540, dated Feb. 16, 2023, 39 pages.
Non-Final Office Action received for U.S. Appl. No. 17/728,725, dated Feb. 16, 2023, 11 pages.
Notice of Allowance received for U.S. Appl. No. 16/737,372, dated Feb. 10, 2023, 2 pages.
Office Action received for European Patent Application No. 17810739.7, dated Feb. 17, 2023, 8 pages.
Applicant-Initiated Interview Summary received for U.S. Appl. No. 16/533,540, dated Aug. 25, 2022, 8 pages.
Applicant-Initiated Interview Summary received for U.S. Appl. No. 16/737,372, dated Aug. 31, 2022, 2 pages.
Notice of Allowance received for Japanese Patent Application No. 2020-046707, dated Aug. 15, 2022, 4 pages (1 page of English Translation and 3 pages of Official Copy).
Office Action received for Chinese Patent Application No. 201910965046.X, dated Dec. 5, 2022, 11 pages (5 pages of English Translation and 6 pages of Official Copy).
Intention to Grant received for European Patent Application No. 17810723.1, dated Dec. 16, 2022, 9 pages.
Notice of Allowance received for Japanese Patent Application No. 2019-024663, dated Sep. 26, 2022, 23 pages (1 page of English Translation and 22 pages of Official Copy).
Examiner's Answer to Appeal Brief received for U.S. Appl. No. 16/832,285, dated Sep. 7, 2022, 30 pages.
Notice of Allowance received for U.S. Appl. No. 17/349,226, dated Sep. 20, 2022, 7 pages.
Non-Final Office Action received for U.S. Appl. No. 17/349,226, dated Mar. 16, 2023, 9 pages.
Notice of Allowance received for Chinese Patent Application No. 201910965046.X, dated Mar. 8, 2023, 2 pages (1 page of English Translation and 1 page of Official Copy).
Office Action received for Australian Patent Application No. 2022202583, dated Mar. 24, 2023, 4 pages.
Office Action received for European Patent Application No. 17813879.8, dated Jun. 22, 2023, 7 pages.

\* cited by examiner

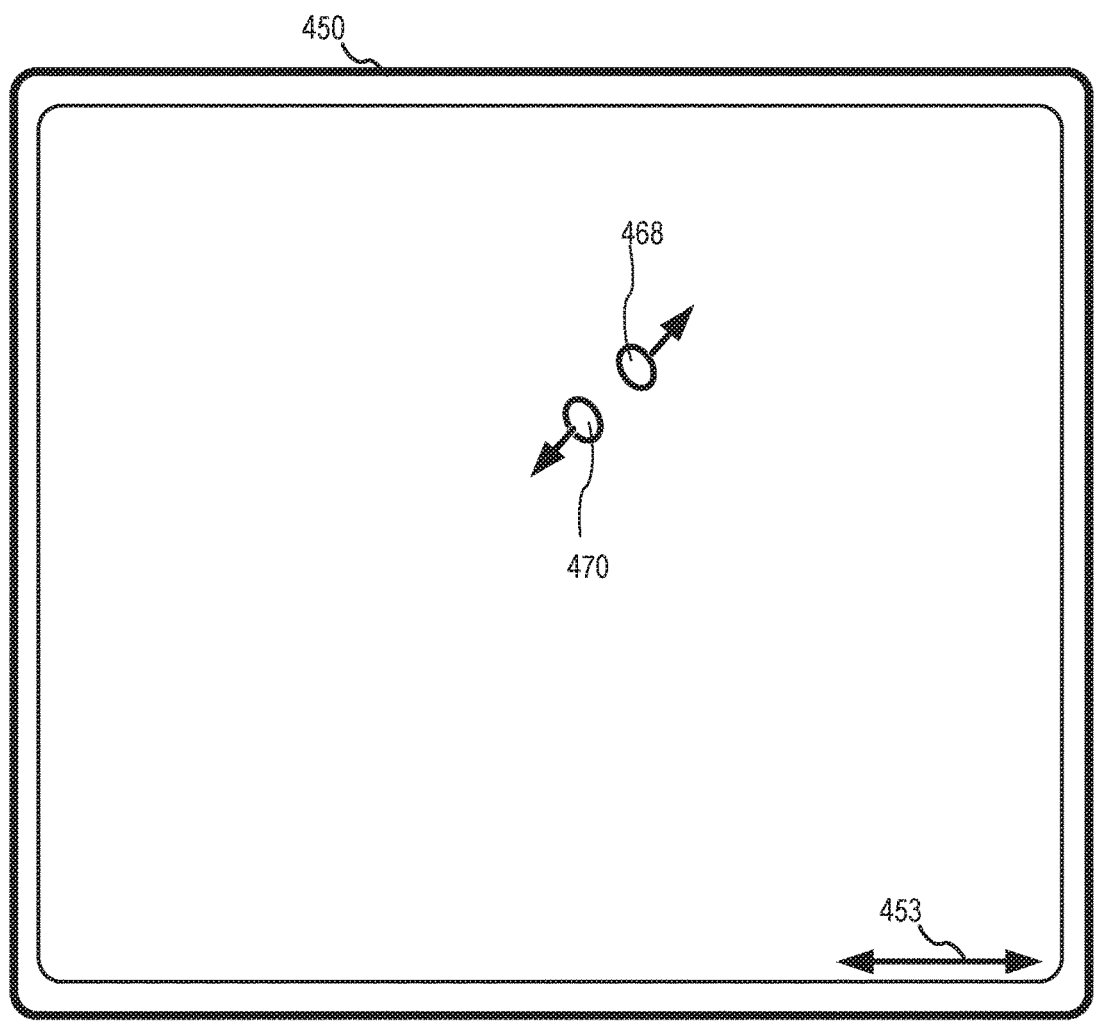
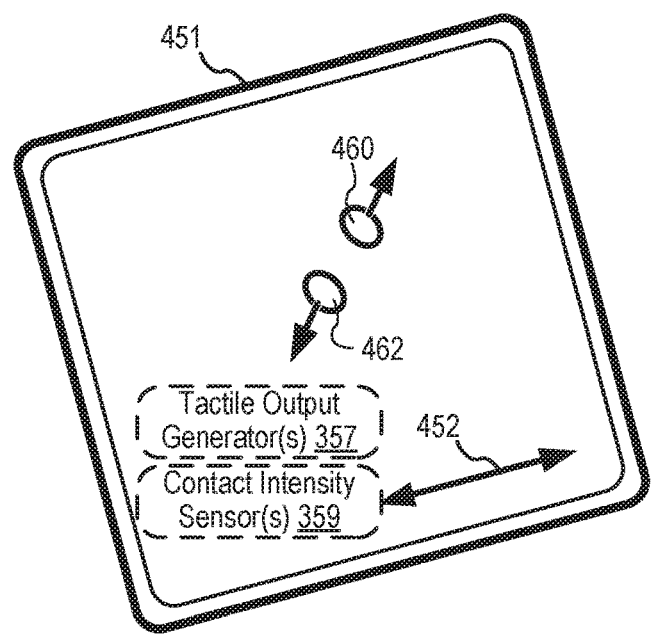
*FIG. 4B*

Second shortcut replacement criteria

700 ↘

702
Cause a user interface to be displayed on the display screen

Concurrently display a first shortcut affordance at a first shortcut position corresponding to a first category of applications, wherein the first shortcut affordance corresponds to a first application, wherein selection of the first shortcut affordance causes a user interface for the first application to be displayed on the display Concurrently display a second shortcut affordance at a second shortcut position corresponding to a second category of applications distinct from the first category of applications, wherein the second shortcut affordance corresponds to a second application distinct from the first application, wherein selection of the second shortcut affordance causes a user interface for the second application to be displayed on the display

↓

704
While displaying the first shortcut affordance at the first shortcut position and the second shortcut affordance at the second shortcut position, detect a sequence of one or more inputs

↓

706
In response to detecting the sequence of one or more inputs

In accordance with a determination that the sequence of one or more inputs changes a status corresponding to a third application to a status that meets first shortcut replacement criteria, wherein the first shortcut replacement criteria includes a criterion that is met when the third application belongs to the first category of applications, cause the first shortcut affordance to be replaced with display of a third shortcut affordance corresponding to the third application at the first shortcut position while maintaining display of the second shortcut affordance on the display

↓

708
In accordance with a determination that the sequence of one or more inputs does not change the status corresponding the third application to the status that meets the first shortcut replacement criteria, cause the first shortcut affordance to be maintained on the display

*FIG. 7*

APPLICATION SHORTCUTS FOR CARPLAY

CROSS-REFERENCE TO RELATED APPLICATIONS

This application claims priority to U.S. provisional patent application 62/349,025, entitled "APPLICATION SHORTCUTS FOR CARPLAY," filed Jun. 12, 2016, the content of which is hereby incorporated by reference in its entirety.

FIELD

The present disclosure relates generally to computer user interfaces, and more specifically to techniques for user interfaces.

BACKGROUND

User interfaces may provide a large number of application launch icons. However, in some cases it is difficult to navigate to a desired application launch icon.

BRIEF SUMMARY

Some techniques for providing application shortcuts using electronic devices, however, are generally cumbersome and inefficient. For example, some techniques use a complex and time-consuming user interface, which require multiple key presses or keystrokes in order to arrive at a desired application launch icon. In this way, some techniques require more time than necessary, thereby wasting user time and device energy. This latter consideration is particularly important in battery-operated devices where conservation of battery power and maximizing time between charges is desirable.

Accordingly, the present technique provides electronic devices with faster, more efficient methods and interfaces for providing shortcut access to applications. Such methods and interfaces optionally complement or replace other methods for application shortcuts. Such methods and interfaces reduce the cognitive burden on a user and produce a more efficient human-machine interface.

In accordance with some embodiments, a method is performed at an electronic device. The method includes causing a user interface to be displayed on the display screen, where displaying the user interface includes concurrently displaying: a first shortcut affordance at a first shortcut position corresponding to a first category of applications, where the first shortcut affordance corresponds to a first application, where selection of the first shortcut affordance causes a user interface for the first application to be displayed on the display; and a second shortcut affordance at a second shortcut position corresponding to a second category of applications distinct from the first category of applications, where the second shortcut affordance corresponds to a second application distinct from the first application, where selection of the second shortcut affordance causes a user interface for the second application to be displayed on the display. The method includes, while displaying the first shortcut affordance at the first shortcut position and the second shortcut affordance at the second shortcut position, detecting a sequence of one or more inputs. The method includes, in response to detecting the sequence of one or more inputs: in accordance with a determination that the sequence of one or more inputs changes a status corresponding to a third application to a status that meets first shortcut replacement criteria, where the first shortcut replacement criteria includes a criterion that is met when the third application belongs to the first category of applications, causing the first shortcut affordance to be replaced with display of a third shortcut affordance corresponding to the third application at the first shortcut position while maintaining display of the second shortcut affordance on the display. The method includes, in accordance with a determination that the sequence of one or more inputs does not change the status corresponding the third application to the status that meets the first shortcut replacement criteria, causing the first shortcut affordance to be maintained on the display.

In accordance with some embodiments, an electronic device includes one or more processors, a memory, and one or more programs, where the one or more programs are stored in the memory and configured to be executed by the one or more processors. The one or more programs including instructions for causing a user interface to be displayed on a display screen in operable communication with the electronic device, where displaying the user interface includes concurrently displaying: a first shortcut affordance at a first shortcut position corresponding to a first category of applications, where the first shortcut affordance corresponds to a first application, where selection of the first shortcut affordance causes a user interface for the first application to be displayed on the display; and a second shortcut affordance at a second shortcut position corresponding to a second category of applications distinct from the first category of applications, where the second shortcut affordance corresponds to a second application distinct from the first application, where selection of the second shortcut affordance causes a user interface for the second application to be displayed on the display. The one or more programs including instructions for, while displaying the first shortcut affordance at the first shortcut position and the second shortcut affordance at the second shortcut position, detecting a sequence of one or more inputs. The one or more programs including instructions for, in response to detecting the sequence of one or more inputs: in accordance with a determination that the sequence of one or more inputs changes a status corresponding to a third application to a status that meets first shortcut replacement criteria, where the first shortcut replacement criteria includes a criterion that is met when the third application belongs to the first category of applications, causing the first shortcut affordance to be replaced with display of a third shortcut affordance corresponding to the third application at the first shortcut position while maintaining display of the second shortcut affordance on the display; and in accordance with a determination that the sequence of one or more inputs does not change the status corresponding the third application to the status that meets the first shortcut replacement criteria, causing the first shortcut affordance to be maintained on the display.

In accordance with some embodiments, a non-transitory computer readable storage medium stores one or more programs that include instructions, which when executed by one or more processors of an electronic device in operable communication with a display, cause the device to cause a user interface to be displayed on the display screen, where displaying the user interface includes concurrently displaying: a first shortcut affordance at a first shortcut position corresponding to a first category of applications, where the first shortcut affordance corresponds to a first application, where selection of the first shortcut affordance causes a user interface for the first application to be displayed on the display; and a second shortcut affordance at a second shortcut position corresponding to a second category of applications distinct from the first category of applications, where the second shortcut affordance corresponds to a second application distinct from the first application, where selection of the second shortcut affordance causes a user interface for the second application to be displayed on the display. The one or more programs may include instructions that may cause the device to, while displaying the first shortcut affordance at the first shortcut position and the second shortcut affordance at the second shortcut position, detect a sequence of one or more inputs. The one or more programs may include instructions that may cause the device to, in response to detecting the sequence of one or more inputs: in accordance with a determination that the sequence of one or more inputs changes a status corresponding to a third application to a status that meets first shortcut replacement criteria, where the first shortcut replacement criteria includes a criterion that is met when the third application belongs to the first category of applications, cause the first shortcut affordance to be replaced with display of a third shortcut affordance corresponding to the third application at the first shortcut position while maintaining display of the second shortcut affordance on the display; and in accordance with a determination that the sequence of one or more inputs does not change the status corresponding the third application to the status that meets the first shortcut replacement criteria, cause the first shortcut affordance to be maintained on the display.

In accordance with some embodiments, an electronic device includes means for causing a user interface to be displayed on a display screen in operable communication with the device, where displaying the user interface includes concurrently displaying a first shortcut affordance at a first shortcut position corresponding to a first category of applications, where the first shortcut affordance corresponds to a first application, where selection of the first shortcut affordance causes a user interface for the first application to be displayed on the display; and a second shortcut affordance at a second shortcut position corresponding to a second category of applications distinct from the first category of applications, where the second shortcut affordance corresponds to a second application distinct from the first application, where selection of the second shortcut affordance causes a user interface for the second application to be displayed on the display. The electronic device includes means for, while displaying the first shortcut affordance at the first shortcut position and the second shortcut affordance at the second shortcut position, detecting a sequence of one or more inputs. The electronic device includes, in response to detecting the sequence of one or more inputs: means for, in accordance with a determination that the sequence of one or more inputs changes a status corresponding to a third application to a status that meets first shortcut replacement criteria, where the first shortcut replacement criteria includes a criterion that is met when the third application belongs to the first category of applications, causing the first shortcut affordance to be replaced with display of a third shortcut affordance corresponding to the third application at the first shortcut position while maintaining display of the second shortcut affordance on the display; and means for, in accordance with a determination that the sequence of one or more inputs does not change the status corresponding the third application to the status that meets the first shortcut replacement criteria, causing the first shortcut affordance to be maintained on the display.

In accordance with some embodiments, an electronic device includes a processing unit configured to cause a user interface to be displayed on a display screen in operative communication with the electronic device, where displaying the user interface includes concurrently displaying: a first shortcut affordance at a first shortcut position corresponding to a first category of applications, where the first shortcut affordance corresponds to a first application, where selection of the first shortcut affordance causes a user interface for the first application to be displayed on the display; and a second shortcut affordance at a second shortcut position corresponding to a second category of applications distinct from the first category of applications, where the second shortcut affordance corresponds to a second application distinct from the first application, where selection of the second shortcut affordance causes a user interface for the second application to be displayed on the display. The processing unit is configured to, while displaying the first shortcut affordance at the first shortcut position and the second shortcut affordance at the second shortcut position, detect a sequence of one or more inputs. The processing unit is configured to, in response to detecting the sequence of one or more inputs: in accordance with a determination that the sequence of one or more inputs changes a status corresponding to a third application to a status that meets first shortcut replacement criteria, where the first shortcut replacement criteria includes a criterion that is met when the third application belongs to the first category of applications, cause the first shortcut affordance to be replaced with display of a third shortcut affordance corresponding to the third application at the first shortcut position while maintaining display of the second shortcut affordance on the display; and in accordance with a determination that the sequence of one or more inputs does not change the status corresponding the third application to the status that meets the first shortcut replacement criteria, cause the first shortcut affordance to be maintained on the display.

In accordance with some embodiments, an electronic device includes one or more processors, a memory, and one or more programs, where the one or more programs are stored in the memory and configured to be executed by the one or more processors, the one or more programs including instructions for performing any of the methods of claims 1-24. In accordance with some embodiments, a computer readable storage medium stores one or more programs, the one or more programs including instructions, which when executed by one or more processors of an electronic device in operable communication with a display, cause the device to perform any of the methods of claims 1-24. In accordance with some embodiments, an electronic device, includes means for performing any of the methods of claims 1-24.

Further, executable instructions for performing these functions are, optionally, included in a transitory computer-readable storage medium or other computer program product configured for execution by one or more processors. In accordance with some embodiments, a transitory computer readable storage medium stores one or more programs that include instructions, which when executed by one or more processors of an electronic device in operable communication with a display, cause the device to cause a user interface to be displayed on the display screen, where displaying the user interface includes concurrently displaying: a first shortcut affordance at a first shortcut position corresponding to a first category of applications, where the first shortcut affordance corresponds to a first application, where selection of the first shortcut affordance causes a user interface for the first application to be displayed on the display; and a second shortcut affordance at a second shortcut position corresponding to a second category of applications distinct from the first category of applications, where the second shortcut affordance corresponds to a second application distinct from the first application, where selection of the second shortcut affordance causes a user interface for the second application to be displayed on the display. The one or more programs may include instructions that may cause the device to, while displaying the first shortcut affordance at the first shortcut position and the second shortcut affordance at the second shortcut position, detect a sequence of one or more inputs. The one or more programs may include instructions that may cause the device to, in response to detecting the sequence of one or more inputs: in accordance with a determination that the sequence of one or more inputs changes a status corresponding to a third application to a status that meets first shortcut replacement criteria, where the first shortcut replacement criteria includes a criterion that is met when the third application belongs to the first category of applications, cause the first shortcut affordance to be replaced with display of a third shortcut affordance corresponding to the third application at the first shortcut position while maintaining display of the second shortcut affordance on the display; and in accordance with a determination that the sequence of one or more inputs does not change the status corresponding the third application to the status that meets the first shortcut replacement criteria, cause the first shortcut affordance to be maintained on the display.

Thus, devices are provided with faster, more efficient methods and interfaces for providing application shortcuts, thereby increasing the effectiveness, efficiency, and user satisfaction with such devices. Such methods and interfaces may complement or replace other methods for providing application shortcuts.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method of application shortcuts, in accordance with various embodiments of the present invention.

DESCRIPTION OF EMBODIMENTS

Figure 1A:
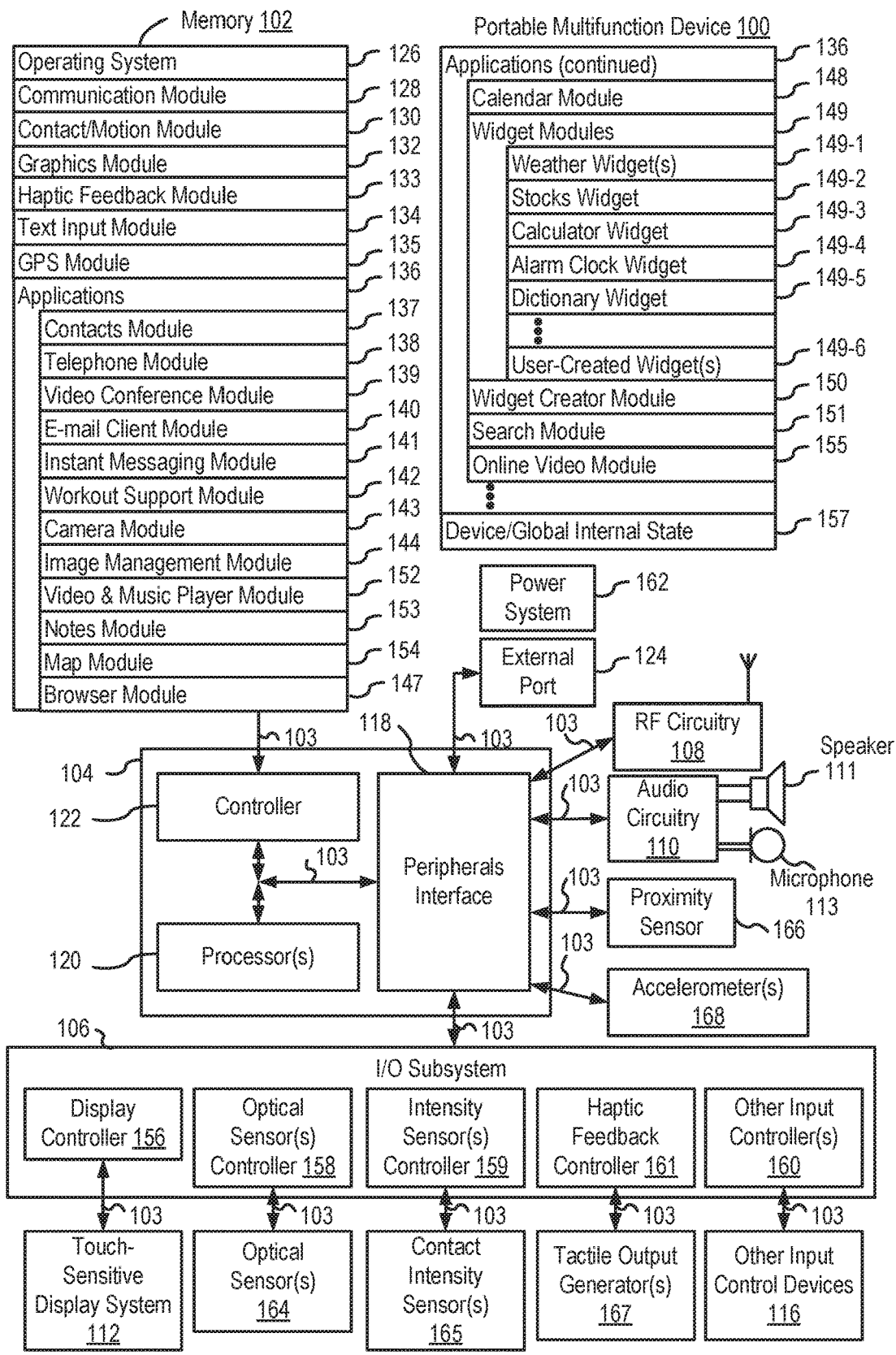
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for application shortcuts. Such techniques can reduce the cognitive burden on a user who accesses such application shortcuts, thereby enhancing productivity. Further, such techniques can reduce processor and battery power otherwise wasted on redundant user inputs.

Below, FIGS. 1A-1B, 2, 3, 4A-4B, 5A and 5B provide a description of exemplary devices for performing the techniques for providing application shortcuts. FIGS. 6A-6N illustrate exemplary user interfaces for providing application shortcuts. FIG. 7 is a flow diagram illustrating methods for providing application shortcuts in accordance with some embodiments. The user interfaces in FIGS. 6A-6N are used to illustrate the processes described below, including the processes in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As an example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U. S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U. S. Patent Publication No. 20050190059, "Acceleration-based Theft Detection System for Portable Electronic Devices," and U. S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
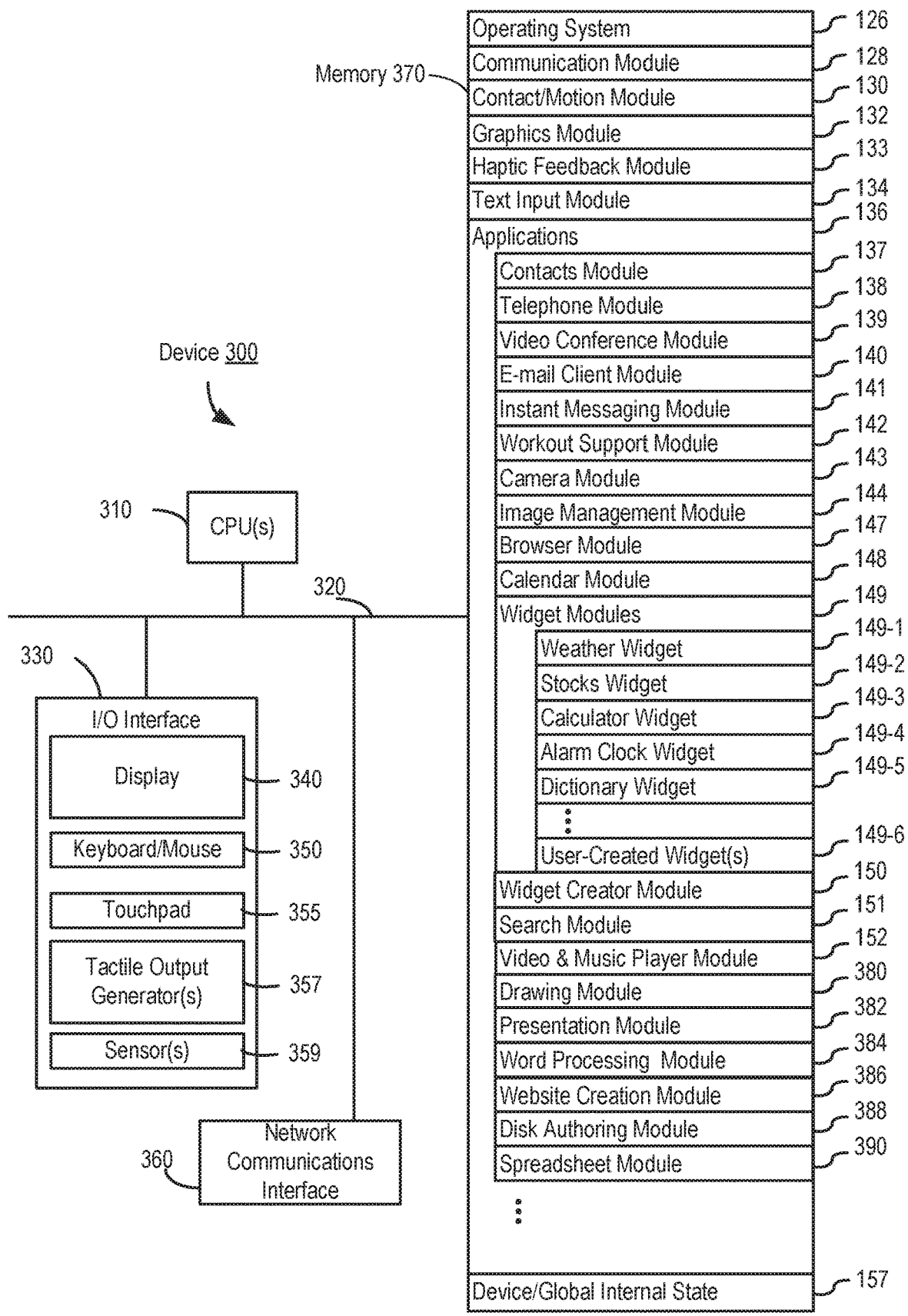
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As an example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
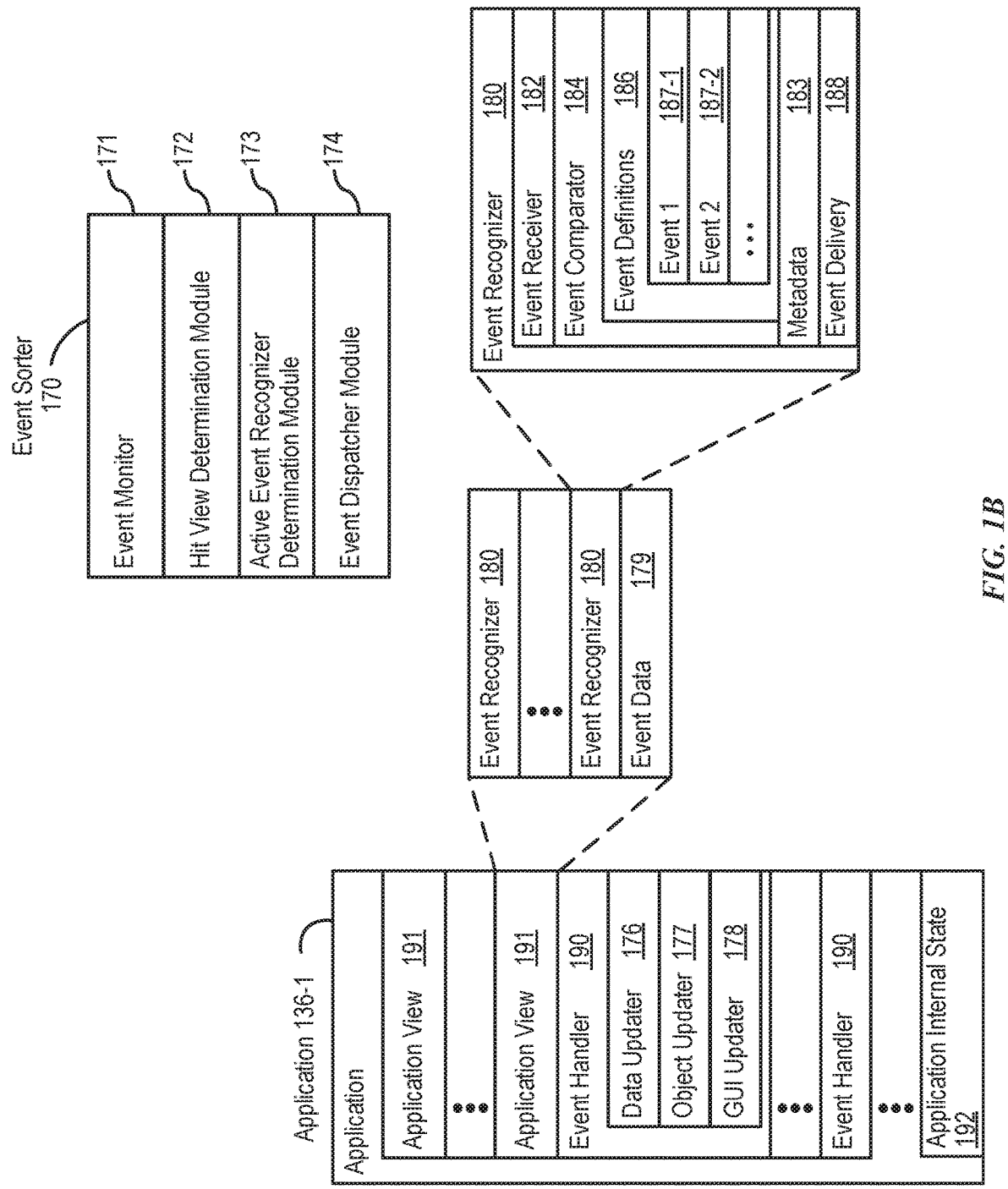
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In an example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
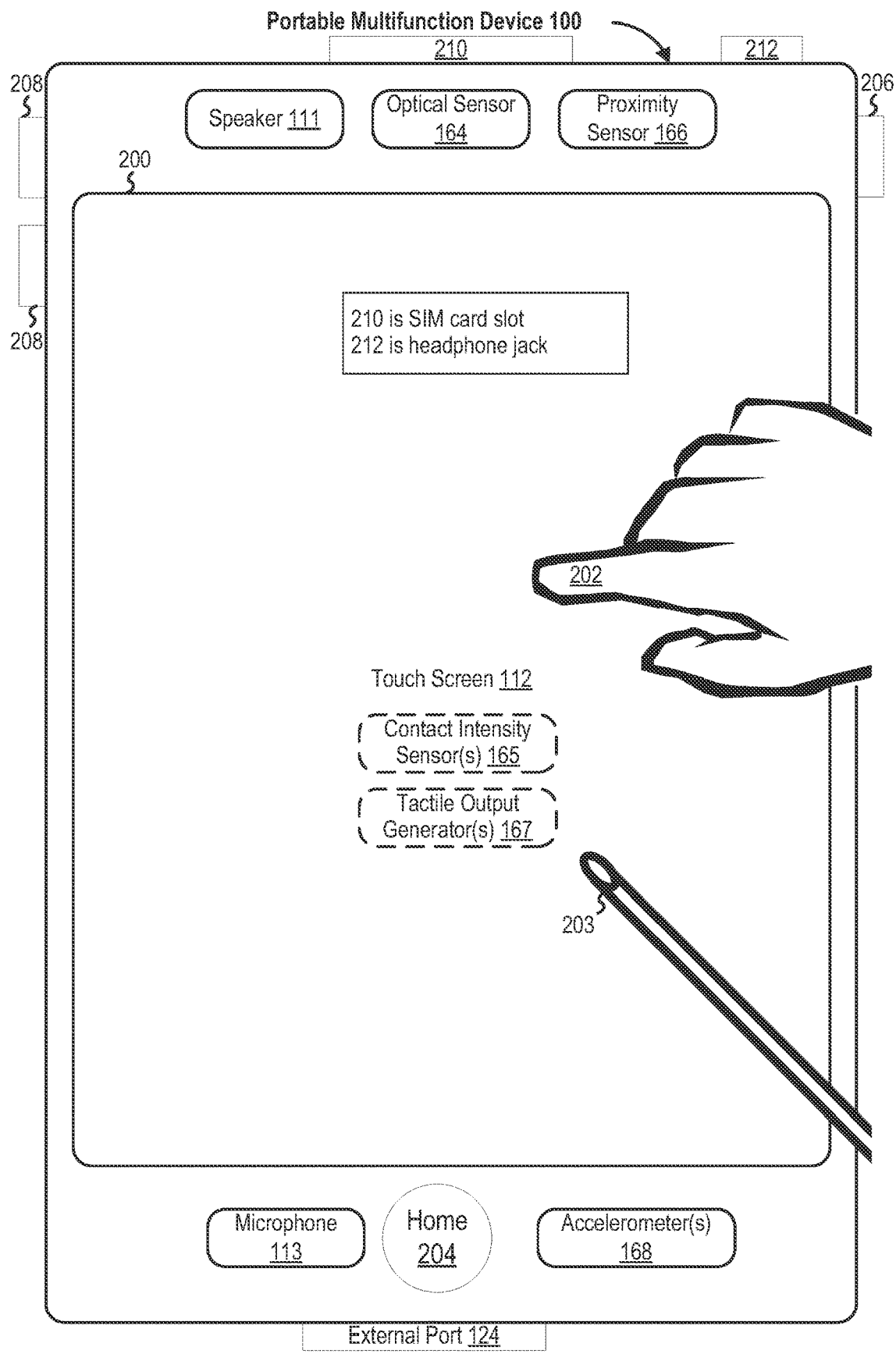
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
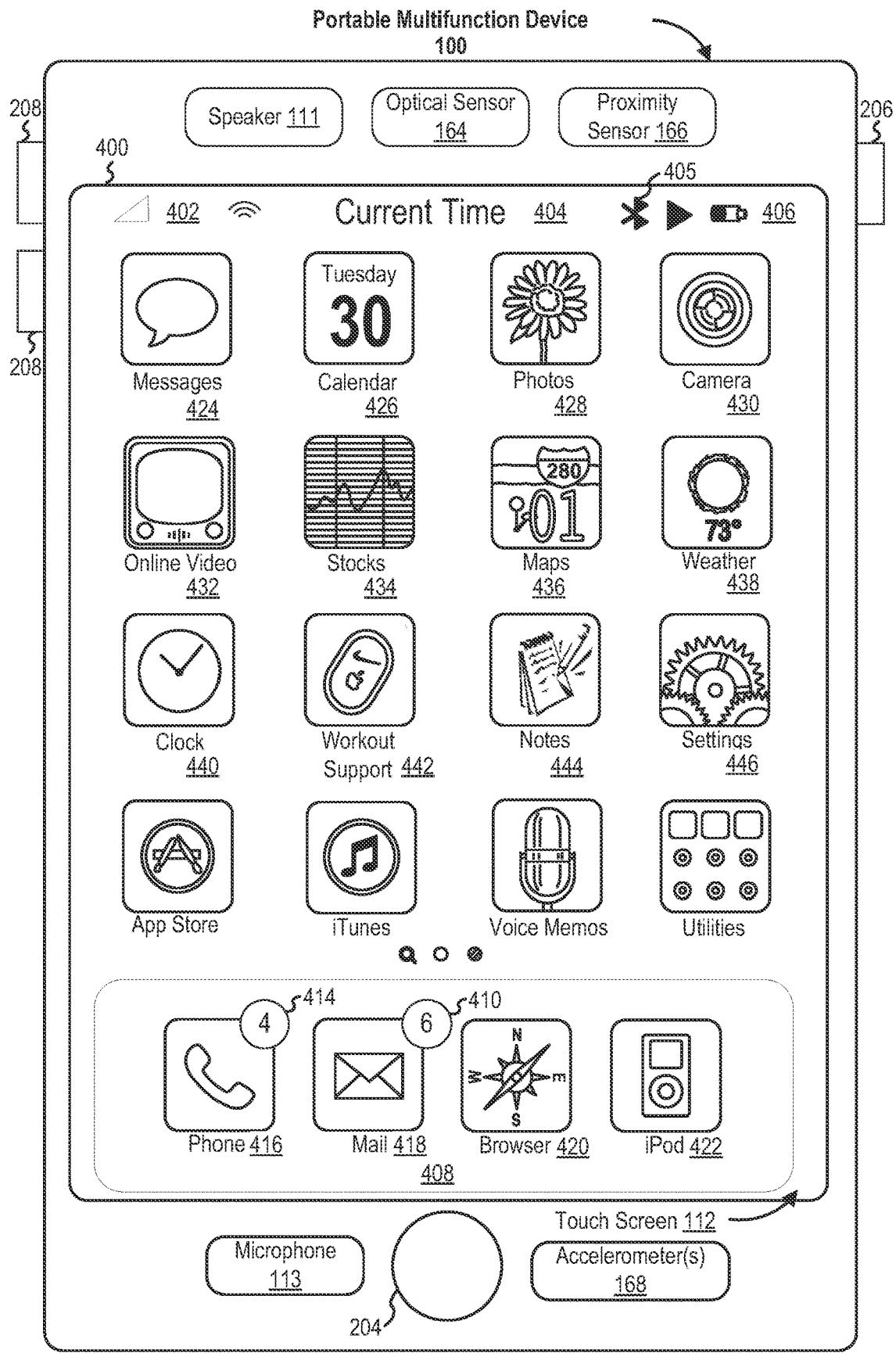
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As an example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
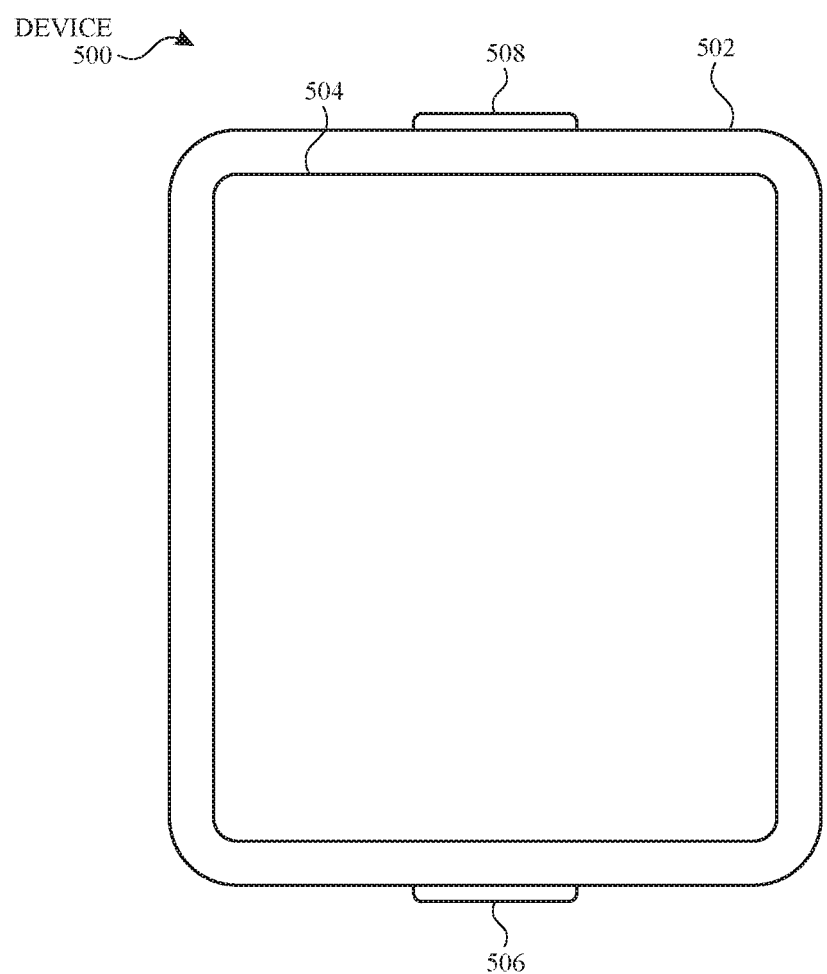
FIG. 5A illustrates a personal electronic device in accordance with some embodiments.
Figure 6A:
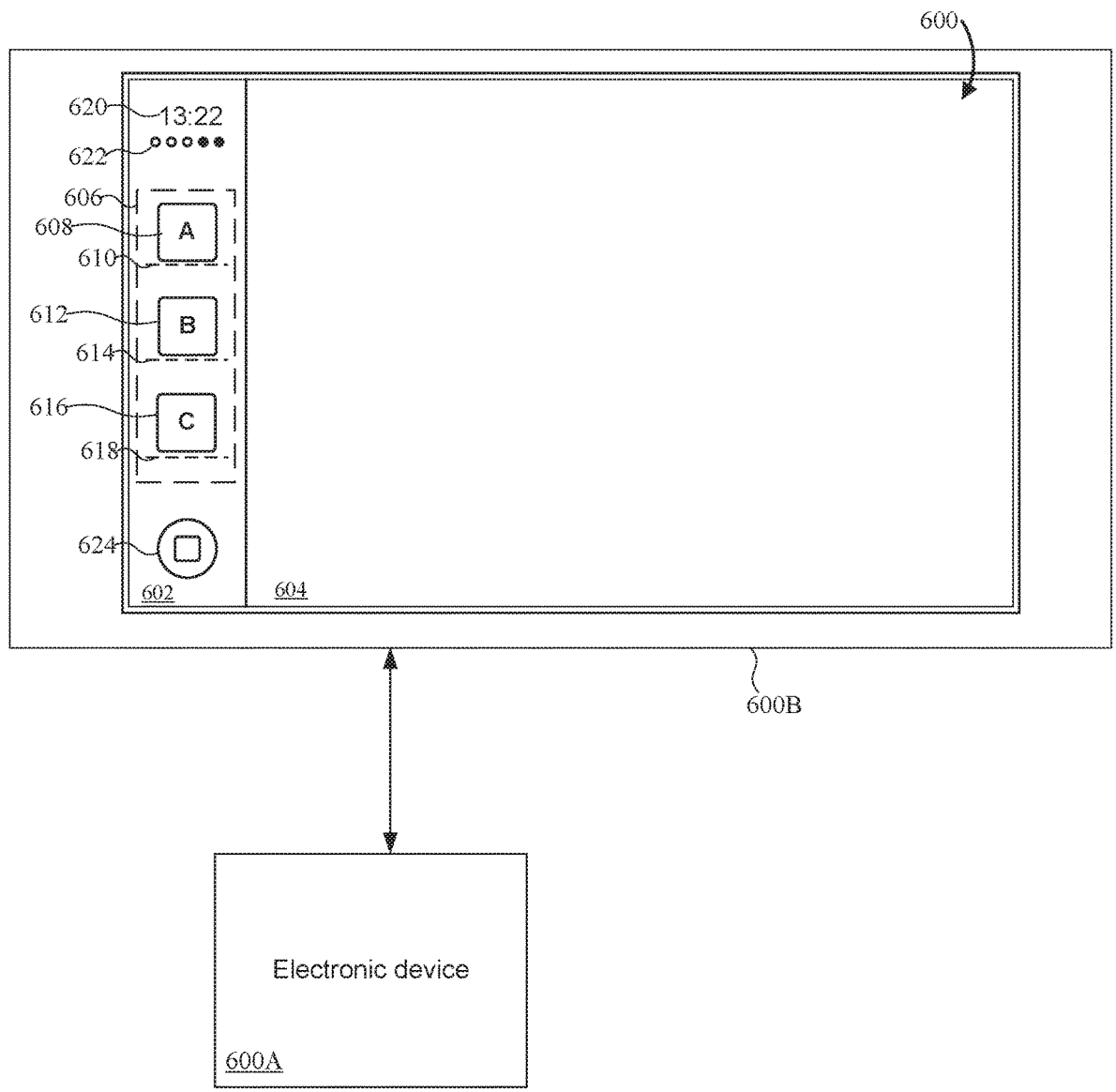
FIG. 6A an example user interface in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
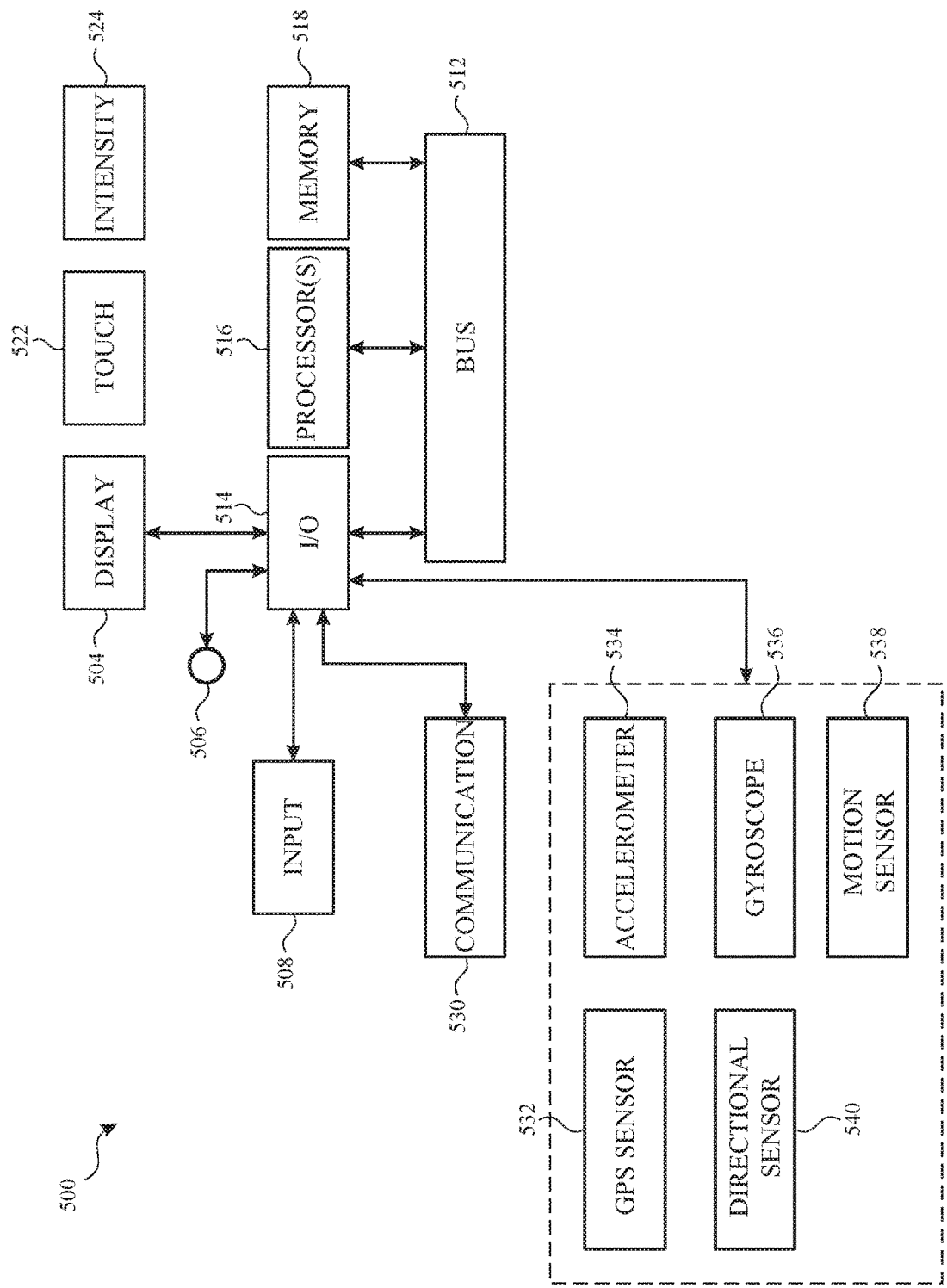
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6N illustrate exemplary user interfaces for application shortcuts in accordance with some embodiments. The user interfaces in these figures are used to illustrate the processes described below, including the processes in FIG. 7.

FIG. 6A illustrates an example user interface 600 for application shortcuts in accordance with various embodiments presented herein. In some examples, the user interface 600 is provided by an electronic device 600A that is in operative communication with a display screen 600B (e.g., a display screen displaying user interface 600). In some embodiments, device 600A includes some or all of the features of device 100, device 300, or device 500, discussed above. Electronic device 600A can optionally be a mobile phone that is in wired (e.g., USB, Lightning) or wireless (e.g., Bluetooth, WiFi) connection with a display screen, or with an external electronic device having a display screen. In some examples, the display screen 600B is provided on a dashboard of an automobile. In that case, the mobile phone (e.g., device 600A) can optionally communicate instruction signals for generating the user interface at the display screen 600B in accordance with various embodiments discussed herein. Further, user interactions detected at the display screen 600B can optionally be communicated to the mobile phone (e.g., device 600A). In some cases, the user interface 600 described herein can optionally be provided at a display screen of the electronic device (e.g., device 600A) itself.

As depicted in FIG. 6A, the user interface 600 includes a first portion 602 and a second portion 604. The first portion 602 is provided along a border of the user interface 600 and contains a shortcuts menu 606 having three application shortcut positions that provide application shortcut affordances that launch, activate, or otherwise cause display of their corresponding applications in the second portion 604, as described further in the succeeding paragraphs below. For example, shortcut affordance A 608 corresponding to an application A is located at a first shortcut position 610, shortcut affordance B 612 corresponding to an application B is located at a second shortcut position 614, and a shortcut affordance C 616 corresponding to an application C is located at a third shortcut position 618. A currently-active application can optionally be displayed in the second portion 604. In this way, the currently-active application is displayed in a main or larger area of the user interface on the display screen 600B and is adjacent to the smaller shortcuts menu 606. In this way, the shortcuts menu occupies minimal screen space and does not interfere with the display of applications.

The first portion 602 can optionally further provide status information such as a current time 620, network connectivity 622 (e.g., wireless signal level) for device 600A, and/or a virtual home button 624 for causing display of a plurality of application launch icons contained on a home screen. The home button 624 enables return to an application launching user interface. While the first portion 602 is provided along a vertical border of the user interface 600, in some examples, the first portion 602 is provided along a horizontal border of the user interface 600, such as above or below the second portion 604. While three shortcut affordances 608, 612, 616, are displayed at three shortcut positions 610, 614, 618, any number of shortcut affordances and/or shortcut positions can optionally be provided in the first portion 602.

Figure 6B:
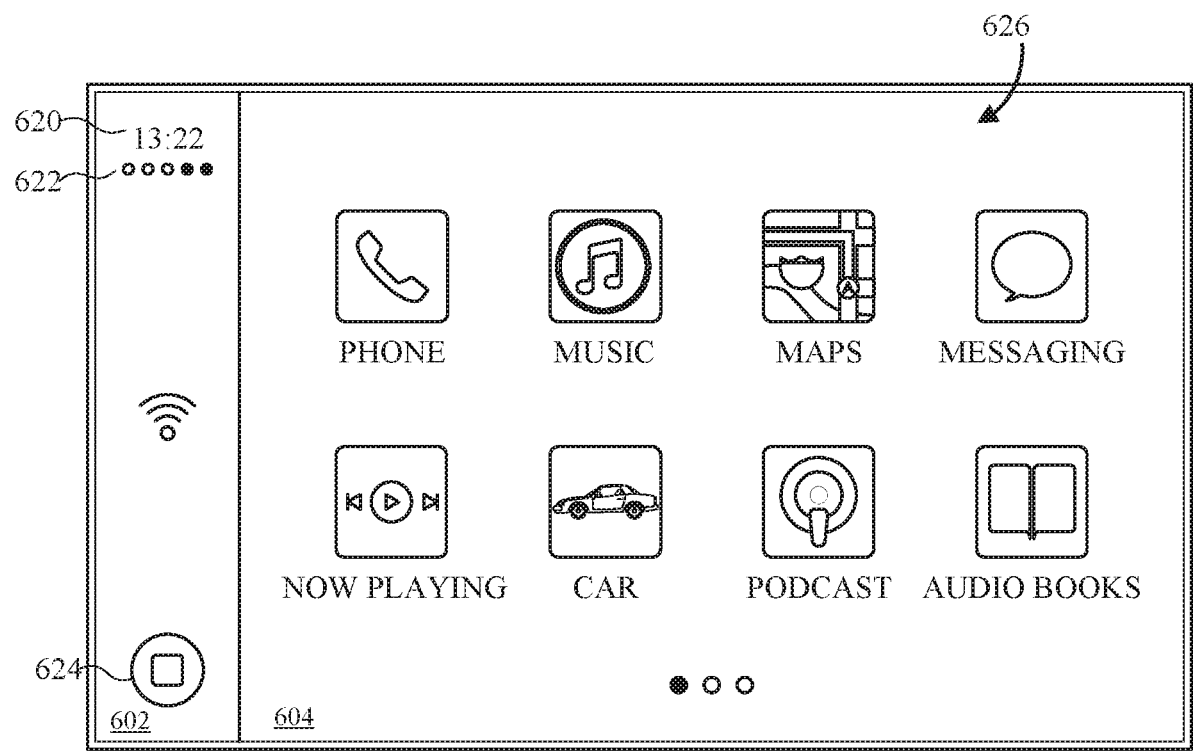
FIG. 6B an example user interface with a home screen in accordance with some embodiments.

In some embodiments, as depicted in FIG. 6B, the shortcuts menu 606 remains displayed unless a home screen 626 is shown. For example, device 600A receives a user input corresponding to a request to display, in the second portion 604, a user interface including a plurality of application launch icons (e.g., home screen 626). The user selection can optionally include user input on the virtual home button 624. The user selection can optionally include user input on a hardware button at device 600A itself. In response to receiving the user input, device 600A causes display of, in the second portion 604 of the user interface 600, the user interface including the plurality of application launch icons (e.g., home screen 626). In some cases, an application that was previously displayed in the second portion 604 is replaced by display of the home screen 626 in response to the user input.

In some examples, device 600A ceases to cause display of the first portion 602 of the user interface 600 when no application is being displayed in the second portion 604. For example, the first portion 602 is removed from the user interface 600 when there is no currently active application being displayed in the second portion 604, such as when the home screen 62 is being displayed. In some examples, the first portion 602 remains displayed in the user interface and provides information other the shortcuts menu 606. For example, the first portion 602 maintains display of the current time 620, network connectivity 622, and/or the virtual home button 624. In some examples, device 600A ceases to cause display of the first portion 602 any time that application launch icons are provided outside of the shortcuts menu 606 in the first portion 602. In that case, redundancy in display of the same application launching affordances can be omitted. In some examples, device 600A maintains display of shortcuts menu 606 while other application launch icons are provided. In that case, the user can easily access an application having a shortcut affordance displayed in the shortcut menu, particularly if there is a large number of application launching affordances that are displayed.

Figure 6C:
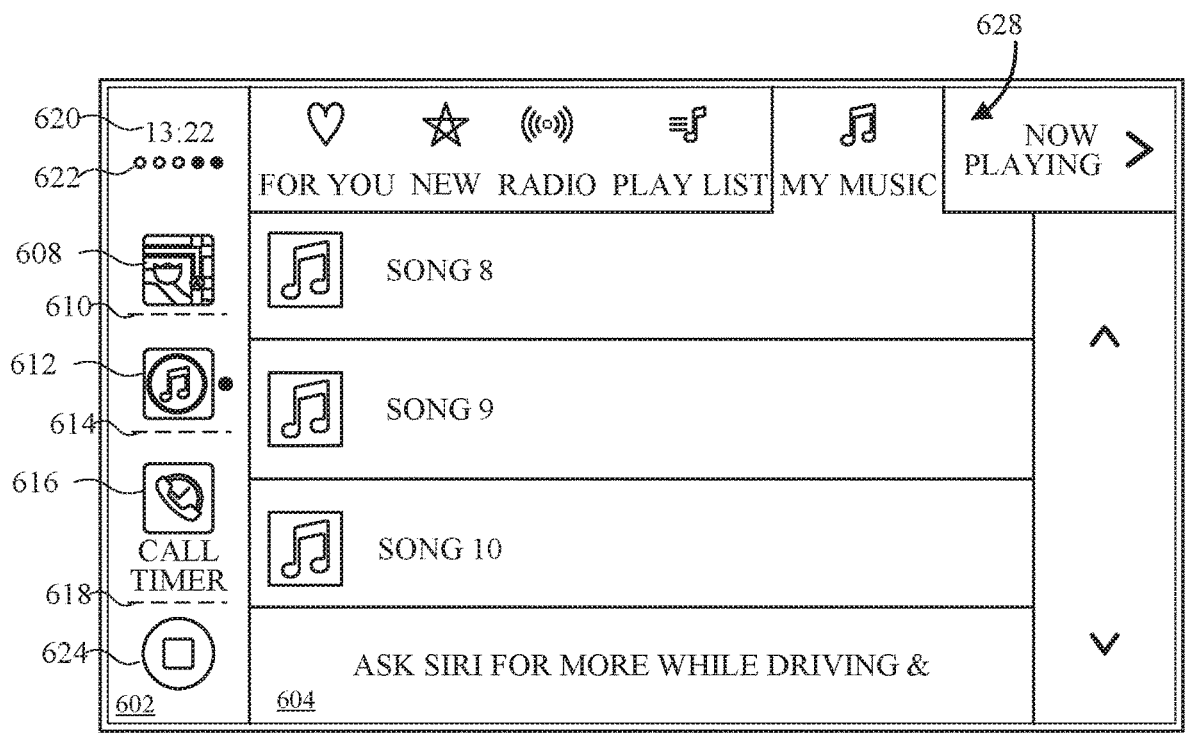
FIG. 6C an example user interface with a music application in accordance with some embodiments.

Turning now to FIG. 6C, the first portion 602 includes the shortcuts menu 606 of and the second portion 604 includes a music application interface 628 that is displayed upon user selection of a music launch icon on the home screen 626 at FIG. 6B. Selection of any application launch icon provided on the home screen 626 can display the corresponding application user interface in the second portion 604, and/or cause display of the shortcuts menu 606 since the home screen 626 is no longer displayed. Here, example shortcut affordances include a maps shortcut affordance corresponding to a maps application, a music shortcut affordance corresponding to a music application, and a phone shortcuts affordance corresponding to a phone application. The maps shortcut affordance is provided at the first shortcut position 610 and is an example of shortcut affordance A 608. The music shortcut affordance is provided at the second shortcut position 614 and is an example of the shortcut affordance B 610. The phone shortcuts affordance is provided at the third shortcut position 618 and is an example of shortcut affordance C 614. In some embodiments, each shortcut position 610,614,618 corresponds to a distinct category of applications. For example, the first shortcut position 610 corresponds to a first category of applications, such as a navigation category. The second shortcut position 614 corresponds to a second category of applications, such as a multimedia category. The third shortcut position 618 corresponds to a third category of applications, such as a communications category.

In some embodiments, the first shortcut position 610, the second shortcut position 614, and the third shortcut position 618 are displayed in a fixed arrangement relative to one another in the first portion 602. For example, any or all of the shortcut positions can optionally be displayed in a predefined arrangement relative to one another on the shortcuts menu 606. In practice, consistency in display of particular categories of applications enables the user to know where to look for certain application shortcuts.

Figure 6D:
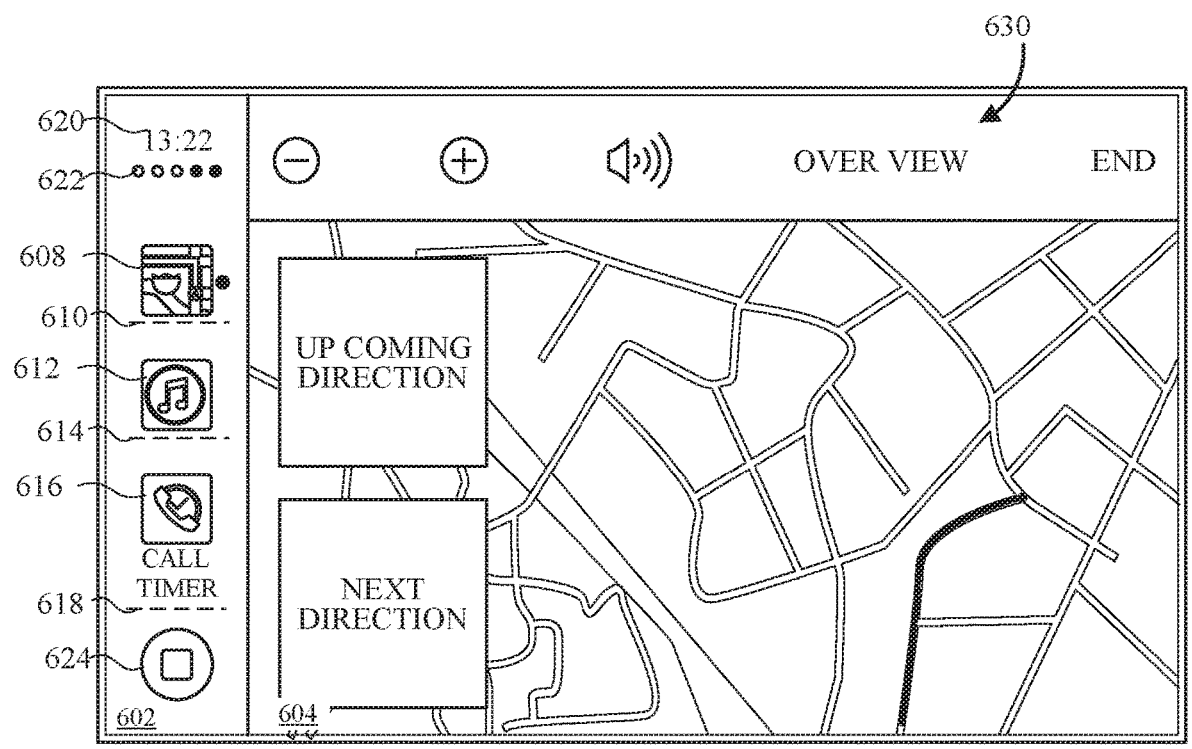
FIG. 6D an example user interface with a maps application in accordance with some embodiments.

As further shown in FIG. 6C, the music application shortcut at the second shortcut position 614 includes an indicator (e.g., dot) indicating that the music application user interface is displayed in the second portion 604. In general, an indicator is associated with a particular shortcut position 610, 614, 618 and/or particular shortcut affordance 608, 610, 616 when a corresponding application is active. For example, FIG. 6D shows a maps application interface 630 that is displayed upon user selection of a maps launch icon on the home screen 626 at FIG. 6B. Here, the indicator is displayed adjacent to the maps shortcut affordance at the first shortcut position.

Figure 6E:
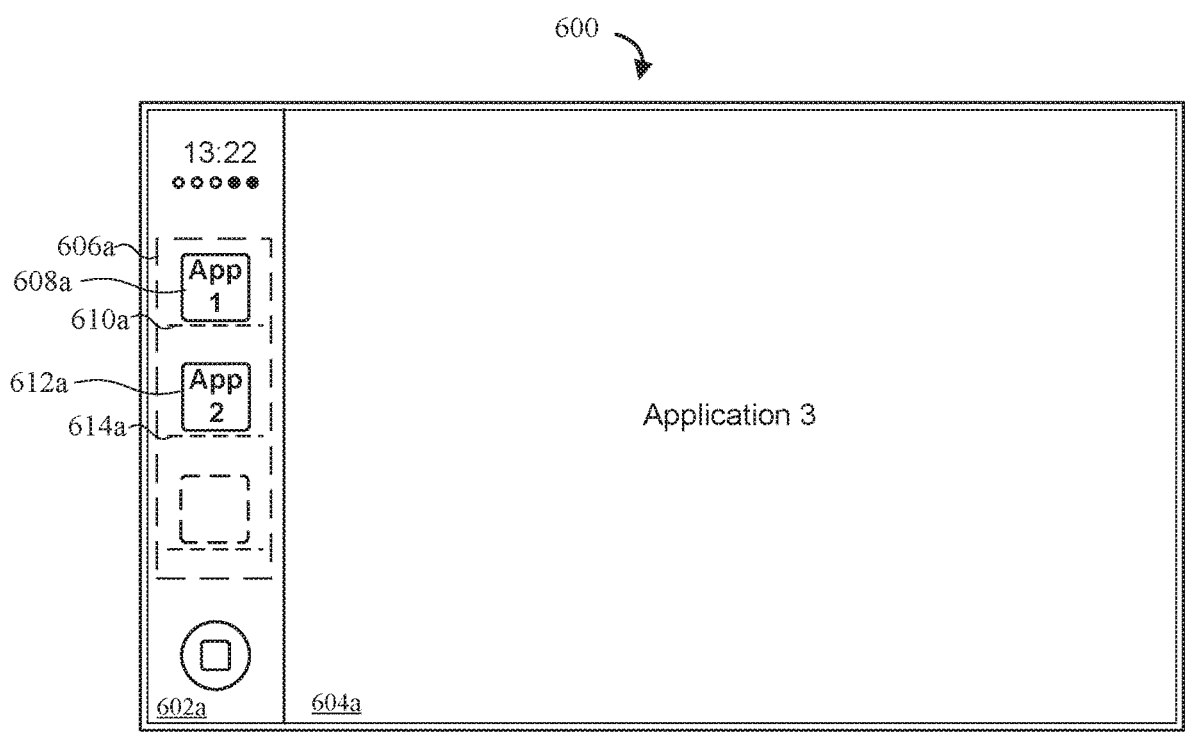
FIGS. 6E and 6F show example user interfaces in accordance with some embodiments.

Turning now to FIG. 6E, an example user interface 600 is shown in accordance with various embodiments. Here, shortcuts menu 606a provides two shortcut positions, first shortcut position 610a and second shortcut position 614a. Each shortcut position corresponds to a distinct category of applications. For example, a first shortcut affordance 608a is displayed at the first shortcut position 614a that is separate and distinct from the second shortcut affordance 612a provided at the second shortcut position 614a. The second shortcut position 614a corresponds to a second category of applications that is distinct from the first category of applications, which corresponds to the first shortcut position 610a. In this way, the first category of applications and the second category of applications do not have any common applications between them. Additional shortcut positions and shortcut affordances can optionally be provided, as indicated in FIG. 6E. Each shortcut position can be automatically updated with different shortcut affordances when certain applications within their respective categories meet certain criteria. Each shortcut position can have a different set of criteria, as discussed further below.

For example, while device 600A displays the first shortcut affordance 608a at the first shortcut position 610a and the second shortcut affordance 612a at the second position 614a, device 600A can detect a sequence of one or more inputs, such as touch inputs, rotatable knob inputs, voice commands, and/or any other type of user interaction with the user interface 600, such as interactions with elements in the first portion 602a or the second portion 604a of the user interface 600. In some cases, in response to detecting the sequence of one or more inputs, device 600A determines that the sequence of one or more inputs corresponds to interaction with a third application. For example, the sequence of one or more inputs correspond to activation of a function of the third application, which can optionally include, initiating a voice or telephone call, starting a turn-by-turn navigation session, starting audio playback of a music or audio book, and so on. For instance, the sequence of one or more inputs can optionally correspond to a user input on the third application as it is displayed on the display screen 600B at the second portion 604a of the user interface 600.

Figure 6F:
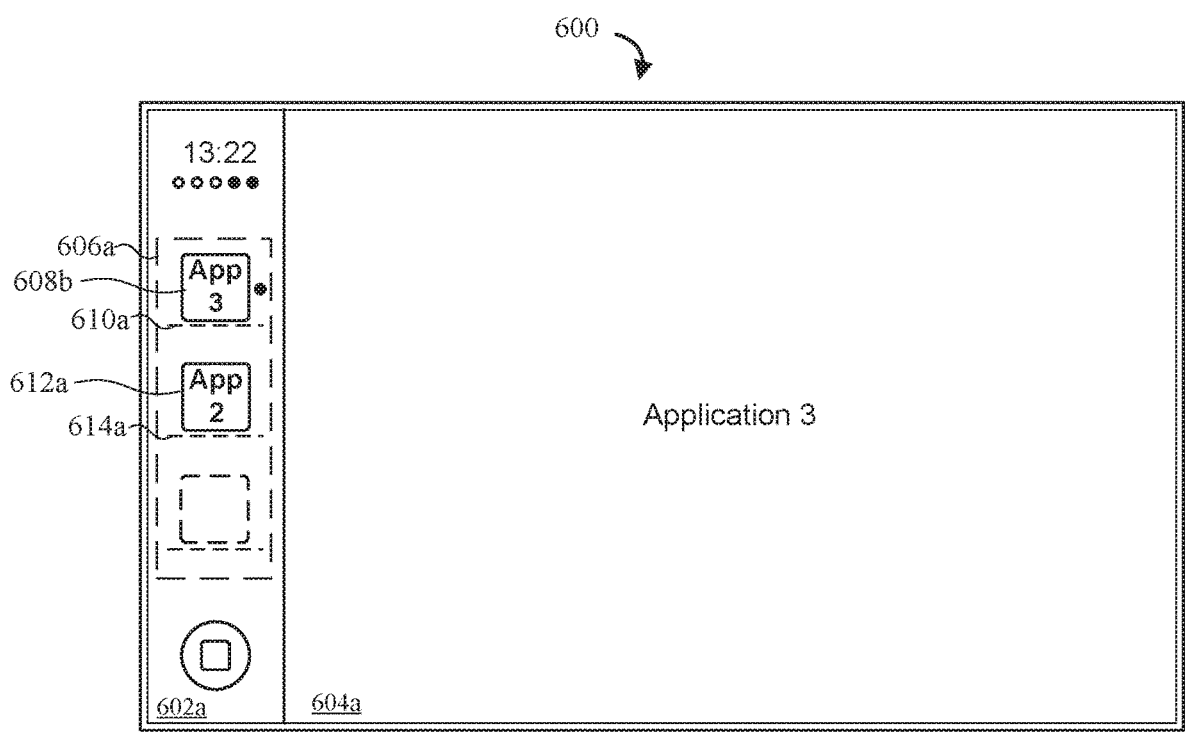
Figure 6G:
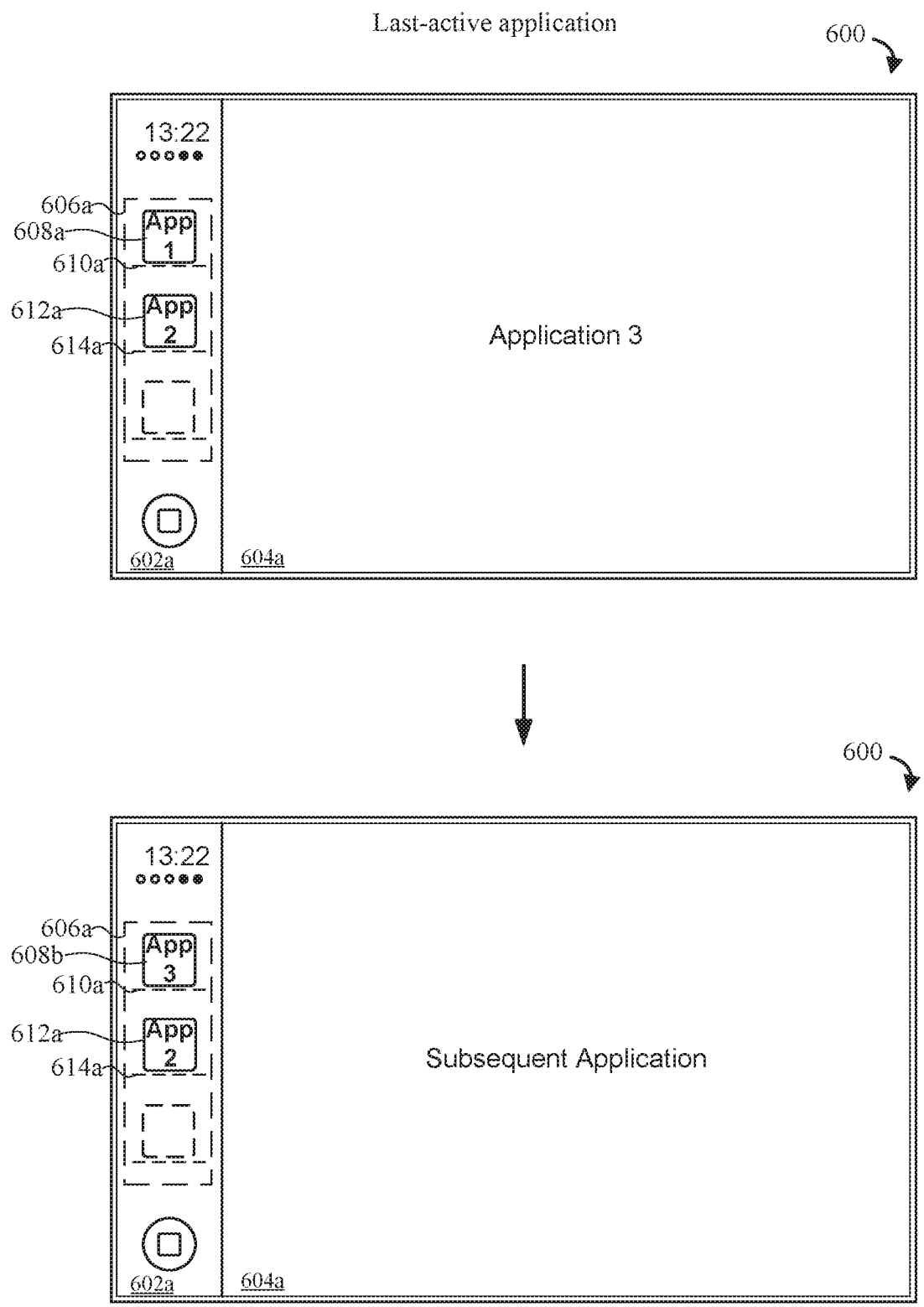
FIG. 6G is an example user interface based on a last-active application criterion in accordance with some embodiments.
Figure 6H:
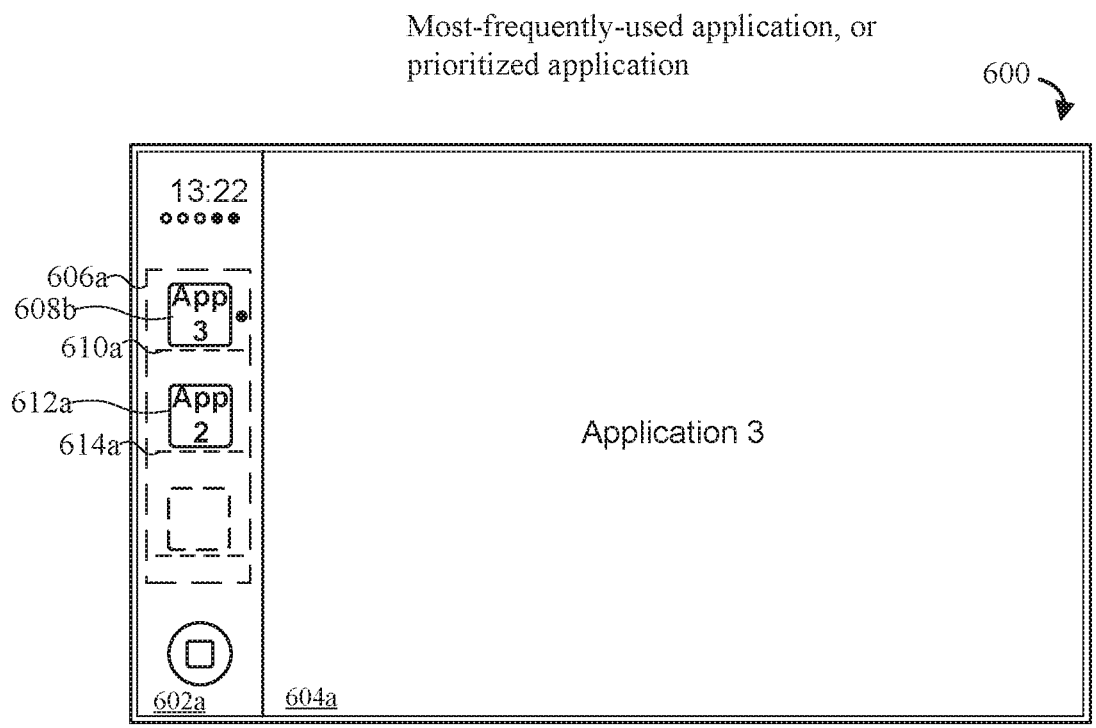
FIGS. 6H-6I is an example user interface based on a most-frequently-used or prioritized application criterion in accordance with some embodiments.
Figure 6I:
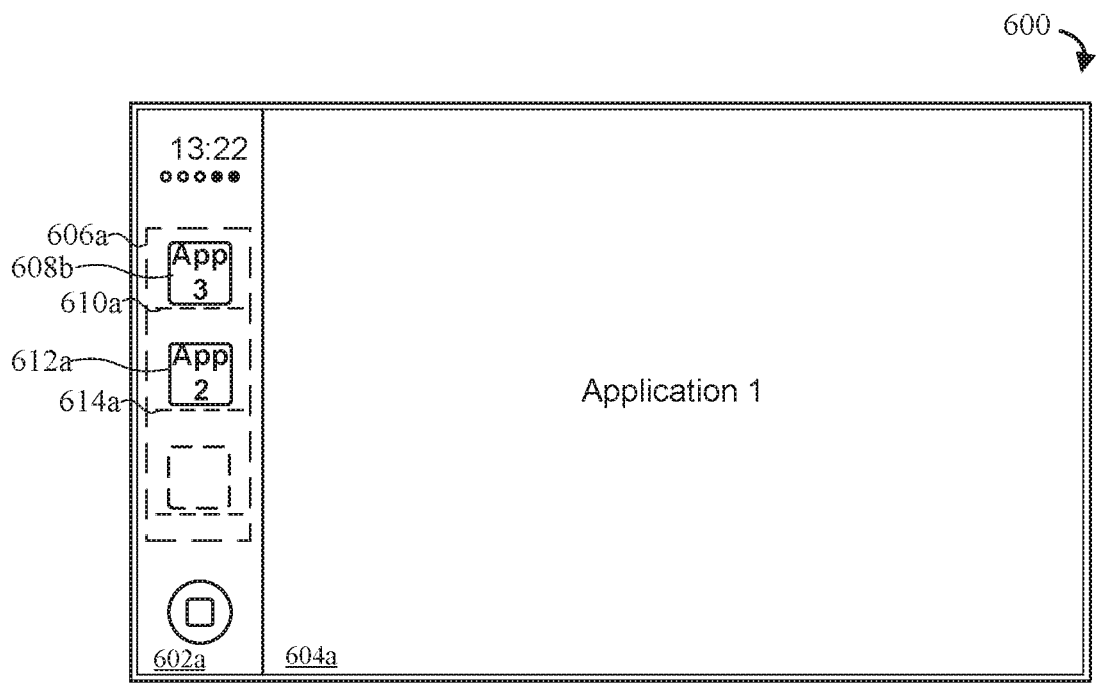
Figure 6J:
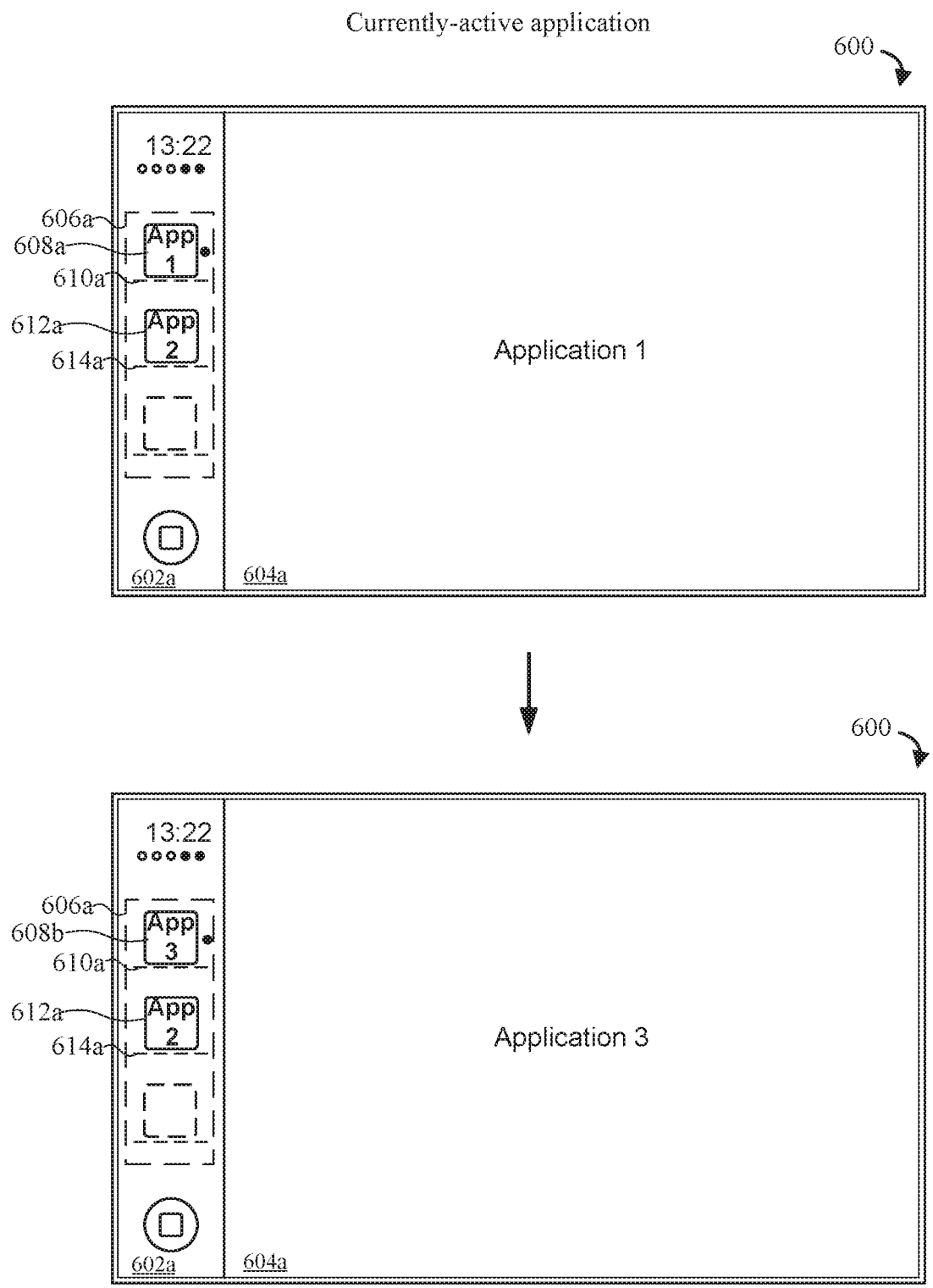
FIG. 6J is an example user interface based on a currently-active application criterion in accordance with some embodiments.
Figure 6K:
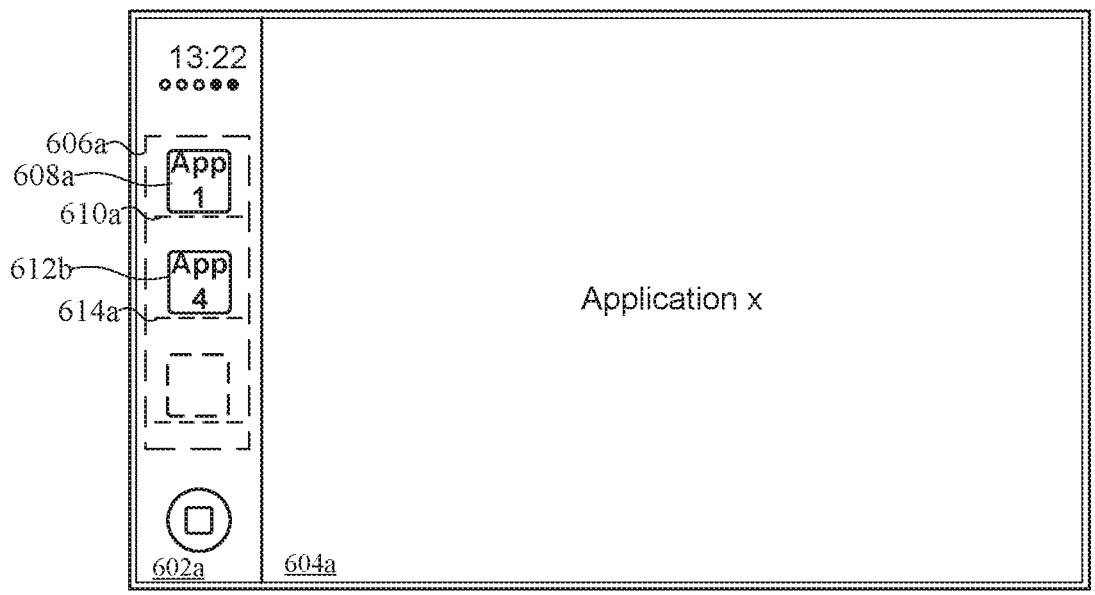
FIGS. 6K-6L is an example user interface based on second shortcut replacement criteria in accordance with some embodiments.
Figure 6L:
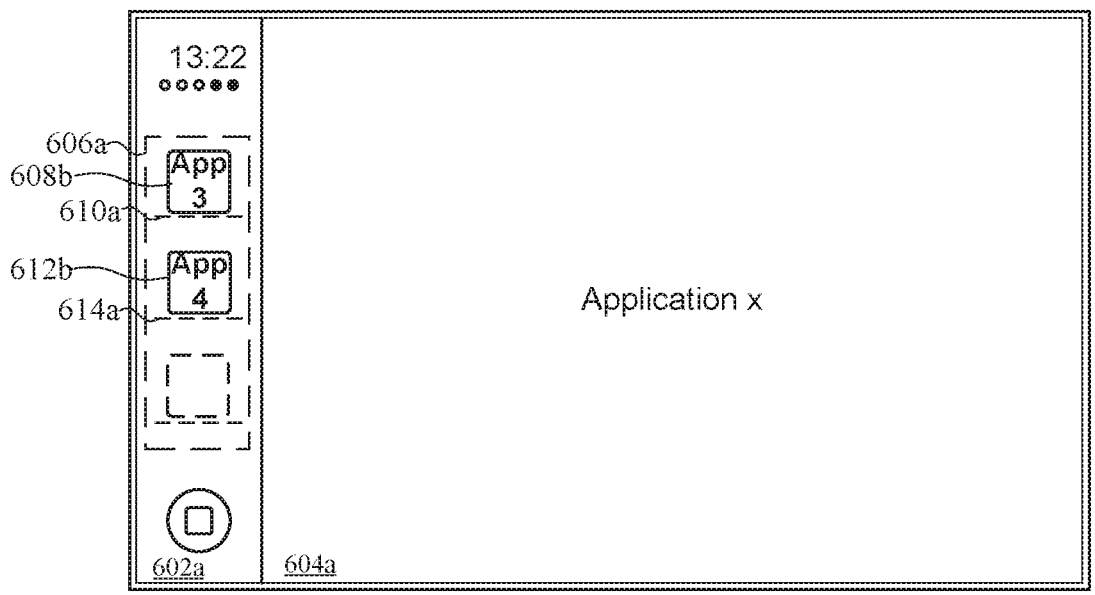

In some examples, in response to detecting the sequence of one or more inputs, the device 600A determines whether the sequence of one or more inputs changes the status associated with the third application to the status that meets the first shortcut replacement criteria for the first shortcut position 610a. In that case, the device (e.g., device 600A) optionally causes the first shortcut affordance 608a that is displayed to cease to be displayed. The device (e.g., device 600A) can optionally cause the first shortcut affordance 608*a* to be replaced with display of a third shortcut affordance 608*b* that corresponds to the third application (FIG. 6F). In that case, the third shortcut affordance 608*b* is displayed at the first shortcut position 606*a*. At the same time, the second shortcut affordance 612*a* is, optionally, maintained on the display, independent of the change in the first shortcut position 610*a*.

In some embodiments, the status corresponding to the third application can optionally be a usage-based status and/or a priority-based status. Further, in some embodiments, the first shortcut replacement criteria include a criterion that is met when the third application belongs to the first category of applications. In some embodiments, and as discussed further below, other criterion that are included in the first shortcut replacement criteria include one or more of: a last-used criterion, most-currently-used criterion, currently-in-use criterion, and/or priority-based criterion such as a high priority application.

Referring back to FIG. 6E, in some embodiments, while displaying the first shortcut affordance 608*a* at the first shortcut position 610*a* and the second shortcut affordance 612*a* at the second shortcut position 614*a*, device 600A detects the sequence of one or more inputs and in response to detecting the sequence of one or more inputs, device 600A determines that the sequence of one or more inputs does not change the status corresponding to the third application to the status that meets the first shortcut replacement criteria. In that case, in accordance with the determination, device 600A causes the first shortcut position 610*a* to maintain display of the first shortcut affordance 608*a*. For example, the device (device 600A) can optionally forgo ceasing to display the first shortcut affordance 608*a* at the first shortcut position 610*a* and/or forgo replacing the first shortcut affordance 608*a* at the first shortcut position 610*a* with the third shortcut affordance 608*b*.

In some embodiments, the criterion is a last-active application. For example, the first shortcut replacement criteria includes a criterion that is met when the third application is a last-active application, such as last-active application that was an application in the first category of applications that was most recently displayed on the display. For example, the status of the third application indicates that the application is a last-active application from the first category of applications. In an example shown in FIG. 6G, display of the third application has been replaced by display of a subsequent application, which therefore causes the status of the third application to meet the last-active application criterion.

In some embodiments, the criterion is a most-frequently-used application. For example, the first shortcut replacement criteria include a criterion that is met when the third application is a most-frequently-used application. In this case, the status of the third application indicates that the third application is a most-frequently-used application from the first category of applications. In an example, a most-frequently-used application is displayed on the display screen 600B while a shortcut affordance corresponding to the most-frequently-used application is displayed at a shortcut position (FIG. 6H). In other cases, the most-frequently-used application is not displayed or is not currently active, yet its corresponding shortcut affordance is displayed (FIG. 6I).

In some embodiments, the criterion is a currently-active application, where the first shortcut replacement criteria includes a criterion that is met when the third application is a currently-active application that was an application in the first category of applications that was most recently performing a function. For example, the status of the third application indicates that the third application is currently being displayed. In this case, the shortcut affordance for the third application is displayed while the third application is being displayed (FIG. 6J). As shown in FIG. 6J, the first application is active while first shortcut affordance 606*a* is displayed. Subsequently, in response to user input to activate the third application, the third application is displayed, and the third shortcut affordance 608*b* replaces the first application shortcut affordance 608*a*.

In some embodiments, the criterion is a prioritized application where the first shortcut replacement criteria includes a criterion that is met when the third application corresponds to a prioritized application that was an application in the first category of applications that has a highest priority. Here, for example, the status of the third application indicates that the third application is a high priority application within the first category of applications. In some cases, the prioritized application is displayed on the display screen 600B while its shortcut affordance is displayed at a shortcut position (FIG. 6H). In other cases, the prioritized application is not displayed or is not currently active, yet its shortcut affordance is displayed (FIG. 6I). Merely by way of example, a high priority application is user-specified. For example, a user specifies a communications application as a high priority application for display at a shortcut position. In some cases, any application that is deemed a high priority application is always displayed at a shortcut position, and/or given preference for display at the shortcut position under certain conditions, such as when two or more applications meet shortcut replacement criteria for a common shortcut position. In an example, high priority status of an application is dynamic and linked to a time of day such that the status drops in priority at other times of day. In some embodiments, a user schedules a telephonic application as a prioritized application having a corresponding shortcut affordance being displayed at the shortcut position during weekday mornings to answer phone calls during their work commute, while another application in the same category takes priority and occupies the shortcut position on weekend mornings. In some embodiments, the high priority status aids in determining which application of multiple applications that meet certain criteria for a common shortcut position should be displayed.

In some cases, the shortcut replacement criteria include the foregoing usage-based criterions, such as the last-active, most-frequently-used, and/or currently-active criterions. In some cases, the shortcut replacement criteria include various priority-based criterions, such as the high-priority based criterion described previously. It is noted that the shortcut replacement criteria can optionally include any number of criterions for determining which application should be placed in a shortcut position. It is further noted that shortcut criteria can optionally vary independently among the different shortcut positions, and can optionally include any combination of the foregoing types of criterion.

In some examples, a second set of shortcut replacement criteria is implemented. Merely by way of example, the device detects a second sequence of one or more inputs and in response to detecting the second sequence of one or more inputs, the device determines whether the second sequence of one or more inputs changes the status corresponding to the third application to a status that meets a second shortcut replacement criteria that corresponds to the second shortcut position 614*a*. In some ways, the second shortcut replacement criteria include similar, same, or different criterions as the first shortcut replacement criteria.

In some embodiments, in accordance with a determination that the second sequence of one or more inputs changes the status corresponding to the fourth application to a status that meets the second shortcut replacement criteria, device 600A replaces the second shortcut affordance 612a with display of a fourth shortcut affordance 612b corresponding to the fourth application at the second shortcut position 614a. At the same time, device 600A maintains display of the first shortcut affordance 608a on the display (FIG. 6K), or maintains display of the third shortcut affordance 608b (FIG. 6L), since they would not be affected. In some embodiments, as shown in FIGS. 6K and 6L, "Application x" is the fourth application displayed, in accordance with various embodiments discussed herein. For example, the status corresponding to the fourth application includes a status that is based on usage and/or priority of the fourth application. The second shortcut replacement criteria can optionally include, for example, criterion that includes usage-based criterion (e.g., last-used, most-frequently-used, currently-in-use) or other priority-based criterion (e.g., high-priority application). In some cases, upon determination that the status of the fourth application meets the second shortcut replacement criteria, the device (e.g., device 600A) automatically replaces the existing second shortcut affordance 612a at the second shortcut position 614a for the second application with the fourth shortcut affordance 612b for the fourth application.

In some examples, in accordance with a determination that the second sequence of one or more inputs does not change the status corresponding the fourth application to the status that meets the second shortcut replacement criteria, the device (e.g., device 600A) causes the second shortcut affordance to be maintained on the display. For example, the device (e.g., device 600A) forgoes replacing display of the second shortcut affordance.

As described above, the second shortcut replacement criteria can optionally include any of the above-discussed criterions that are usage-based and/or priority based. Further, the second shortcut replacement criteria can optionally include a criterion that is met when the fourth application is distinct from the first application. In another aspect, the second shortcut replacement criteria can optionally include a criterion that is met when the fourth application does not belong to the first category of applications. In this way, as discussed previously, the first shortcut position 610a and the second shortcut position 614a provide different shortcut affordances for different applications so that no shortcuts to the same application are shown.

In some examples, the third shortcut affordance includes information related to an ongoing activity at the third application. For instance, while displaying the third shortcut affordance, device 600A causes display of information related to the ongoing activity at the third application adjacent to the third shortcut affordance and/or incorporated in the third shortcut affordance (see, e.g., FIG. 6C, third shortcut affordance 616 with call timer). Therefore, in some examples, a shortcut affordance is animated and/or dynamic rather than a still icon. In some embodiments, when the third application or any application having a corresponding shortcut affordance is a prioritized application, device 600A causes the additional information to be displayed, such as a running duration of a phone call and/or indications, directions and/or arrows related to an ongoing turn-by-turn navigation session. In some examples, shortcut affordances described herein are based on and/or the same as a normal default application launch affordance of the application. For example, shortcut affordances described herein are distinct from the default application launch affordances, such as affordances provided on a home screen of the display, and/or can include the additional information related to ongoing activity as described above.

The third shortcut affordance optionally corresponds to a phone application and displaying the third shortcut affordance includes displaying an active timer for the phone call (see, e.g., FIG. 6C, third shortcut affordance 616 with call timer). In some examples, the third shortcut affordance corresponds to a maps application and displaying the third shortcut affordance includes displaying at least one of an estimated time of arrival and turn-by-turn directions.

Figure 6M:
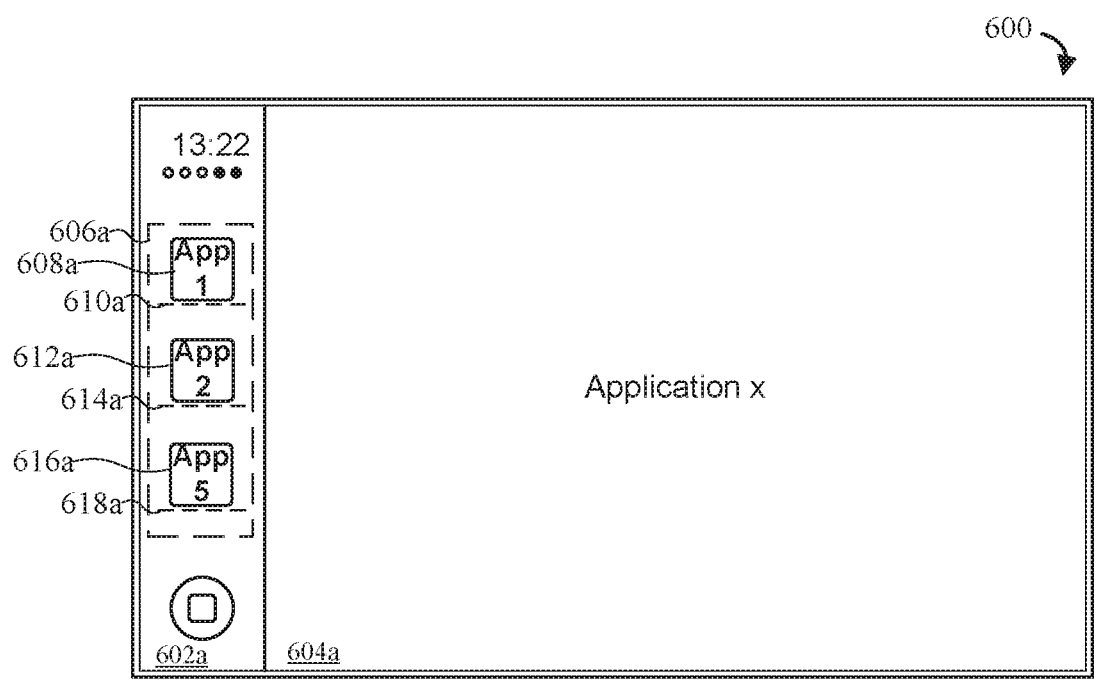
FIG. 6M is an example user interface with a third application shortcut position in accordance with some embodiments.
Figure 6N:
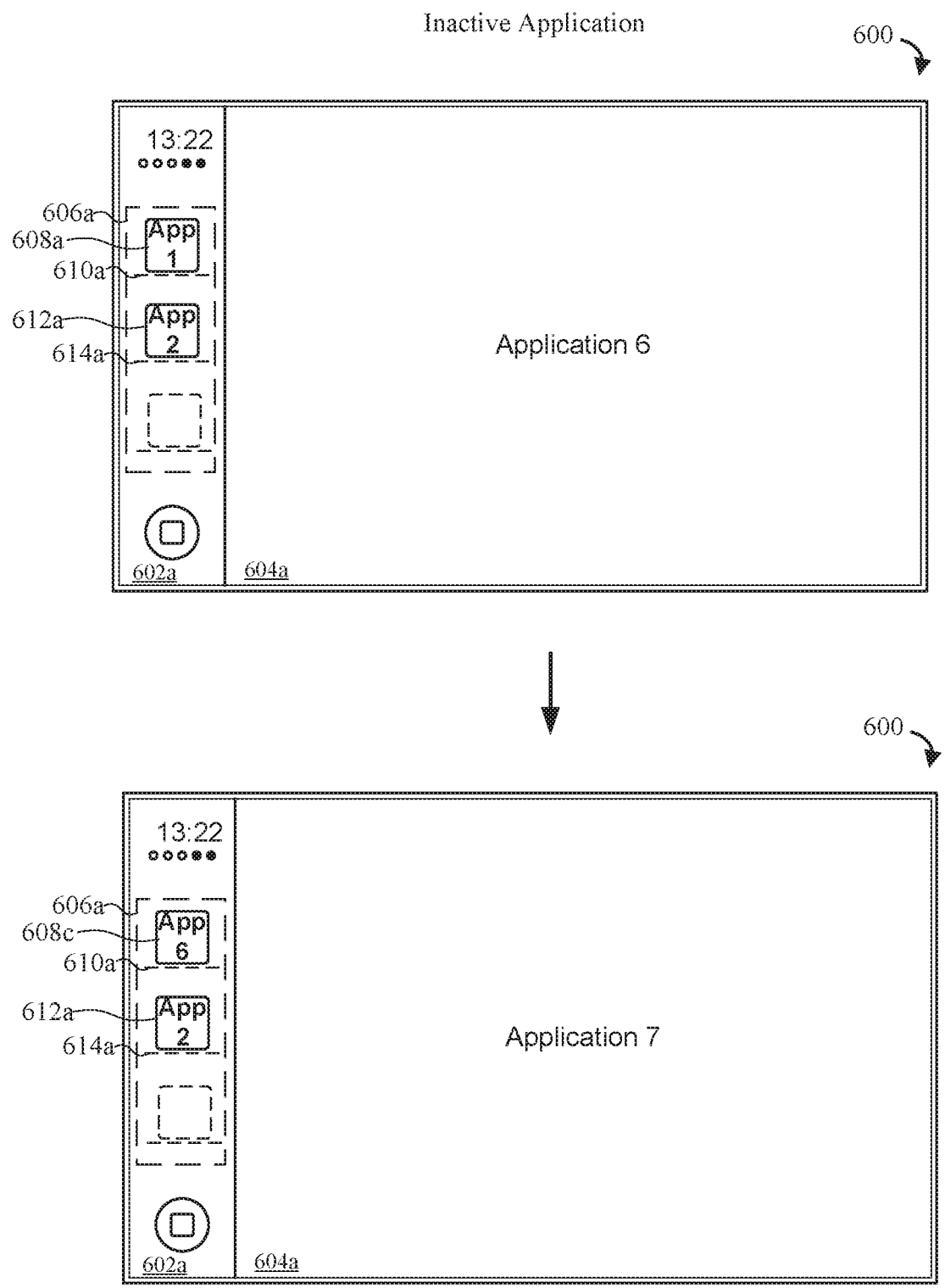
FIG. 6N is an example user interface based on detection of an inactive application in accordance with some embodiments.

Turning now to FIG. 6M, in some embodiments, the user interface 600 includes a third shortcut position 618a that corresponds to a third category of applications distinct from the first category of applications and the second category of applications. In some examples, all three shortcut positions can optionally display different shortcut affordances corresponding to different applications. For example, a fifth shortcut affordance 616a corresponding to a fifth application is displayed at the third shortcut position 618a. In some embodiments, the fifth shortcut affordance corresponds to the phone application with the active timer displaying a duration of an ongoing phone call (see, e.g., FIG. 6C, third shortcut affordance 616 with call timer). In some examples, the fifth shortcut affordance 616a is a fixed affordance at the third shortcut position 618a. Still, in some example, the third shortcut position 618a is based on third replacement criteria.

In some embodiments, the first category and the second category are distinct. For example, the first category of applications and the second category of applications do not have any common application that belongs to both the first category of applications and the second category of applications. In this case, the first shortcut position 610a and the second shortcut position 612a provide different shortcut affordances so that there are no repeated shortcuts, which waste resources.

In some embodiments, at least one of the first category of applications and the second category of applications includes a maps category associated with navigation-related applications. For example, in some embodiments, the maps category is a fixed category at the first shortcut position or the second shortcut position. In some embodiments, navigation-related applications are desirable as occupying a shortcut position where travel and/or transportation is relevant.

In some embodiments, at least one of the first category of applications and the second category of applications includes a multimedia category. For example, at least one of the first category of applications and the second category of applications includes a multimedia category associated with multimedia applications, such as a music category associated with music applications and/or a podcast category associated with various podcast sources or providers.

In some embodiments, at least one of the first and second categories of applications is a communications category associated with communications applications. Merely by way of example, communications applications include a phone application or text messaging application. The communication applications category can optionally be a fixed category and/or an optional category for a shortcut position.

In some embodiments, the categories described herein can optionally be fixed categories for certain shortcut positions and/or can optionally be removed upon user request. In other aspects, a user can optionally define or create a category of applications and populate the category. Merely by way of example, a user defines a "favorites" category, populates the favorites category with their favorite applications, and defines one or more criterion for determining which of the favorite applications is displayed with a shortcut affordance.

In some embodiments, the last-active criterion is met by an application status that indicates a period of inactivity of the application. For example as shown in FIG. 6N, a currently-active application is a sixth application. Device 600A can optionally detect that the sixth application that is displayed in the second portion 604a of the user interface 600 is inactive for a predetermined period of time. For example, the device (e.g., device 600A) can optionally determine that the sixth application is idle when no user interaction with the application or no output from the application is being generated. In response to detecting that the sixth application displayed in the second portion of the user interface is inactive for a predetermined period of time, the device (e.g., device 600A) can optionally cause the first shortcut affordance 608a at the first shortcut position 610a to be replaced with display of a sixth shortcut affordance 608c corresponding to the sixth application. Meanwhile, device 600A can optionally maintain display of the second shortcut affordance 612a at the second shortcut position 614a on the display.

Further, in response to detecting that the sixth application displayed in the second portion of the user interface is inactive for a predetermined period of time, device 600A can optionally cause the display of the sixth application, in the second portion, to be replaced with display of a seventh application. The seventh application can optionally include an application that is displayed in the second portion prior to display of the sixth application. For example, in some embodiments, an application currently displayed in the second portion of the user interface is replaced with an application that was previously displayed in the second portion when the electronic device determines that currently displayed application has been inactive for more than a predetermined period of time. In some embodiments, the electronic device (e.g., device 600A) also causes the shortcut affordance in the first position to be replaced with a shortcut affordance corresponding the application that is being replaced or no longer being displayed. In practice, this can optionally permit a user to quickly revert to displaying the replaced application in the second portion.

FIG. 7 is a flow diagram illustrating a method for application shortcuts using an electronic device in accordance with some embodiments. Method 700 is performed at a device (e.g., 100, 300, 500) in operative communication with a display. Some operations in method 700 are, optionally, combined, the order of some operations are, optionally, changed, and some operations are, optionally, omitted.

As described below, method 700 provides an intuitive process for application shortcuts. The method reduces the cognitive burden on a user for accessing applications and/or application shortcuts, thereby creating a more efficient human-machine interface. For battery-operated computing devices, enabling a user to launch applications faster and more efficiently conserves power and increases the time between battery charges.

As shown in the method 700, the device (e.g., device 600A) causes (at 702) a user interface (e.g., user interface 600) to be displayed on a display screen 600B. Displaying the user interface (e.g., user interface 600) includes concurrently displaying a first shortcut affordance (e.g., first shortcut affordance 608a) at a first shortcut position (e.g., first shortcut position 610a) corresponding to a first category of applications and a second shortcut affordance (e.g., second shortcut affordance 612a) at a second shortcut position (e.g., second shortcut position 614a) corresponding to a second category of applications distinct from the first category of applications.

The first shortcut affordance (e.g., first shortcut affordance 608a) corresponds to a first application. Selection of the first shortcut affordance (e.g., first shortcut affordance 608a) causes a user interface for the first application to be displayed on the display (e.g., display screen 600B).

In accordance with some embodiments, the first shortcut position (e.g., first shortcut position 610a) and second shortcut position (e.g., second shortcut position 614a) are displayed in fixed arrangement relative to one another on the display screen (e.g., display screen 600B). In practice, specific categories of application shortcuts are located in a fixed position on the display screen 600B. This minimizes user confusion and enables the user to quickly know where to access such applications. Further, fixing the position on the display screen 600B may simplify code related to the user interface 600 and other applications coordinating with or otherwise presented in the user interface 600.

In accordance with some embodiments, the device (e.g., device 600A) causes display of an indicator (e.g., 6C, 6D) associated with the first shortcut position (e.g., first shortcut position 610) or the second shortcut position (e.g., second shortcut position 614) when a corresponding application having a shortcut affordance in the first shortcut position (e.g., first shortcut position 610) or the second shortcut position (e.g., second shortcut position 614) is active. In practice, the indicator permits the user to quickly identify an application that is being displayed, which is beneficial so the user does not select the shortcut affordance corresponding to the application that is already being displayed.

The second shortcut affordance (e.g., second shortcut affordance 612a) corresponds to a second application distinct from the first application. Selection of the second shortcut affordance (e.g., second shortcut affordance 612a) causes a user interface for the second application to be displayed on the display (e.g., display screen 600B).

In accordance with some embodiments, the device (e.g., device 600A) detects a second sequence of one or more inputs. In response to detecting the sequence of one or more inputs, the device (e.g., device 600A) determines whether the second sequence of one or more inputs changes the status corresponding to the third application to a status that meets a second shortcut replacement criteria corresponding to the second shortcut position (e.g., second shortcut position 614a). In accordance with a determination that the second sequence of one or more inputs changes the status corresponding to a fourth application to a status that meets second shortcut replacement criteria, wherein the second shortcut replacement criteria includes a criterion that is met when the fourth application belongs to the second category of applications, the device causes the second shortcut affordance (e.g., second shortcut affordance 612a) to be replaced with display of a fourth shortcut affordance (e.g., fourth shortcut affordance 612b) corresponding to the fourth application at the second shortcut position (e.g., second shortcut position 614a) while maintaining display of the first shortcut affordance (e.g., first shortcut affordance 608a) on the display. In accordance with a determination that the second sequence of one or more inputs does not change the status corresponding the fourth application to the status that meets the second shortcut replacement criteria, the device causes the second shortcut affordance to be maintained on the display (e.g., display screen 600B) (e.g., FIGS. 6K-6L). In practice, the first shortcut position (e.g., first shortcut position 610a) and the second shortcut position (e.g., second shortcut position 614*a*) can be updated separately and independently of each other according to their own respective set of shortcut replacement criteria. This may conserve resources, such as memory and power consumption, thereby enabling the device 600B to run and provide other applications In accordance with some embodiments, the second shortcut replacement criteria include a criterion that is met when the fourth application is distinct from the first application (e.g., FIGS. 6K-6L). The fourth application and the first application are not the same application and do not belong in the same category of applications. In an example, the first shortcut position and the second shortcut position provide access to different applications. In practice, duplicate applications appearing in both slots simultaneously are prohibited, thereby conserving device resources.

In accordance with some embodiments, the first category of applications and the second category of applications do not include any common application that belongs to both the first category of applications and the second category of applications (e.g., FIG. 6A). Applications belong to either the first category of applications, the second category of applications, a different category of applications distinct from the first and second categories of applications, or do not belong to any category of applications. In practice, duplication of application shortcut affordances is minimized or prohibited, thereby conserving valuable resources such as display screen real estate.

In accordance with some embodiments, at least one of the first category of applications and the second category of applications includes a maps category associated with navigation-related applications (e.g., 608 at FIG. 6D). In practice, navigation-related applications are immediately useful and desirable in certain situations, such as when the user is traveling. Quick and efficient access to navigation-related applications can be appreciated in situations where the user is on-the-go but unsure of where to go.

In accordance with some embodiments, at least one of the first category of applications and the second category of applications includes a multimedia category associated with multimedia applications (e.g., 612 at FIG. 6C). For example, multimedia applications include applications that provide access to music, podcasts, audiobooks, movies, radio, and in some cases social media platforms that share certain media. In practice, multimedia applications are provide a source of entertainment or information for a user. Easy access to entertainment is beneficial and increase usage frequency of certain applications that are easily accessed.

In accordance with some embodiments, at least one of the first category of applications and the second category of applications is a communications category associated with communications applications (e.g., 616 at FIG. 6C). Merely by way of example, communications applications can optionally include messaging applications, telephone applications, email applications, and other types of electronic communications applications. Providing quick and easy access to such applications allows the user to stay readily connected with other users.

In accordance with some embodiments, the user interface (e.g., user interface 600) includes a first portion (e.g., first portion 602) and a second portion (e.g., second portion 604), further wherein the first shortcut affordance (e.g., first shortcut affordance 608*a*) in the first shortcut position (e.g., first shortcut position 610*a*) and the second shortcut affordance (e.g., second shortcut affordance 612*a*) in the second shortcut position (e.g., second shortcut position 614*a*) are displayed in the first portion (e.g., first portion 602), and a currently-active application is displayed in the second portion (e.g., second portion 604). In practice, the user interface (e.g., user interface 600) provides access to the shortcut affordances while providing access to an application. This allows the user to quickly navigate to any application having a shortcut affordance being displayed in the first portion. In some examples, the first portion remains displayed for an entirety of display of an application in the second portion. In some examples, displaying both portions simultaneously allows a user to easily navigate between the two portions, from one portion to the next. This reduces user burden, minimizes clicks and enhances user experience.

In accordance with some embodiments, the device receives a user input corresponding to a request to display, in the second portion (e.g., second portion 604), a user interface including a plurality of application launch icons (e.g., home screen 626), and in response to receiving the user input, causes display of, in the second portion (e.g., second portion 604), the user interface including the plurality of application launch icons (e.g., home screen 626), and causes ceasing display of the first shortcut affordance (e.g., first shortcut affordance 608*a*) in the first shortcut position (e.g., first shortcut position 610*a*) and the second shortcut affordance (e.g., second shortcut affordance 612*a*) in the second shortcut position (e.g., second shortcut position 614*a*). In some examples, the first portion 602 of the user interface (e.g., user interface 600) containing the shortcut affordances is no longer displayed in response to receiving the user input. In practice, ceasing display of shortcut affordances corresponding to applications that have launch icons already being displayed reduces redundancy of features (e.g., access to the applications) and minimizes user confusion. In this way, display screen real estate can be freed to display more application launch icons or other functions and information (e.g., weather).

In accordance with some embodiments, the first portion (e.g., first portion 602) is displayed along a border of the display screen (e.g., display screen 600B) adjacent to the second portion (e.g., second portion 604). In this example, the first portion 602 containing the shortcut affordances occupies less screen space than the second portion 604 (e.g., the main portion) which frees up screen space for displaying an application. Maintaining the first portion along a border also facilitates user navigation to the first portion since accidentally navigating past the first portion is prevented, thereby saving time.

While displaying the first shortcut affordance (e.g., first shortcut affordance 608*a*) at the first shortcut position (e.g., first shortcut position 610*a*) and the second shortcut affordance (e.g., second shortcut affordance 612*a*) at the second shortcut position (e.g., second shortcut position 614*a*), the device detects (at 704) a sequence of one or more inputs.

In accordance with some embodiments, the sequence of one or more inputs corresponds to interaction with the third application (e.g., FIG. 6F). For example, the sequence of one or more inputs includes multiple tap gestures on affordances provided in a user interface of the third application. In some examples, the sequence of one or more inputs corresponds to interaction with the third application when the particular sequence of one or more inputs causes activation of a function or a change in operation in the third application. For example, the sequence of one or more inputs causes a music application to output music through speakers. In some examples, the sequence of one or more inputs does not interact with the third application. Instead, the sequence of one or more inputs interacts with an application other than the third application.

In accordance with some embodiments, further in response to detecting the sequence of one or more inputs, the device determines whether the sequence of one or more inputs changes the status corresponding to the third application to the status that meets the first shortcut replacement criteria. For example, the sequence of one or more inputs interacts with the third application, which changes the status of the third application to a currently-active status that meets a currently-active criterion of the first shortcut replacement criteria (e.g., FIG. 6J). In some examples, the sequence of one or more inputs interacts with an application other than the third application, which changes the status of the third application to a last-active status that meets a last-active criterion of the first shortcut replacement criteria (e.g., FIG. 6G). In more examples, the sequence of one or more inputs interacts with the third application, which changes the status of the third application to a most-frequently-used application, such as a most frequently activated or displayed application. In that case, the changed status meets a most-frequently-used application criterion of the first shortcut replacement criteria (e.g., FIG. 6H-6I). In some examples, the sequence of one or more inputs corresponds to changing a priority of the third application to a high priority application (e.g., FIG. 6H-6I). For example, the user can manually update or set a priority ranking of the third application among other applications in the first application category corresponding to the first shortcut position. In that case, the user's manual update or setting of the priority of the application is considered the sequence of one or more inputs that changes the status of the third application to the status that meets the prioritized application criterion for the first application shortcut criteria.

In accordance with some embodiments, the first shortcut replacement criteria includes a criterion that is met when the third application is a last-active application that was an application in the first category of applications that was most recently displayed on the display (e.g., FIG. 6G). For example, the third application was most recently displayed in the second portion (e.g., second portion 604) of the user interface (e.g., user interface 600). For instance, the third application is no longer currently being displayed in the second portion (e.g., second portion 604) of the user interface (e.g., user interface 600). In some cases, the third application is the previously displayed application that was displayed before it was replaced with a currently displayed application. In that case, the third application is the most recently displayed application that is not the currently displayed application. In practice, displaying a shortcut affordance corresponding to a last-active application (e.g., a previously-displayed application that is no longer displayed) enables the user to quickly jump back to the previous application of that category of applications.

In accordance with some embodiments, the first shortcut replacement criteria includes a criterion that is met when the third application is a most-frequently-used application (e.g., FIGS. 6H-6I). The most-frequently-used application criterion is met when a usage frequency reflected in the status of the third application indicates that the third application is a most-frequently-used application in the first category of applications for the first shortcut position 610a. The usage frequency can optionally be based on user interaction with the third application over a predefined period of time, such as over the past week or over the past month. In some examples, the usage frequency can optionally be based on user interaction with the third application since installation of the third application. In practice, the user has quick access to commonly used applications that are considered to have a high frequency of usage among other applications in its category.

In accordance with some embodiments, the first shortcut replacement criteria includes a criterion that is met when the third application is a currently-active application that was an application in the first category of applications that was most recently performing a function (e.g., FIG. 6J). For example, the currently-active application is an application that is currently being displayed in the second portion 604 of the user interface 600. The sequence of one or more inputs can optionally correspond to interaction with the currently-active application that is displayed in the user interface 600. In some examples, the currently-active application is not displayed in the second portion 604 of the user interface 600, but is still the currently-active application when the application is generating output, such as audio, music, directions, and so on. In practice, displaying a shortcut affordance corresponding to an application that is currently active can optionally facilitate a user to identify the currently-active application or display the currently-active application if it is currently outputting feedback to the user (e.g., music, tactile sensations) but not currently being displayed on the display screen 600B.

In accordance with some embodiments, the first shortcut replacement criteria include a criterion that is met when the third application corresponds to a prioritized application that was an application in the first category of applications that has a highest priority (e.g., FIGS. 6H-6I). The prioritized application can optionally be user-selected. In some examples, the prioritized application can optionally be based on other data, such as contextual data. For example, the prioritized application can optionally be dynamic based on a currently detected location of the device 600A. In some examples, the prioritized application is scheduled to be prioritized during certain times of day or in certain geographic locations. In practice, a user can easily, quickly, and efficiently access applications that are deemed highly important or more important than other applications in the first category.

In response to detecting the sequence of one or more inputs, the device, in accordance with a determination that the sequence of one or more inputs changes a status corresponding to a third application to a status that meets first shortcut replacement criteria, where the first shortcut replacement criteria includes a criterion that is met when the third application belongs to the first category of applications, causes (at 706) the first shortcut affordance (e.g., first shortcut affordance 608a) to be replaced with display of a third shortcut affordance corresponding to the third application at the first shortcut position (e.g., first shortcut position 610a) while maintaining display of the second shortcut affordance (e.g., second shortcut affordance 612a) on the display (e.g., display screen 600B).

In accordance with some embodiments, while displaying the third shortcut affordance, the device causes display of information related to an ongoing activity at the third application (e.g., FIG. 6C,6D). In some examples, there is no ongoing activity at the third application. In that case, no information regarding ongoing activity at the third application is displayed. In some examples, when no ongoing activity is detected at the third application, information related to a lack of ongoing activity at the third application is displayed while displaying the third shortcut affordance. Such information can optionally be displayed adjacent to the third shortcut affordance (e.g., third shortcut affordance 608b) or incorporated in the shortcut affordance, which would be a dynamic shortcut affordance that updates in appearance based on whether there is ongoing activity. Merely by way of example, the third shortcut affordance (e.g., third shortcut affordance 608b) corresponds to a phone application (e.g., 618 at FIG. 6D) and the displayed information includes an active timer for an ongoing phone call. When the phone is not active, the displayed information includes an active timer showing zero minutes (e.g., "00:00") or another indication that there is no active phone call. In some examples, no information is displayed along with the third shortcut affordance (e.g., third shortcut affordance 608b) when there is no ongoing activity at the third application. In some examples, the third application is a text messaging application and the displayed information related to ongoing activity indicates an incoming text message. In yet another application, the third application is a chat application or an email application and the displayed information includes a received message. In practice, this enables the user to stay apprised of updates on activity at the third application without necessarily displaying or otherwise interacting with the third application.

In accordance with some embodiments, the third shortcut affordance (e.g., third shortcut affordance 608b) corresponds to a phone application and displaying the third shortcut affordance includes displaying a duration of an ongoing phone call (e.g., 616 at FIG. 6C). In practice, providing a duration of the ongoing call in an easy-to-view manner adjacent to its shortcut affordance allows a user to quickly ascertain a length of a call without being distracted by having to navigate to another user interface (e.g., a phone application specific user interface) to acquire the call information.

In accordance with some embodiments, the third shortcut affordance (e.g., third shortcut affordance 608b) corresponds to a maps application (e.g., 608 at FIG. 6D) and displaying the third shortcut affordance includes displaying at least one of an estimated time of arrival and turn-by-turn directions. For example, displayed information related to ongoing activity at the third application corresponding to the third shortcut affordance 608b (e.g., the maps application) is the turn-by-turn directions, which include directional arrows adjacent to the third shortcut affordance indicating a next turn, road signs indicating a current road being traveled, road signs indicating an upcoming road or exit while traveling, and/or any combination thereof. In some examples, information related to the ongoing activity includes the estimated time of arrival, which can optionally be a countdown timer to arrival or an arrival time that is updated while being displayed. In practice, the user can navigate away from the maps application (e.g., remove the application from being displayed) but still stay in the navigation provided by the maps application.

Further in response to detecting the sequence of one or more inputs, the device, in accordance with a determination that the sequence of one or more inputs does not change the status corresponding to the third application to the status that meets the first shortcut replacement criteria, causes (708) the first shortcut affordance (e.g., first shortcut affordance 608a) to be maintained on the display (e.g., display screen 600B).

In accordance with some embodiments, the device displays a fifth shortcut affordance (e.g., fifth shortcut affordance 616a) at a third shortcut position (e.g., third shortcut position 618a) corresponding to a third category of applications distinct from the first category of applications and the second category of applications, wherein the fifth shortcut affordance corresponds to a fifth application (e.g., FIG. 6M). In practice, multiple shortcut positions for multiple distinct categories of applications provide quick user access to a variety of applications. In some examples, the third shortcut position is a fixed category while the first shortcut position and the second shortcut position are flexible, user-specifiable categories. In some examples, the third shortcut position corresponds to a user-specifiable category of applications while the first shortcut position and the second shortcut position correspond to fixed categories of applications. In some cases, the third shortcut position is optional. In some cases, additional shortcut positions corresponding to additional categories distinct from currently-provided categories are provided.

In accordance with some embodiments, the fifth shortcut affordance (e.g., fifth shortcut affordance 616a) corresponds to a phone application with an active timer displaying a duration of an ongoing call (e.g., 616 at FIG. 6C). In some examples, the phone application with the active timer is always displayed at the third shortcut position and is not replaced by other shortcut affordances. In some examples, the third shortcut position (e.g., third shortcut position 618a) provides the fifth shortcut affordance (e.g., fifth shortcut affordance 616a) that is set by the user. Providing a constant shortcut affordance that does not get replaced is beneficial to the user for certain applications that the user deems highly desirable for display and/or access.

In accordance with some embodiments, the currently-active application is a sixth application. The device (e.g., device 600A) detects that the sixth application displayed in the second portion (e.g., second portion 604) of the user interface (e.g., user interface 600) is inactive for a predetermined period of time. In response to detecting that the sixth application displayed in the second portion (e.g., second portion 604) of the user interface (e.g., user interface 600) is inactive for a predetermined period of time, the device (e.g., device 600A) causes the first shortcut affordance (e.g., first shortcut affordance 608a) to be replaced with display of a sixth shortcut affordance (e.g., sixth shortcut affordance 608c) corresponding to the sixth application at the first shortcut position while maintaining display of the second shortcut affordance (e.g., second shortcut affordance 612a) on the display, and causes replacing the display of the sixth application, in the second portion (e.g., second portion 604), with display of a seventh application, wherein the seventh application is an application displayed in the second portion (e.g., second portion 604) prior to display of the sixth application. In practice, ceasing to display the sixth application if it has been determined to be inactive conserves resources and/or reduce user input required to return to a previously displayed application. Providing the shortcut affordance corresponding to the replaced application allows the user to switch back to the application if later interaction with the replaced application is desired.

Figure 8:
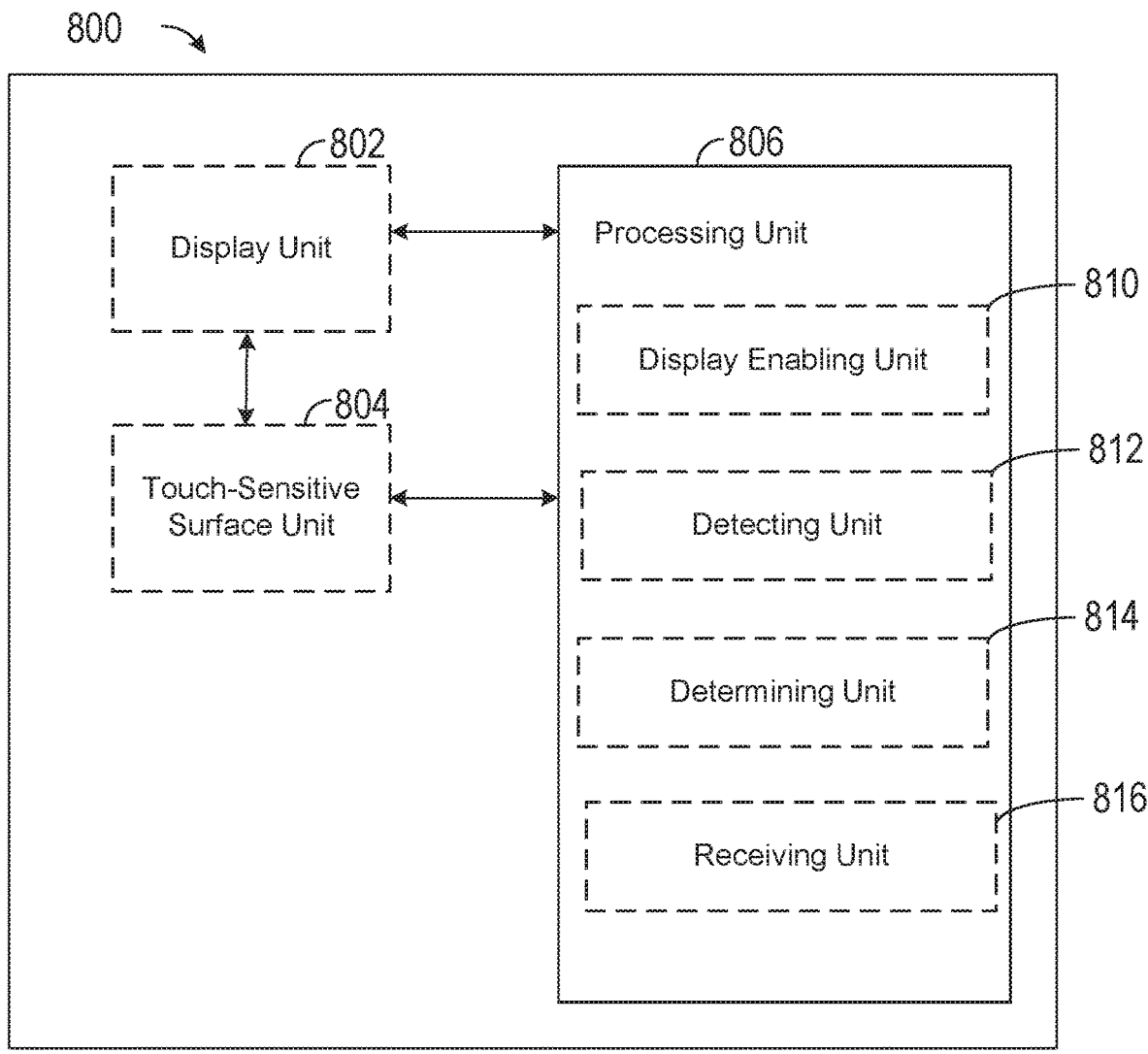
FIG. 8 is a functional block diagram of an electronic device, in accordance with various embodiments of the present invention.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes, optionally, a display unit 802 configured to display a graphic user interface, optionally, a touch-sensitive surface unit 804 configured to receive contacts, and a processing unit 806 optionally coupled to the display unit 802 and the touch-sensitive surface unit 804. In some embodiments, the processing unit 806 includes a display enabling unit 810, a detecting unit 812, a determining unit 814, and a receiving unit 816.

The processing unit 806 is configured to: cause (e.g., with display enabling unit 810) a user interface to be displayed on a display screen unit in operative communication with the electronic device, wherein displaying the user interface includes concurrently displaying: a first shortcut affordance at a first shortcut position corresponding to a first category of applications, wherein the first shortcut affordance corresponds to a first application, wherein selection of the first shortcut affordance causes a user interface for the first application to be displayed on the display; and a second shortcut affordance at a second shortcut position corresponding to a second category of applications distinct from the first category of applications, wherein the second shortcut affordance corresponds to a second application distinct from the first application, wherein selection of the second shortcut affordance causes a user interface for the second application to be displayed on the display.

The processing unit 806 is further configured to: while displaying (e.g., with display enabling unit 810) the first shortcut affordance at the first shortcut position and the second shortcut affordance at the second shortcut position, detect (e.g., with detecting unit 812) a sequence of one or more inputs. The processing unit 806 is further configured to: in response to detecting (e.g., with detecting unit 812) the sequence of one or more inputs: in accordance with a determination that the sequence of one or more inputs changes a status corresponding to a third application to a status that meets first shortcut replacement criteria, wherein the first shortcut replacement criteria includes a criterion that is met when the third application belongs to the first category of applications, cause (e.g., with display enabling unit 810) the first shortcut affordance to be replaced with display of a third shortcut affordance corresponding to the third application at the first shortcut position while maintaining (e.g., with display enabling unit 810) display of the second shortcut affordance on the display; and in accordance with a determination that the sequence of one or more inputs does not change the status corresponding the third application to the status that meets the first shortcut replacement criteria, cause (e.g., with display enabling unit 810) the first shortcut affordance to be maintained on the display.

In some embodiments, the sequence of one or more inputs corresponds to interaction with the third application.

In some embodiments, the processing unit 806 is further configured to: further in response to detecting (e.g., with detecting unit 812) the sequence of one or more inputs, determine (e.g., with determining unit 814) whether the sequence of one or more inputs changes the status corresponding to the third application to the status that meets the first shortcut replacement criteria.

In some embodiments, the first shortcut replacement criteria includes a criterion that is met when the third application is a last-active application that was an application in the first category of applications that was most recently displayed on the display.

In some embodiments, the first shortcut replacement criteria include a criterion that is met when the third application is a most-frequently-used application.

In some embodiments, the first shortcut replacement criteria includes a criterion that is met when the third application is a currently-active application that was an application in the first category of applications that was most recently performing a function.

In some embodiments, the first shortcut replacement criteria include a criterion that is met when the third application corresponds to a prioritized application that was an application in the first category of applications that has a highest priority.

In some embodiments, the processing unit 806 is further configured to: detect (e.g., with detecting unit 812) a second sequence of one or more inputs, and in response to detecting the sequence of one or more inputs: determine (e.g., with determining unit 814) whether the second sequence of one or more inputs changes the status corresponding to the third application to a status that meets a second shortcut replacement criteria corresponding to the second shortcut position. The processing unit 806 is further configured to, in accordance with a determination that the second sequence of one or more inputs changes the status corresponding to a fourth application to a status that meets second shortcut replacement criteria, wherein the second shortcut replacement criteria includes a criterion that is met when the fourth application belongs to the second category of applications, cause (e.g., with display enabling unit 810) the second shortcut affordance to be replaced with display of a fourth shortcut affordance corresponding to the fourth application at the second shortcut position while maintaining (e.g., with display enabling unit 810) display of the first shortcut affordance on the display; and in accordance with a determination that the second sequence of one or more inputs does not change the status corresponding the fourth application to the status that meets the second shortcut replacement criteria, cause (e.g., with display enabling unit 810) the second shortcut affordance to be maintained (e.g., with display enabling unit 810) on the display.

In some embodiments, the second shortcut replacement criteria include a criterion that is met when the fourth application is distinct from the first application.

In some embodiments, the processing unit 806 is further configured to: while displaying (e.g., with display enabling unit 810) the third shortcut affordance, cause display (e.g., with display enabling unit 810) of information related to an ongoing activity at the third application.

In some embodiments, the third shortcut affordance corresponds to a phone application and displaying the third shortcut affordance includes displaying (e.g., with display enabling unit 810) a duration of an ongoing phone call.

In some embodiments, the third shortcut affordance corresponds to a maps application and displaying (e.g., with display enabling unit 810) the third shortcut affordance includes displaying (e.g., with display enabling unit 810) at least one of an estimated time of arrival and turn-by-turn directions.

In some embodiments, the first category of applications and the second category of applications do not include any common application that belongs to both the first category of applications and the second category of applications.

In some embodiments, at least one of the first category of applications and the second category of applications includes a maps category associated with navigation-related applications In some embodiments, at least one of the first category of applications and the second category of applications includes a multimedia category associated with multimedia applications.

In some embodiments, at least one of the first category of applications and the second category of applications is a communications category associated with communications applications.

In some embodiments, the processing unit 806 is further configured to: display (e.g., with display enabling unit 810) a fifth shortcut affordance at a third shortcut position corresponding to a third category of applications distinct from the first category of applications and the second category of applications, wherein the fifth shortcut affordance corresponds to a fifth application.

In some embodiments, the fifth shortcut affordance corresponds to a phone application with an active timer displaying a duration of an ongoing call.

In some embodiments, the user interface includes a first portion and a second portion, further wherein the first shortcut affordance in the first shortcut position and the second shortcut affordance in the second shortcut position are displayed in the first portion, and a currently-active application is displayed in the second portion.

In some embodiments, the processing unit 806 is further configured to, receive (e.g., with receiving unit 816) a user input corresponding to a request to display (e.g., with display enabling unit 810), in the second portion, a user interface including a plurality of application launch icons; and in response to receiving the user input: cause display of, (e.g., with display enabling unit 810) in the second portion, the user interface including the plurality of application launch icons; and cause ceasing display of (e.g., with display enabling unit 810) the first shortcut affordance in the first shortcut position and the second shortcut affordance in the second shortcut position.

In some embodiments, the first portion is displayed along a border of the display screen adjacent to the second portion.

In some embodiments, the currently-active application is a sixth application, wherein the processing unit 806 is further configured to: detect (e.g., with detecting unit 812) that the sixth application displayed in the second portion of the user interface is inactive for a predetermined period of time. The processing unit 806 is further configured to, in response to detecting (e.g., with detecting unit 812) that the sixth application displayed in the second portion of the user interface is inactive for a predetermined period of time, cause (e.g., with display enabling unit 810) the first shortcut affordance to be replaced with display of a sixth shortcut affordance corresponding to the sixth application at the first shortcut position while maintaining display of the second shortcut affordance on the display; and cause replacing (e.g., with display enabling unit 810) the display of the sixth application, in the second portion, with display of a seventh application, wherein the seventh application is an application displayed in the second portion prior to display of the sixth application.

In some embodiments, the first shortcut position and second shortcut position are displayed in fixed arrangement relative to one another on the display screen.

In some embodiments, the processing unit 806 is further configured to: cause display of (e.g., with display enabling unit 810) an indicator associated with the first shortcut position or the second shortcut position when a corresponding application having a shortcut affordance in the first shortcut position or the second shortcut position is active.

The operations described above with reference to FIG. 7 are, optionally, implemented by components depicted in FIGS. 1A-1B or FIG. 8. For example, display causing operations 702, 706, and 708, and detecting operation 704, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In some examples, users can select not to provide location information for targeted content delivery services. In yet some examples, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
one or more processors;
a memory; and
one or more programs, wherein the one or more programs are stored in the memory and configured to be executed by the one or more processors, the one or more programs including instructions for:
causing a user interface to be displayed on a display screen in operable communication with the electronic device, wherein displaying the user interface includes concurrently displaying a plurality of shortcut affordances in a first portion of the display screen and a currently-active application in a second portion of the display screen, wherein the plurality of shortcut affordances includes:
a first shortcut affordance at a first shortcut position corresponding to a first category of applications, wherein the first category of applications is selected from a group consisting of a maps category associated with navigation-related applications, a multimedia category associated with multimedia applications, and a communications category associated with communications applications, wherein the first shortcut affordance corresponds to a first application, and wherein selection of the first shortcut affordance causes a user interface for the first application to be displayed on the display screen; and
a second shortcut affordance at a second shortcut position corresponding to a second category of applications distinct from the first category of applications, wherein the second category of applications is selected from a group consisting of the maps category, the multimedia category, and the communications category, wherein the second shortcut affordance corresponds to a second application distinct from the first application, and wherein selection of the second shortcut affordance causes a user interface for the second application to be displayed on the display screen;
while continuing to cause display of the plurality of shortcut affordances:
launching a third application; and
while the third application is the currently-active application:
detecting a sequence of one or more inputs at the second portion of the display screen that interacts with the third application; and
in response to detecting the sequence of one or more inputs at the second portion that interacts with the third application:
in accordance with a determination that the sequence of one or more inputs changes a status corresponding to the third application to a status that meets first shortcut replacement criteria, wherein the first shortcut replacement criteria includes a criterion that is met when the third application belongs to the first category of applications, causing the first shortcut affordance to be replaced with display of a third shortcut affordance corresponding to the third application at the first shortcut position while maintaining display of the second shortcut affordance on the display screen at the second shortcut position and ceasing to display the first shortcut affordance on the display screen; and
in accordance with a determination that the sequence of one or more inputs does not change the status corresponding the third application to the status that meets the first shortcut replacement criteria, causing the first shortcut affordance to be maintained on the display screen at the first shortcut position;
receiving a user input corresponding to a request to display, in the second portion, a user interface including a plurality of application launch icons; and
in response to receiving the user input:
causing display of, in the second portion, the user interface including the plurality of application launch icons; and
causing display of the first shortcut affordance in the first shortcut position and the second shortcut affordance in the second shortcut position to be maintained.

2. The electronic device of claim 1, wherein the first shortcut replacement criteria includes a criterion that is met when the third application is a last-active application that was an application in the first category of applications that was most recently displayed on the display screen.

3. The electronic device of claim 1, wherein the first shortcut replacement criteria includes a criterion that is met when the third application is a most-frequently-used application.

4. The electronic device of claim 1, wherein the first shortcut replacement criteria includes a criterion that is met when the third application is a currently-active application that was an application in the first category of applications that was most recently performing a function.

5. The electronic device of claim 1, wherein the first shortcut replacement criteria includes a criterion that is met when the third application corresponds to a prioritized application that was an application in the first category of applications that has a highest priority.

6. The electronic device of claim 1, the one or more programs further including instructions for:
   detecting a second sequence of one or more inputs; and
   in response to detecting the sequence of one or more inputs:
      determining whether the second sequence of one or more inputs changes the status corresponding to a fourth application to a status that meets a second shortcut replacement criteria corresponding to the second shortcut position;
      in accordance with a determination that the second sequence of one or more inputs changes the status corresponding to a fourth application to a status that meets second shortcut replacement criteria, wherein the second shortcut replacement criteria includes a criterion that is met when the fourth application belongs to the second category of applications, causing the second shortcut affordance to be replaced with display of a fourth shortcut affordance corresponding to the fourth application at the second shortcut position while maintaining display of the first shortcut affordance on the display screen; and
      in accordance with a determination that the second sequence of one or more inputs does not change the status corresponding the fourth application to the status that meets the second shortcut replacement criteria, causing the second shortcut affordance to be maintained on the display screen.

7. The electronic device of claim 6, wherein the second shortcut replacement criteria includes a criterion that is met when the fourth application is distinct from the first application.

8. The electronic device of claim 1, the one or more programs further including instructions for:
   while displaying the third shortcut affordance, causing display of information related to an ongoing activity at the third application.

9. The electronic device of claim 1, wherein the third shortcut affordance corresponds to a phone application and displaying the third shortcut affordance includes displaying a duration of an ongoing phone call.

10. The electronic device of claim 1, wherein the third shortcut affordance corresponds to a maps application and displaying the third shortcut affordance includes displaying at least one of an estimated time of arrival or turn-by-turn directions.

11. The electronic device of claim 1, wherein the first category of applications and the second category of applications do not include any common application that belongs to both the first category of applications and the second category of applications.

12. The electronic device of claim 1, the one or more programs further including instructions for:
   displaying a fifth shortcut affordance at a third shortcut position corresponding to a third category of applications distinct from the first category of applications and the second category of applications, wherein the fifth shortcut affordance corresponds to a fifth application.

13. The electronic device of claim 12, wherein the fifth shortcut affordance corresponds to a phone application with an active timer displaying a duration of an ongoing call.

14. The electronic device of claim 1, wherein the first portion is displayed along a border of the display screen adjacent to the second portion.

15. The electronic device of claim 1, wherein the first shortcut position and second shortcut position are displayed in fixed arrangement relative to one another on the display screen.

16. The electronic device of claim 1, wherein:
   the first shortcut position is the only shortcut position that corresponds to the first category of applications on the display screen; and
   the second shortcut position is the only shortcut position that corresponds to the second category of applications on the display screen.

17. A non-transitory computer readable storage medium storing one or more programs, the one or more programs comprising instructions, which when executed by one or more processors of an electronic device in operable communication with a display screen, cause the electronic device to:
   cause a user interface to be displayed on the display screen, wherein displaying the user interface includes concurrently displaying a plurality of shortcut affordances in a first portion of the display screen and a currently-active application in a second portion of the display screen, wherein the plurality of shortcut affordances includes:
      a first shortcut affordance at a first shortcut position corresponding to a first category of applications, wherein the first category of applications is selected from a group consisting of a maps category associated with navigation-related applications, a multimedia category associated with multimedia applications, and a communications category associated with communications applications, wherein the first shortcut affordance corresponds to a first application, and wherein selection of the first shortcut affordance causes a user interface for the first application to be displayed on the display screen; and
      a second shortcut affordance at a second shortcut position corresponding to a second category of applications distinct from the first category of applications, wherein the second category of applications is selected from a group consisting of the maps category, the multimedia category, and the communications category, wherein the second shortcut affordance corresponds to a second application distinct from the first application, and wherein selection of the second shortcut accordance causes a user interface for the second application to be displayed on the display screen;
   while continuing to cause display of the plurality of shortcut affordances:
      launching a third application; and
      while the third application is the currently-active application:

detecting a sequence of one or more inputs at the second portion of the display screen that interacts with the third application; and in response to detecting the sequence of one or more inputs at the second portion that interacts with the third application:

in accordance with a determination that the sequence of one or more inputs changes a status corresponding to a third application to a status that meets first shortcut replacement criteria, wherein the first shortcut replacement criteria includes a criterion that is met when the third application belongs to the first category of applications, causing the first shortcut affordance to be replaced with display of a third shortcut affordance corresponding to the third application at the first shortcut position while maintaining display of the second shortcut affordance on the display screen at the second shortcut position and ceasing to display the first shortcut affordance on the display screen; and in accordance with a determination that the sequence of one or more inputs does not change the status corresponding the third application to the status that meets the first shortcut replacement criteria, causing the first shortcut affordance to be maintained on the display screen at the first shortcut position;

receiving a user input corresponding to a request to display, in the second portion, a user interface including a plurality of application launch icons; and in response to receiving the user input:

causing display of, in the second portion, the user interface including the plurality of application launch icons; and causing display of the first shortcut affordance in the first shortcut position and the second shortcut affordance in the second shortcut position to be maintained.

18. The non-transitory computer readable storage medium of claim 17, wherein the first shortcut replacement criteria includes a criterion that is met when the third application is a most-frequently-used application.

19. The non-transitory computer readable storage medium of claim 17, wherein the first shortcut replacement criteria includes a criterion that is met when the third application is a currently-active application that was an application in the first category of applications that was most recently performing a function.

20. The non-transitory computer readable storage medium of claim 17, wherein the first shortcut replacement criteria includes a criterion that is met when the third application corresponds to a prioritized application that was an application in the first category of applications that has a highest priority.

21. The non-transitory computer readable storage medium of claim 17, the one or more programs further including instructions for:

detecting a second sequence of one or more inputs; and
in response to detecting the sequence of one or more inputs:

determining whether the second sequence of one or more inputs changes the status corresponding to a fourth application to a status that meets a second shortcut replacement criteria corresponding to the second shortcut position;

in accordance with a determination that the second sequence of one or more inputs changes the status corresponding to a fourth application to a status that meets second shortcut replacement criteria, wherein the second shortcut replacement criteria includes a criterion that is met when the fourth application belongs to the second category of applications, causing the second shortcut affordance to be replaced with display of a fourth shortcut affordance corresponding to the fourth application at the second shortcut position while maintaining display of the first shortcut affordance on the display screen; and in accordance with a determination that the second sequence of one or more inputs does not change the status corresponding the fourth application to the status that meets the second shortcut replacement criteria, causing the second shortcut affordance to be maintained on the display screen.

22. The non-transitory computer readable storage medium of claim 21, wherein the second shortcut replacement criteria includes a criterion that is met when the fourth application is distinct from the first application.

23. The non-transitory computer readable storage medium of claim 17, the one or more programs further including instructions for:

while displaying the third shortcut affordance, causing display of information related to an ongoing activity at the third application.

24. The non-transitory computer readable storage medium of claim 18, wherein the third shortcut affordance corresponds to a phone application and displaying the third shortcut affordance includes displaying a duration of an ongoing phone call.

25. The non-transitory computer readable storage medium of claim 17, wherein the third shortcut affordance corresponds to a maps application and displaying the third shortcut affordance includes displaying at least one of an estimated time of arrival or turn-by-turn directions.

26. The non-transitory computer readable storage medium of claim 17, wherein the first category of applications and the second category of applications do not include any common application that belongs to both the first category of applications and the second category of applications.

27. The non-transitory computer readable storage medium of claim 17, the one or more programs further including instructions for:

displaying a fifth shortcut affordance at a third shortcut position corresponding to a third category of applications distinct from the first category of applications and the second category of applications, wherein the fifth shortcut affordance corresponds to a fifth application.

28. The non-transitory computer readable storage medium of claim 27, wherein the fifth shortcut affordance corresponds to a phone application with an active timer displaying a duration of an ongoing call.

29. The non-transitory computer readable storage medium of claim 17, wherein the first portion is displayed along a border of the display screen adjacent to the second portion.

30. The non-transitory computer readable storage medium of claim 17, wherein the first shortcut position and second shortcut position are displayed in fixed arrangement relative to one another on the display screen.

31. The non-transitory computer readable medium of claim 15, wherein:

the first shortcut position is the only shortcut position that corresponds to the first category of applications on the display screen; and the second shortcut position is the only shortcut position that corresponds to the second category of applications on the display screen.

32. A method, comprising:
at an electronic device that is in communication with a display screen:
causing a user interface to be displayed on a display screen in operable communication with the electronic device, wherein displaying the user interface includes concurrently displaying a plurality of shortcut affordances in a first portion of the display screen and a currently-active application in a second portion of the display screen, wherein the plurality of shortcut affordances includes:
a first shortcut affordance at a first shortcut position corresponding to a first category of applications, wherein the first category of applications is selected from a group consisting of a maps category associated with navigation-related applications, a multimedia category associated with multimedia applications, and a communications category associated with communications applications, wherein the first shortcut affordance corresponds to a first application, and wherein selection of the first shortcut affordance causes a user interface for the first application to be displayed on the display screen; and
a second shortcut affordance at a second shortcut position corresponding to a second category of applications distinct from the first category of applications, wherein the second category of applications is selected from a group consisting of the maps category, the multimedia category, and the communications category, wherein the second shortcut affordance corresponds to a second application distinct from the first application, and wherein selection of the second shortcut affordance causes a user interface for the second application to be displayed on the display screen;
while continuing to cause display of the plurality of shortcut affordances:
launching a third application; and
while the third application is the currently-active application:
detecting a sequence of one or more inputs at the second portion of the display screen that interacts with the third application; and
in response to detecting the sequence of one or more inputs at the second portion that interacts with the third application:
in accordance with a determination that the sequence of one or more inputs changes a status corresponding to a third application to a status that meets first shortcut replacement criteria, wherein the first shortcut replacement criteria includes a criterion that is met when the third application belongs to the first category of applications, causing the first shortcut affordance to be replaced with display of a third shortcut affordance corresponding to the third application at the first shortcut position while maintaining display of the second shortcut affordance on the display screen at the second shortcut position and ceasing to display the first shortcut affordance on the display screen; and
in accordance with a determination that the sequence of one or more inputs does not change the status corresponding the third application to the status that meets the first shortcut replacement criteria, causing the first shortcut affordance to be maintained on the display screen at the first shortcut position;
receiving a user input corresponding to a request to display, in the second portion, a user interface including a plurality of application launch icons; and
in response to receiving the user input:
causing display of, in the second portion, the user interface including the plurality of application launch icons; and
causing display of the first shortcut affordance in the first shortcut position and the second shortcut affordance in the second shortcut position to be maintained.

33. The method of claim 32, wherein the first shortcut replacement criteria includes a criterion that is met when the third application is a most-frequently-used application.

34. The method of claim 32, wherein the first shortcut replacement criteria includes a criterion that is met when the third application is a currently-active application that was an application in the first category of applications that was most recently performing a function.

35. The method of claim 32, wherein the first shortcut replacement criteria includes a criterion that is met when the third application corresponds to a prioritized application that was an application in the first category of applications that has a highest priority.

36. The method of claim 32, further comprising:
detecting a second sequence of one or more inputs; and
in response to detecting the sequence of one or more inputs:
determining whether the second sequence of one or more inputs changes the status corresponding to a fourth application to a status that meets a second shortcut replacement criteria corresponding to the second shortcut position;
in accordance with a determination that the second sequence of one or more inputs changes the status corresponding to a fourth application to a status that meets second shortcut replacement criteria, wherein the second shortcut replacement criteria includes a criterion that is met when the fourth application belongs to the second category of applications, causing the second shortcut affordance to be replaced with display of a fourth shortcut affordance corresponding to the fourth application at the second shortcut position while maintaining display of the first shortcut affordance on the display screen; and
in accordance with a determination that the second sequence of one or more inputs does not change the status corresponding the fourth application to the status that meets the second shortcut replacement criteria, causing the second shortcut affordance to be maintained on the display screen.

37. The method of claim 36, wherein the second shortcut replacement criteria includes a criterion that is met when the fourth application is distinct from the first application.

38. The method of claim 32, further comprising:
while displaying the third shortcut affordance, causing display of information related to an ongoing activity at the third application.

39. The method of claim 32, wherein the third shortcut affordance corresponds to a phone application and displaying the third shortcut affordance includes displaying a duration of an ongoing phone call.

40. The method of claim 32, wherein the third shortcut affordance corresponds to a maps application and displaying the third shortcut affordance includes displaying at least one of an estimated time of arrival or turn-by-turn directions.

41. The method of claim 32, wherein the first category of applications and the second category of applications do not include any common application that belongs to both the first category of applications and the second category of applications.

42. The method of claim 32, further comprising:
displaying a fifth shortcut affordance at a third shortcut position corresponding to a third category of applications distinct from the first category of applications and the second category of applications, wherein the fifth shortcut affordance corresponds to a fifth application.

43. The method of claim 40, wherein the fifth shortcut affordance corresponds to a phone application with an active timer displaying a duration of an ongoing call.

44. The method of claim 32, wherein the first portion is displayed along a border of the display screen adjacent to the second portion.

45. The method of claim 32, wherein the first shortcut position and second shortcut position are displayed in fixed arrangement relative to one another on the display screen.

46. The method of claim 32, wherein:
the first shortcut position is the only shortcut position that corresponds to the first category of applications on the display screen; and
the second shortcut position is the only shortcut position that corresponds to the second category of applications on the display screen.

* * * * *

UNITED STATES PATENT AND TRADEMARK OFFICE
CERTIFICATE OF CORRECTION

| | |
|---|---|
| PATENT NO. | : 11,816,325 B2 |
| APPLICATION NO. | : 15/411110 |
| DATED | : November 14, 2023 |
| INVENTOR(S) | : Andre M. J. Boule et al. |

It is certified that error appears in the above-identified patent and that said Letters Patent is hereby corrected as shown below:

In the Claims

Column 56, Line 30, Claim 24, delete "claim 18," and insert --claim 17,--.

Column 56, Line 64, Claim 31, delete "claim 15," and insert --claim 17,--.

Signed and Sealed this
Eighteenth Day of March, 2025

Coke Morgan Stewart
*Acting Director of the United States Patent and Trademark Office*